US006487516B1

(12) United States Patent
Amorai-Moriya

(10) Patent No.: US 6,487,516 B1
(45) Date of Patent: Nov. 26, 2002

(54) SYSTEM FOR THREE DIMENSIONAL POSITIONING AND TRACKING WITH DYNAMIC RANGE EXTENSION

(75) Inventor: Netzer Amorai-Moriya, Ramat Hasharon (IL)

(73) Assignee: Netmor Ltd., Bnei Brak (IL)

( * ) Notice: Subject to any disclaimer, the term of this patent is extended or adjusted under 35 U.S.C. 154(b) by 0 days.

(21) Appl. No.: 09/503,436

(22) Filed: Feb. 14, 2000

Related U.S. Application Data

(63) Continuation-in-part of application No. 09/384,314, filed on Aug. 27, 1999, and a continuation-in-part of application No. 09/345,189, filed on Mar. 30, 1999, now Pat. No. 6,316,934, and a continuation-in-part of application No. 09/181,800, filed on Oct. 29, 1998, now Pat. No. 6,141,293.

(51) Int. Cl.[7] .............................. G01S 3/80; G01B 7/14
(52) U.S. Cl. .................. 702/152; 702/153; 324/207.17; 367/127
(58) Field of Search .............................. 702/93, 94, 95, 702/150, 151, 152, 153, 188, 190, 197, 149; 324/207.17; 342/152, 153; 367/127, 129

(56) References Cited

U.S. PATENT DOCUMENTS

| 3,644,825 A | 2/1972 | Davis Jr. et al. ............... 324/41 |
| 3,868,565 A | 2/1975 | Kuipers .................... 324/34 R |

(List continued on next page.)

FOREIGN PATENT DOCUMENTS

| WO | WO94/04938 | 3/1994 |

OTHER PUBLICATIONS

R. Azencott (Ed.), *Simulated Annealing: Paralleliztion Techniques*, John Wiley & Sons, 1992, pp. ix–xi and p. 1.

M.E. Johnson (Ed.), "Simulated Annealing (SA) and Optimization: Modern Algorithms with VLSI, Optimal Design and Missle Defense Applications," *Amer. Journal of Mathematical and Management Science*, vol. 8, Nos. 3 & 4, pp. 205–207, 1988.

E. Aarts et al., *Simulated Annealing and Boltzman Machines: A Stochastic Approach to Combinatorial Optimization and Neural Computing*, John Wiley & Sons, 1989, pp. v–viii and p. 3.

Klapper J. et al., *Phase–Locked and Frequency–Feedback Systems*, Academic Press, 1972, pp. 23–48.

Best, R.E., *Phase–Locked Loops*, 3rd Edition, McGraw–Hill, 1997, pp. 177–228.

Mitchell, M., *An Introduction to Genetic Algorithms*, MIT Press, pp. 1–33.

(List continued on next page.)

*Primary Examiner*—Kamini Shah
(74) *Attorney, Agent, or Firm*—Townsend and Townsend and Crew LLP

(57) ABSTRACT

This invention discloses a tracking and positioning system including a plurality of transmitters distributed within a working space, and at least one sensors attached to at least one moving object and operative to sense transmissions arriving from the plurality of transmitters, a dynamic transmission activator operative to track at least one position parameters of at least one of said sensors and to selectively activate and deactivate individual sets of at least one transmitters from among the plurality of transmitters, at least partly responsively to at leas one position parameters of at least one of the sensors.

A tracking method for tracking a moving object whose initial position is substantially unknown is also disclosed.

13 Claims, 30 Drawing Sheets

Microfiche Appendix Included
(1 Microfiche, 21 Pages)

U.S. PATENT DOCUMENTS

| | | | |
|---|---|---|---|
| 3,935,572 A | 1/1976 | Broniwitz et al. ............. 343/9 |
| 3,952,304 A | 4/1976 | Broniwitz et al. ....... 343/16 M |
| 3,983,474 A | 9/1976 | Kuipers .................... 324/43 R |
| 4,017,858 A | 4/1977 | Kuipers .................. 343/100 R |
| 4,054,881 A | 10/1977 | Raab ...................... 343/112 R |
| 4,179,696 A | 12/1979 | Quesinberry et al. ........ 343/7.4 |
| 4,298,874 A | 11/1981 | Kuipers .................. 343/112 R |
| 4,314,251 A | 2/1982 | Raab ...................... 343/112 R |
| 4,328,548 A | 5/1982 | Crow et al. ................. 364/449 |
| 4,346,384 A | 8/1982 | Raab ...................... 343/112 R |
| 4,613,866 A | 9/1986 | Blood ........................ 343/448 |
| 4,622,644 A | 11/1986 | Hansen ...................... 364/559 |
| 4,710,708 A | 12/1987 | Rorden ...................... 324/207 |
| 4,725,776 A | 2/1988 | Onodera et al. |
| 4,737,794 A | 4/1988 | Jones ......................... 342/448 |
| 4,742,356 A | 5/1988 | Kuipers ...................... 342/448 |
| 4,849,692 A | 7/1989 | Blood ........................ 324/208 |
| 4,855,932 A | 8/1989 | Cangiani et al. ............. 364/516 |
| 4,945,305 A | 7/1990 | Blood ................... 324/207.17 |
| 5,075,694 A | 12/1991 | Donnangelo et al. ....... 342/455 |
| 5,095,467 A | 3/1992 | Olson et al. ................. 367/125 |
| 5,168,222 A | 12/1992 | Volsin et al. .......... 324/207.17 |
| 5,170,172 A | 12/1992 | Weinstein ................... 342/458 |
| 5,307,072 A | 4/1994 | Jones ......................... 342/147 |
| 5,313,212 A | 5/1994 | Ruzicka |
| 5,381,095 A | 1/1995 | Andrews |
| 5,416,712 A | 5/1995 | Geier et al. ................. 364/450 |
| 5,453,686 A | 9/1995 | Anderson .............. 324/207.17 |
| 5,600,330 A | 2/1997 | Blood ........................ 342/463 |
| 5,640,170 A | 6/1997 | Anderson ................... 343/895 |
| 5,645,077 A | 7/1997 | Foxlin ......................... 128/774 |
| 5,742,394 A | 4/1998 | Hansen ...................... 356/375 |
| 5,744,953 A | 4/1998 | Hansen ................. 324/207.17 |
| 5,767,669 A | 6/1998 | Hansen et al. ......... 324/207.12 |
| 5,767,960 A | 6/1998 | Orman .................. 356/139.03 |
| 5,831,260 A | 11/1998 | Hansen ...................... 250/221 |
| 5,833,608 A | 11/1998 | Acker |
| 5,859,531 A | 1/1999 | Maurice et al. |
| 5,953,683 A | 9/1999 | Hansen et al. ................ 702/95 |
| 5,960,097 A | 9/1999 | Pfeiffer et al. |
| 6,073,043 A | 6/2000 | Schneider |
| 6,114,995 A | 9/2000 | Ketchem |
| 6,141,293 A * | 10/2000 | Amorai-Moriya et al. .. 367/127 |
| 6,230,037 B1 | 5/2001 | Tsukada et al. |
| 6,269,172 B1 | 7/2001 | Regh et al. |
| 6,269,324 B1 | 7/2001 | Rakijas et al. |
| 6,292,758 B1 | 9/2001 | Gilbert et al. |
| 6,316,934 B1 * | 11/2001 | Amorai-Moriya et al. ......... 324/207.17 |

OTHER PUBLICATIONS

Kushner, Approximations to Optimal Nonlinear Filters, *IEEE Transactions on Automated Control*, vol. AC–21, No. 5, Oct. 1967.

Gelb, A., *Applied Optimal Estimation*, The MIT Press, Cambridge, MA, 1974, Chapter 1, pp. 1–7.

Jackson, J.D., *Classical Electrodynamics*, John Wiley & Sons, 2nd Edition, New York, 1975, Chapter 6, pp. 209–268.

Anderson, B.D.O. et al., *Optimal Filtering*, Prentice–Hall, Inc., Englewood Cliffs, New Jersey, 1979, Chapters 1 and 2, pp. 1–16.

Jazwinski, A.H., *Stochastic Processes and Filtering Theory*, Academic Press, New York, 1970, chapters 1 and 2, pp. 1–13.

Goldberg, D., *Genetic Algorithms in Search, Optimization and Machine Learning*, Addison–Wesley, 1989, pp. 27–57.

Jayant, N.S. et al., *Digital Coding of Waveforms*, Prentice–Hall, 1984, pp. 86–114.

Grewal, M.S. et al., *Kalman Filtering*, Prentice–Hall, 1993.

Harold J. Kushner, "Approzimations to Optimal Nonlinear Filters," *IEEE Transactions on Automated Control*, vol. AC–21, No. 5, Oct. 1967.

Arthur Gelb, *Applied Optimal Estimation*, The M.I.T. Press, Cambridge, MA, 1974, Chapter 1, pp. 1–7.

Brian D. O. Anderson and John B. Moore, *Optimal Filtering*, Prentice–Hall, Inc., Englewood Cliffs, New Jersey, 1979, Chapter 1 and 1, pp. 1–16.

J. D. Jackson, *Classical Electrodynamics*, John Wiley & Sons, 2nd Edition, New York, 1975, Chapter 6, pp. 209–268.

Andrew H. Jazwinski, *Stochastic Processes and Filtering Theory*, Academic Press, New York, 1970, Chapters 1 and 2, pp. 1–13.

Mohinder S. Grewal and Angus P. Andrew, *Kalman Filtering*, Prentice Hall, Upper Saddle River, New Jersey, 1993.

* cited by examiner

From 1250

Self calibration of Hardware attributes e.g. transmitter's intensity. Use self calibrated information e.g. $C_0$ from state vector to update values used inside $h(.)$ computations.

$\xi = [x, y, z, \phi, \theta, \dot{x}, \dot{y}, \dot{z}, \dot{\phi}, \dot{\theta}, C_1, \ldots, C_N]$ $N$ = number of transmitters $Q = \begin{bmatrix} Q_{coor} & 0 \\ 0 & Q_{sc} \end{bmatrix}$ $\Phi = \begin{bmatrix} \Phi_{coor} & 0 \\ 0 & \Phi_{sc} \end{bmatrix}$ $H_k = [H_{coor} \quad H_{sc}]$ $\xi = [x, y, z, \phi, \theta, \dot{x}, \dot{y}, \dot{z}, \dot{\phi}, \dot{\theta}, \phi_1^s, \ldots, \phi_N^s]$ $\phi_i^s = \phi$ coordinate of transmitter $i$ $N$ = number of transmitters

SYSTEM FOR THREE DIMENSIONAL POSITIONING AND TRACKING WITH DYNAMIC RANGE EXTENSION

This application is a continuation-in-part of U.S. patent application Ser. No. 09/345,189, filed Jun. 30, 1999, which issued as U.S. Pat. No. 6,316,934 on Nov. 13, 2001; and U.S. patent application Ser. No. 09/181,800, filed Oct. 29, 1998, which issued as U.S. Pat. No. 6,141,293 on Oct. 31, 2000. This application is also a continuation-in-part of U.S. patent application Ser. No. 09/384,314 filed Aug. 27, 1999. Each of these three applications are incorporated by reference herein in their entirety.

This application contains Microfiche of one page, 21 frames.

FIELD OF THE INVENTION

The present invention relates generally, to positioning systems and more particularly to positioning systems employing alternating electromagnetic fields, as well as to apparatus for localization and tracking.

BACKGROUND OF THE INVENTION

Various types of positioning systems which employ alternating electromagnetic fields are known. The following U.S. Patents and foreign patent documents are believed to represent the state of the art for positioning systems:

U.S. Pat. Nos. 4,054,881 and 4,314,251 to Raab; U.S. Pat. No. 4,622,644 to Hansen; U.S. Pat. No. 4,737,794 to Jones; U.S. Pat. Nos. 4,613,866, 4,945,305 and 4,849,692 to Blood; U.S. Pat. Nos. 4,017,858 and 4,298,874 and 4,742,356 to Kuipers; U.S. Pat. No. 5,168,222 to Volsin et al; U.S. Pat. No. 5,0170,172 to Weinstein; and U.S. Pat. No. 5,453,686 to Anderson; WO 94/04938 to Bladen; U.S. Pat. No. 5,953,683 to Hansen; U.S. Pat. No. 5,831,260 to Hansen; U.S. Pat. No. 5,767,960 to Orman; U.S. Pat. No. 5,767,669 to Hansen; U.S. Pat. No. 5,744,953 to Hansen; U.S. Pat. No. 5,742,394 to Hansen; U.S. Pat. No. 5,640,170 to Anderson; U.S. Pat. No. 5,600,330 to Blood; U.S. Pat. No. 5,307,072 to Jones; U.S. Pat. No. 4,945,305 to Blood; U.S. Pat. No. 4,710,708 to Rorden; U.S. Pat. No. 4,346,384 to Raab; U.S. Pat. No. 4,328,548 to Crow; U.S. Pat. No. 4,298,874 to Kuipers; U.S. Pat. No. 3,983,474 to Kuipers; U.S. Pat. No. 3,868,565 to Kuipers; 3,644,825 to Davis U.S. Pat. No. 4,710,708 to Rorden describes a positioning system which employs only one magnetic coil.

Genetic algorithms are described in *Genetic algorithms in search: optimization and machine learning*, D. Goldberg, 1989; and

*An introduction to genetic algorithms*, Melanie Mitchell, 1996.

PLL technology is described in *Phase locked loop: simulation and applications*, by Roland E. Best, McGraw-Hill Book Company, ISBN 0070060517.

The theory of non-linear filtering and its applications are discussed in:

H. J. Kushner, "Approximations to Optimal Nonlinear Filters". IEEE Trans. A C., Vol. AC-12, No. 5, October 1967;

A. Gelb, J. F. Kaspar,. Jr., R. A. Nash, Jr., C. E. Price, and A. A. Southerland, Jr.,"Applied Optimal Estimation", M.I.T. Press, Cambridge, Mass., 1974;

B. D. O. Anderson, and J. B. Moore, "Optimal Filtering", Prentice-Hall, Englewood Cliffs, N.J., 1979;

A. H. Jazwinski, "Stochastic Processes and Filtering Theory", Academic Press, New York 1971, and M. S. Grewal, and A. P. Andrews, "Kalman Filtering", Prentice-Hall, Upper Saddle River, N.J., 1993, The field equation law is discussed in:

J. D. Jackson, "Classical Electrodynamics", John Wiley & Sons, New York New York, 1975.

The application of Extended Kalman Filters (EKF) to tracking in the context of radar is discussed, for example, in U.S. Pat. Nos. 5,075,694, 4,179,696, 3,952,304 and 3,935, 572. Other tracking systems are discussed, for example, in U.S. Pat. Nos. 5,095, 467 and 4,855,932.

The Kalman Filter is a standard tool for "data fusion" of different sensors. In U.S. Pat. No. 5,416,712 GPS signals and dead reckoning are combined by a Kalman Filter, and where the gyro bias is also calibrated. In U.S. Pat. No. 5,645,077 automatic drift compensation is discussed, Simulated annealing-based algorithms are described in:

B. Aarts and J. Korst, "Simulated Annealing and Boltzman Machines: A Stochastic Ap1proach to Combinatorial Optimization and Neural Computing", John Wiley and Sons Ltd. (ISBN: 0471921467);

M. E. Johnson (Ed.) "Simulated Annealing (Sa and Optimization: Modem Algorithms with VLSI, Optimal Design and Missile Defense Applications)", Amer. Sciences Pr. (ISBN: 0935950184); and R. Azencott (Ed.), "Simulated Annealing: Parallelization Techniques", Wiley Interscience Series in Discrete Mathematics, John Wiley and Sons Ltd. (ISBN: 0471532312), The disclosures of all publications mentioned in the specification and of the publications cited therein are hereby incorporated by reference,

SUMMARY OF THE INVENTION

The present invention provides improved apparatus and method for positioning and tracking objects, and also to a non-linear Kalman Filter tracker.

A genetic algorithm is typically employed for solving the position equation to obtain the position and orientation of the detector.

A particular advantage of a preferred embodiment of the present invention is conservation of bandwidth by cessation of operation of transmitters, which are not providing useful information.

Selective activation of the transmitters is preferably performed periodically. The period is preferably selected automatically by the system to match the expected pace of change in the location of the moving body and the estimated distance between transmitters.

There is thus provided in accordance with a preferred embodiment of the present invention a tracking and positioning system including a plurality of transmitters distributed within a working space, and at least one sensors attached to at least one moving object and operative to sense transmissions arriving from the plurality of transmitters, a dynamic transmission activator operative to track at least one position parameters of at least one of the sensors and to selectively activate and deactivate individual sets of at least one transmitters from among the plurality of transmitters, at least partly responsively to at least one position parameters of at least one of the sensors.

Further in accordance with a preferred embodiment of the present invention the dynamic transmission activator is operative to activate at least one individual transmitter from among the plurality of transmitters if and only if at least one sensor is within the operating range of the individual transmitter.

Still further in accordance with a preferred embodiment of the present invention the dynamic transmission activator is operative to deactivate at least one individual transmitter from among the plurality of transmitters if and only if all sensors are outside of the operating range of the individual transmitter.

There is also provided in accordance with yet another preferred embodiment of the present invention a tracking method for tracking a moving object whose initial position is substantially unknown, the method including the steps of using a genetic algorithm to initially position the moving object, and tracking the moving object using a Kalman filter tracking method.

Further in accordance with a preferred embodiment of the present invention, the tracking method also includes at least once repositioning the moving object, during tracking, using the genetic algorithm.

A block diagram of the disclosed system, for positioning and tracking objects, is shown in FIG. 1d. In accordance with a preferred embodiment of the present invention a system comprises of N transmitters, where N≧6, and at least one probe sensor which detects at least 6 electromagnetic signals, each characterized by its own frequency. The probe sensor typically comprises a single magnetic field detector that is connected to a digital signal processing circuit. The analog output of the magnetic signal detector is a voltage signal proportional to the superposition of the N magnetic field transmitters at the coordinates $x^i, y^i, z^i, \theta^i, \phi^i$, where the index i denotes the position of the magnetic coil i. It is a particular feature of a preferred embodiment of the present invention that the antenna coils need not be exactly mutually orthogonal and certainly need not be arranged such that the centers of the antenna coils coincide.

The analog signal is digitized and is introduced to an integrated digital signal processor block, as an input data. The digitized input data from one of the magnetic detectors is then used by the digital signal processor unit to compute the position and orientation coordinates of the magnetic detector. The output from the digital signal processor unit is then transferred to the Data Communication unit and then to the System Control Unit. The refresh rate of the output data is typically of the order of few times per second to a few hundred times per second.

The detector may comprise a one-axis antenna coil, as illustrated in FIG. 2, or may alternatively comprise any other suitable type of one-axis magnetic field detector, such as a Hall-effect detector or a solid state component e.g. a magneto-resistive detector or a magneto-diode or a magneto-transistor. The digital signal processor unit typically comprises three modules: a tracking and control module, an envelope detector module and a position determination unit. The tracking and control subsystem is operative to increase the precision of the position determinations by decreasing the dynamic range of the input signal to the A/D converter.

The output of the tracking and control module is supplied to an envelope detector, which is operative to determine the received envelope amplitudes (magnitude and sign) $C^1, \ldots, C^N$ of the N magnetic signals received from the N RF transmitters. The tracking and control subsystem preferably comprises a Linear Predictive Coding (LPC) module. The envelope detector module typically comprises of N identical envelope detectors (EDs) working in parallel. Optionally, each of the ED modules comprises two sub-modules: a Phase Lock Loop (hereafter PLL), and a System Synchronization Unit, which is called during the operation of the ED module to define the absolute sign of the signal amplitude. Alternatively, each ED module comprises three sub-modules operating in parallel and another sub-module that is called when a system synchronization is needed. The three modules are: a Phase Lock Loop, a Non-coherent absolute value envelope-detector, and a Sign Detection Unit. A fourth sub-module, System synchronization unit, is then called to define the absolute sign of the signal amplitude.

The output of the envelope detector is supplied to the position determination unit which is operative, based on the signed amplitude values supplied by the envelope detector, to provide an output indication of the position of the magnetic field detector in the sensor.

The operation of the position determination unit is typically based on solving N analytic equations with N unknowns.

There is further provided in accordance with a preferred embodiment of the present invention a system for monitoring of the position of at least one portions of an object, the system including a plurality of transmitters operative to transmit alternating magnetic fields within a three-dimensional space, and at least one positioning sensors arranged to be fixed to at least one corresponding portions of the object whose positions it is sought to monitor, each of the at least one positioning sensors including a magnetic field receiver having at least one active axes and operative to receive at least one component, lying along the at least one active axes respectively, of the alternating magnetic fields, and at least one digital signal processors for storing at least one characteristic of the magnetic fields as transmitted by the plurality of transmitters and comparing the at least one characteristic to at least one characteristic of the magnetic fields as received by at least a corresponding one of the at least one positioning sensors and, accordingly, determining and providing an output indication of at least one position characteristic of at least one corresponding portions of the object.

Further in accordance with a preferred embodiment of the present invention at least one sensors comprise a single sensor arranged to be fixed to a single portion of the object whose position it is sought to monitor.

Still further in accordance with a preferred embodiment of the present invention the at least one position characteristic comprises at least one dimension of the spatial position of the object portion. Preferably the at least one position characteristic also includes at least one dimension of the angular position of the object portion.

Additionally in accordance with a preferred embodiment of the present invention the at least one sensors comprise a plurality of sensors arranged to be fixed to a corresponding plurality of portions of the object whose positions it is sought to monitor.

Moreover in accordance with a preferred embodiment of the present invention the magnetic field receiver has a single (detection) active axis and is operative to receive the component of the alternating magnetic fields lying along the single (detection) active axis.

Preferably the plurality of transmitters are operative to continuously transmit said alternating magnetic fields.

There is also provided in accordance with another preferred embodiment of the present invention a system for monitoring the position of at least one portions of an object in three-dimensional space having three axes, the system including at least six magnetic transmitters each having a center and each operative to transmit alternating magnetic fields within a three-dimensional space, a transmitter orientation maintainer operative to maintain at least three of the transmitters in orientations such that at least a component of the magnetic field of at least one of the transmitters falls within each of the 3 axes of the 3-dimensional space, and wherein less than all of the centers of the transmitters coincide, at least one positioning sensors arranged to be fixed to at least one corresponding portions of the object whose positions it is sought to monitor, each of the at least one positioning sensors comprising a magnetic field receiver receiving the alternating magnetic fields from the at least six transmitters, and at least one digital signal processor for storing at least one characteristic of the magnetic fields as transmitted by the plurality of at least six transmitters and comparing the at least one characteristic to at least one characteristic of the magnetic fields as received by at least a corresponding one of the at least one positioning sensors and, accordingly, determining at least one position characteristic of at least one object portion.

Further in accordance with a preferred embodiment of the present invention the at least one digital signal processor is provided integrally with a corresponding one of the at least one positioning sensors.

Additionally in accordance with a preferred embodiment of the present invention at least 3 of the transmitters are separate physical units such that the at least three transmitters can be positioned at any 3 user-selected locations.

There is also provided in accordance with yet another preferred embodiment of the present invention a system for monitoring the position of at least one portions of an object in three-dimensional space having three axes, the system including at least six magnetic transmitters each having an active axial direction and each operative to transmit alternating magnetic fields within a three-dimensional space, a transmitter orientation maintainer operative to maintain at least three of the transmitters in orientations such that at least a component of the magnetic field of at least one of the transmitters falls within each of the 3 axes of the 3-dimensional space, and wherein less than all of the transmitters' active axial directions are mutually orthogonal, at least one positioning sensors arranged to be fixed to at least one corresponding portions of the object whose positions it is sought to monitor, each of said at least one positioning sensors comprising a magnetic field receiver receiving said alternating magnetic fields from the at least six transmitters, and at least one digital signal processor for storing at least one characteristic of the magnetic fields as transmitted by the plurality of at least six transmitters and comparing said at least one characteristic to at least one characteristic of the magnetic fields as received by at least a corresponding one of the at least one positioning sensors and, accordingly, determining at least one position characteristic of at least one object portion.

Further in accordance with a preferred embodiment of the present invention at least first and second transmitters from among the at least six transmitters transmit in different frequencies.

Preferably at least first and second transmitters from among the at least six transmitters transmit in different phases.

Additionally in accordance with a preferred embodiment of the present invention at least one of the at least one digital signal processors is operative to simultaneously process magnetic field characteristics arriving from more than one of the at least six transmitters.

Still further in accordance with a preferred embodiment of the present invention comprising an RF trigger which is operative to trigger all of the transmitters, thereby to synchronize the transmitters. Additionally or alternatively the RF trigger provides a timing signal to at least one of the at least one sensors. Preferably at least one of the sensors computes the absolute phase of the at least six transmitters, based on said timing signal.

There is also provided in accordance with a preferred embodiment of the present invention a method for monitoring of the position of at least one portions of an object, the method including affixing at least one positioning sensors to at least one corresponding portions of the object whose positions it is sought to monitor, the sensors being operative to receive alternating magnetic fields existing within a three dimensional space containing the object, comparing at least one characteristic of the magnetic fields as transmitted to at least one characteristic of the magnetic fields as received by the sensors, and using a result of the comparing step as an input to a genetic natural selection process for determining and providing an output indication of at least one position characteristic of at least one corresponding portions of the object.

Further in accordance with a preferred embodiment of the present invention at least one of the sensors comprises a Linear Predicted Coding control loop operative to increase the dynamic range of incoming signals. Preferably at least one of the sensors comprises a solid-state component. Additionally or alternatively at least one of the sensors comprises a control loop to improve the dynamic range of the signal intensity without the use of electronic components common in the art.

Further in accordance with a preferred embodiment of the present invention, at least one of the sensors comprises a PLL configuration whose output is relatively insensitive to its input amplitude.

Still further in accordance with a preferred embodiment of the present invention, at least one dynamic property of the PLL apparatus does not substantially depend on the input amplitude of the PLL apparatus.

Still further in accordance with a preferred embodiment of the present invention, the bandwidth of the PLL apparatus does not substantially depend on the input amplitude of the PLL apparatus.

Additionally in accordance with a preferred embodiment of the present invention, the relaxation time constant of the PLL apparatus does not substantially depend on the input amplitude of the PLL apparatus.

The dynamic properties of the PLL, specifically bandwidth, and its relaxation time constant typically do not depend on the input amplitude.

There is also provided in accordance with a preferred embodiment of the present invention a method for monitoring of the position of at least one portions of an object, the method including positioning a plurality of transmitters operative to transmit alternating magnetic fields within a three-dimensional space and affixing at least one positioning sensors arranged to be fixed to at least one corresponding portions of the object whose positions it is sought to monitor, each of the at least one positioning sensors comprising a magnetic field receiver having at least one active axes and operative to receive at least one component, lying along the at least one active axes respectively, of the alternating magnetic fields and storing at least one characteristic of the magnetic fields as transmitted by the plurality of transmitters and comparing the at least one characteristic to at least one characteristic of the magnetic fields as received by at least a corresponding one of the at least one positioning sensors and, accordingly, determining and providing an output indication of at least one position characteristic of at least one corresponding portions of the object, wherein the storing, comparing, determining and providing step is performed locally rather than remotely.

There is also provided in accordance with yet another preferred embodiment of the present invention a method for monitoring the position of at least one portions of an object in three-dimensional space having three axes, the method including positioning at least six magnetic transmitters each having a center and each operative to transmit alternating magnetic fields within a three-dimensional space, including maintaining at least three of the transmitters in orientations such that at least a component of the magnetic field of at least one of the transmitters falls within each of the 3 axes of the 3-dimensional space, and wherein less than all of the centers of the transmitters coincide, affixing at least one positioning sensor to at least one corresponding portions of the object whose positions it is sought to monitor, each of the at least one positioning sensors comprising a magnetic field receiver receiving said alternating magnetic fields from the at least six transmitters, and storing at least one characteristic of the magnetic fields as transmitted by the plurality of at least six transmitters and comparing the at least one characteristic to at least one characteristic of the magnetic fields as received by at least a corresponding one of the at least one positioning sensors and, accordingly, determining at least one position characteristic of at least one object portion.

There is also provided in accordance with another preferred embodiment of the present invention a method for monitoring the position of at least one portions of an object in three-dimensional space having three axes, the method including positioning at least six magnetic transmitters each having an active axial direction and each operative to transmit alternating magnetic fields within a three-dimensional space, including maintaining at least three of the transmitters in orientations such that at least a component of the magnetic field of at least one of the transmitters falls within each of the 3 axes of the 3-dimensional space, and wherein less than all of the transmitters' active axial directions are mutually orthogonal, affixing at least one positioning sensors arranged to be fixed to at least one corresponding portions of the object whose positions it is sought to monitor, each of said at least one positioning sensors comprising a magnetic field receiver receiving the alternating magnetic fields from the at least six transmitters, and storing at least one characteristic of the magnetic fields as transmitted by the plurality of at least six transmitters and comparing said at least one characteristic to at least one characteristic of the magnetic fields as received by at least a corresponding one of the at least one positioning sensors and, accordingly, determining at least one position characteristic of at least one object portion.

There is thus further provided in accordance with yet another preferred embodiment of the present invention pose tracking apparatus operative to track the pose of a moving object based on magnetic flux measurements taken in the vicinity of the moving object, the pose tracking apparatus including a non-linear Kalman filter-based tracker operative to receive magnetic flux measurements performed in the vicinity of the moving object, to operate a non-linear Kalman-type filter on the measurements, thereby to generate information regarding the pose of the moving object, and a pose indicator operative to provide an output indication of the information regarding the pose of the moving object.

Further in accordance with a preferred embodiment of the present invention the non-linear tracker includes an EKF (extended Kalman filter).

Additionally in accordance with a preferred embodiment of the present invention, the non-linear filter operates on a state vector whose components include pose coordinates and first time-derivatives of the pose coordinates.

Further in accordance with a preferred embodiment of the present invention the pose coordinates include 3 spatial coordinates and 2 orientation coordinates.

Further in accordance with a preferred embodiment of the present invention the apparatus also includes a transmitter array, which may include less than six operative transmitters, inducing magnetic flux in the vicinity of the moving object.

Still further in accordance with a preferred embodiment of the present invention the non-linear tracker employs a field equations transformation from the pose of the moving object to the magnetic flux measurements taken in its vicinity.

Still further in accordance with a preferred embodiment of the present invention the step of employing the field equation transformation includes computing a function h of a state vector $\xi$, as follows:

$$h(\xi) = \frac{C_0}{R^3}\left(\frac{3A_1A_2}{R^2} - A_3\right)$$

where $C_o$ is a coefficient,

R is the distance between a detector detecting the magnetic flux measurements and a transmitter within the transmitter array; and $A_1 = \delta x \sin(\theta)\cos(\phi_s) + \delta y \sin(\theta_s)\sin(\phi_s) + \delta z \cos(\theta_s)$ $A_2 = \delta x \sin(\theta_d)\cos(\phi_d) + \delta y \sin(\theta_d)\sin(\phi_d) + \delta z \cos(\theta_d)$ $A_3 = \sin(\theta_s)\cos(\phi_s)\sin(\theta_d)\cos(\phi_d) + \sin(\theta_s)\sin(\phi_s)\sin(\theta_d)\sin(\phi_d) + \cos(\phi_s)\cos(\phi_d)$ and wherein the pose of the detector is $(x_d, y_d, z_d, \theta_d, \phi_d)$ and the pose of the transmitter is $(x_s, y_s, z_s, \theta_s, \phi_s)$, and where $\delta x$, $\delta y$ and $\delta z$ denote the distance between the x, y and z components, respectively, of the detector's pose and the transmitter's pose.

Additionally in accordance with a preferred embodiment of the present invention the non-linear tracker approximates an elliptic integral, at least when the moving object is close to a transmitter within the transmitter array, by computing first and second terms of a Taylor series representing the elliptic integral.

Additionally in accordance with a preferred embodiment of the present invention, the approximated elliptic integral includes a correction to the above mentioned $A_1$ and $A_3$, $A_1 \Rightarrow A_1(1-\delta)$ $A_3 \Rightarrow A_3(1-\eta)$ $$\delta' = \frac{5}{8}\left(\frac{\rho}{R}\right)^2\left(7\frac{A_1^2}{R^2} - 3\right)$$

$$\eta = \frac{9}{8}\left(\frac{\rho}{R}\right)^2\left(5\frac{A_1^2}{R^2} - 1\right)$$

and where $\rho$ is the radius of the transmitter.

Still further in accordance with a preferred embodiment of the present invention the orientation component of the pose of the moving object is represented by two angles, continu ous over time θ' and φ', whose relationship with conventional polar coordinates θ' and φ is as follows:

$$\theta = \begin{cases} \theta' & \text{if } \mod(\theta, 2\pi) \leq \pi \\ -\theta' & \text{if } \mod(\theta, 2\pi) > \pi \end{cases}$$

$$\varphi = \begin{cases} \varphi' & \text{if } \theta = \theta' \\ \varphi' + \pi & \text{if } \theta = -\theta' \end{cases}$$

Still further in accordance with a preferred embodiment of the present invention, in order to avoid singularity, a dynamic offset is described by the following transformation:

$$\theta = \cos^{-1}[\cos(\theta')\cos(\phi')]$$

$$\phi = \cos^{-1}[\sqrt{\cos^2(\theta') + \sin^2(\phi')\cos^2(\theta')}]$$

where θ and φ include the orientation component of the moving object's pose after the dynamic offset, and θ and φ' include the orientation component of the moving object's pose before the dynamic offset, Still further in accordance with a preferred embodiment of the present invention the non-linear filter employs the following matrices and operations:

$$\xi_k(-) = \Phi \xi_{k-1}(+)$$

where k is a time index, $\xi_k(-)$ is a state vector predictor, $\xi_k(+)$ is a state vector corrector, and Φ is a state transition matrix, $$P_k(-) = \Phi P_{k-1}(+) \Phi^T + Q$$

where P(−) is an estimate error covariance matrix predictor, P(+) is an estimate error covariance matrix corrector and Q is a process noise covariance matrix, $$H_k = \frac{\partial h(\bar{\xi})}{\partial \bar{\xi}}\bigg|_{\xi_k(-)}$$

where h is a sensitivity function and ξ is a state vector, $$K_k = P_k(-) H_k^T [H_k P_k(-) H_k^T + R_k]^{-1}$$

where $R_k$ is a measurement noise covariance matrix, $$\xi_k(+) = \xi_k(-) + K_k\{\zeta_k - h[\xi_k(-)]\}$$

where ζ denotes the magnetic flux measurements taken in the vicinity of the moving object, and $$P_k(+) = [I - K_k H_k] P_k(-)$$

Still further in accordance with a preferred embodiment of the present invention the magnetic flux measurements may include less than six magnetic flux measurements in the vicinity of the moving object.

Additionally in accordance with a preferred embodiment of the present invention, the non-linear tracker is operative to time-vary a measurement-noise covariance matrix R and a process-noise covariance matrix Q.

Further in accordance with a preferred embodiment of the present invention the time-varying R and Q includes:

$$R_k^{dec} = R_{k-1}^{dec} e^{\frac{T_k - T_{k-1}}{\tau_{decay}}}$$

$$R_k = R_k^{dec} + R^{inf}$$

$$Q_k^{dec} = Q_{k-1}^{dec} e^{\frac{T_k - T_{k-1}}{\tau_{decay}}}$$

$$Q_k = Q_k^{dec} + Q^{inf}$$

Still further in accordance with a preferred embodiment of the present invention at least one of the transmitters inducing a magnetic flux sampled by the measurements is self-calibrated.

Additionally in accordance with a preferred embodiment of the present invention, the non-linear filter is operative to calibrate the location of each of the self-calibrating transmitters.

Further in accordance with a preferred embodiment of the present invention the non-linear filter is operative to calibrate the intensity of each of the self-calibrating transmitters.

Still further in accordance with a preferred embodiment of the present invention the non-linear filter is operative to calibrate the radius of each of the self-calibrating transmitters.

Additionally in accordance with a preferred embodiment of the present invention, the non-linear filter is operative to calibrate the orientation of each of the self-calibrating transmitters.

Further in accordance with a preferred embodiment of the present invention, the tracker uses a state vector whose components comprise characteristic the self-calibrated transmitters inducing a magnetic flux sampled by the measurements, and wherein at least one of the characteristics is self-calibrated.

Still further in accordance with a preferred embodiment of the present invention, the non-linear tracker employs a measurement noise matrix R and a process noise covariance matrix Q at least one of which is generated by an adaptive process.

Additionally in accordance with a preferred embodiment of the present invention the adaptive process for Q comprises $$Q_k^{acc} = \left(\alpha\left(\frac{\xi_k^{velocity}(+) - \xi_{k-1}^{velocity}(+)}{T_k - T_{k-1}}\right)\right)^2 + (1-\alpha)Q_{k-1}^{acc}$$

$$Q_k = Q_k^{acc} + Q_0^{acc}$$

$$\xi_k^{velocity}(+) = \text{estimate of } \{\dot{x}, \dot{y}, \dot{z}, \dot{\phi}, \dot{\theta}\}$$

Further in accordance with a preferred embodiment of the present invention the adaptive process for R comprises $$R_k^{s,s} = \beta\{\zeta_k^s - h^s[\xi_k(-)]\}^2 + (1-\beta)R_{k-1}^{s,s}$$

$$R_k R_k^{s,s} + R_0^{s,s}$$

BRIEF DESCRIPTION OF THE DRAWINGS AND APPENDICES

The present invention will be understood and appreciated more fully from the following detailed description, taken in conjunction with the drawings and appendices in which:

FIG. 1a is a simplified pictorial illustration of a positioning system constructed and operative in accordance with a preferred embodiment of the present invention which outputs the position of an object as a whole or parts thereof, such as, in the illustrated embodiment, body parts of a human user;

FIG. 1b s a virtual reality application of the system of FIG. 1a in which a simulation system receives the position outputs generated by the system of FIG. 1a and generates a display image including a computer-generated scene and a figure having body part motion which mimics the body part motion of the human user of FIG. 1a as detected by the positioning system of FIG. 1a;

FIG. 1d is a simplified functional block diagram illustration of the apparatus of FIG. 1a;

FIG. 7b is a simplified flowchart illustration of a preferred method for performing the coordinate possibility evaluation step of FIG. 7a;

FIG. 7c is a simplified flowchart illustration of a preferred method for performing the new generation creation step of FIG. 7a;

Appendix I is a computer listing of a software implementation of a preferred embodiment of the present invention, written in Matlab™.

Appendix II is an example of a suitable input file for Appendix I.

DETAILED DESCRIPTION OF PREFERRED EMBODIMENTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The term "spatial position" is employed herein to refer to the location of a detector or other object within a three-dimensional space which may, for example, be expressed in Cartesian coordinates (x, y, z) or alternatively may be expressed in any other suitable coordinate system such as a polar system.

The term "angular position" is employed herein to refer to an orientation of the detector or other object relative to the three-dimensional space which may, for example, be expressed as ($\theta$, $\phi$) where the designation of $\phi$ must also include the quadrant in which the angle $\phi$+is located. The orientation may, of course, also be expressed in other suitable coordinates such as Euler coordinates or such as yaw, pitch and roll.

The term "RF transmitter" is employed herein to refer to a transmitter transmitting at a frequency of 5 KHz and upwards, preferably at a frequency of 1–100 KHz, and more preferably in the range of 9–14 KHz. According to one embodiment of the present invention, the transmissions are pulse transmissions. However, preferably, the transmission are continuous rather than pulse transmissions.

The term "magnetic field" is intended to include electromagnetic fields as well as magnetic fields.

The analog signal is digitized and is introduced to an integrated digital signal processor block 62, as an input data. The digitized input data from the magnetic detector 50 is then used by the digital signal processor unit 62 to calculate the position and orientation coordinates of the magnetic detector 50. The output from the digital signal processor unit 62 is then transferred to the Data Communication unit 51 and then to the System Control Unit 30. The refresh rate of the output data is of the order of few times per second to a few hundred times per second.

Figure 2:
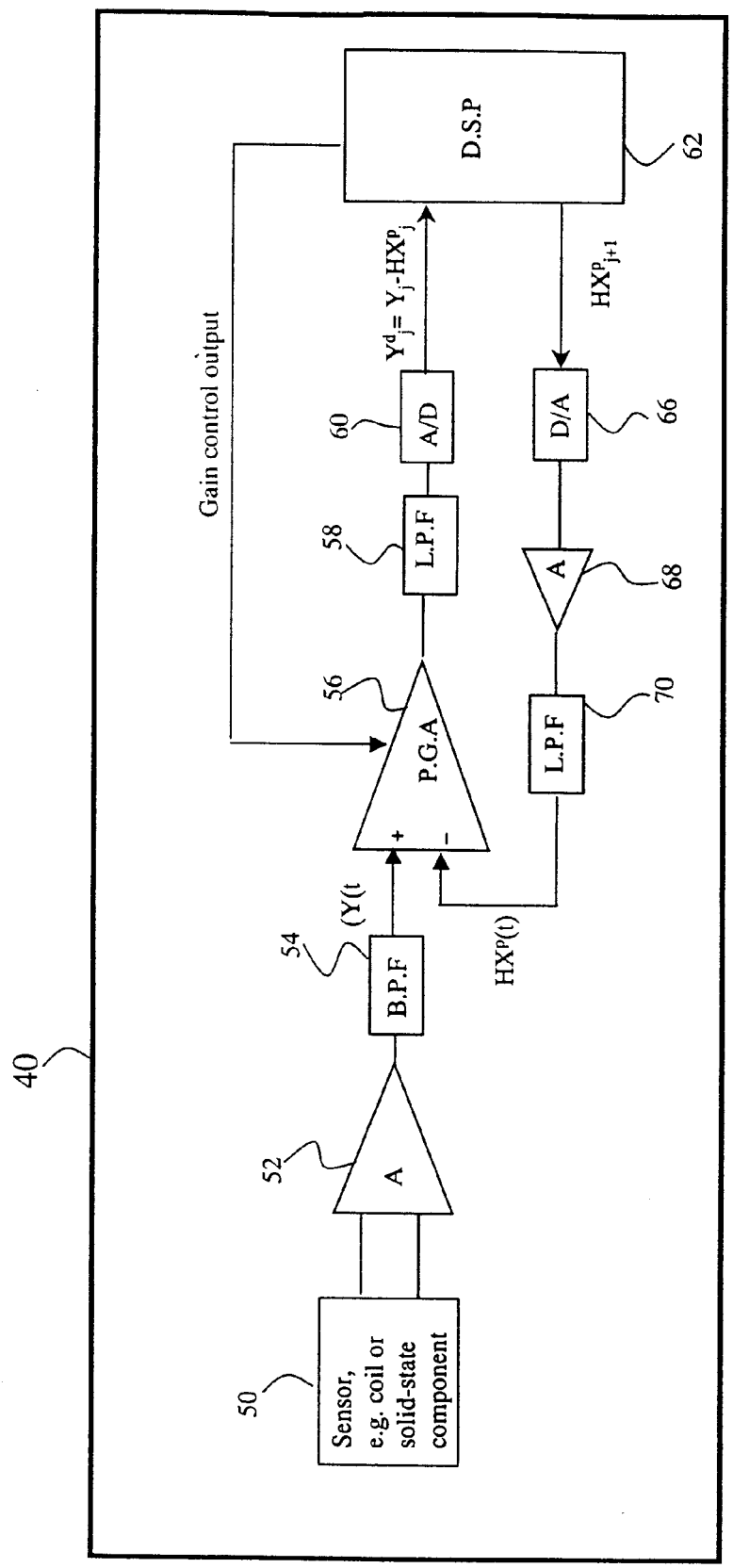
FIG. 2 is a simplified block diagram illustration of a first preferred embodiment of an individual one of the positioning sensors of FIG. 1.
Figure 3:
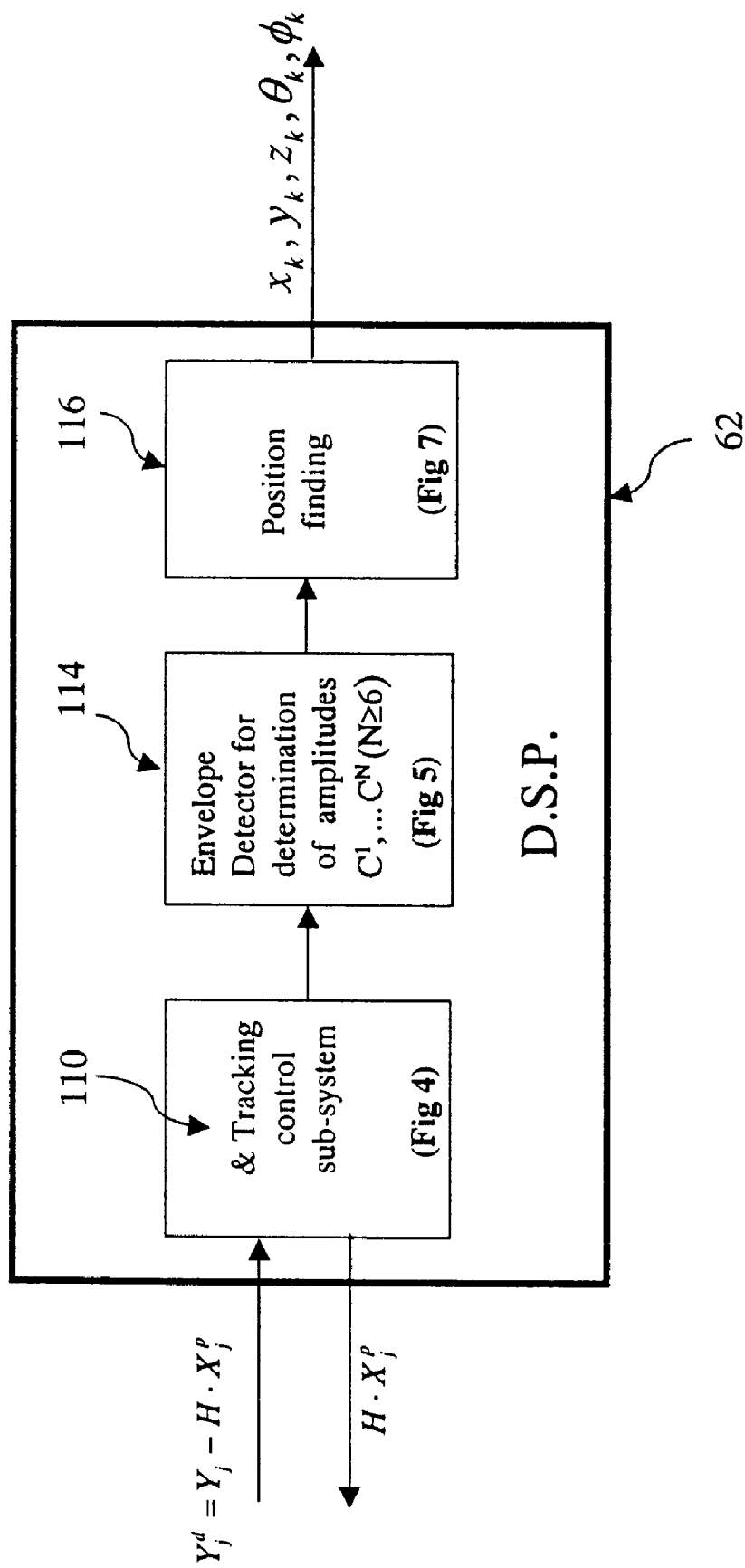
FIG. 3 is a simplified block diagram illustration of a first preferred digital signal processing unit useful in the sensor of FIG. 2.

Detector 50 may comprise a one-axis antenna coil as illustrated in FIG. 2, or may alternatively comprise any other suitable type of one-axis magnetic field detector, such as a Hall-effect detector or a solid state component e.g. a magneto-resistive detector or a magneto-diode or a magneto-transistor. The digital signal processor unit 62 comprises three modules: a tracking and control module 110, an envelop detector module 114 and a position determination unit 116 (FIG. 3). The tracking and control subsystem 110 is operative to increase the precision of the position determinations by decreasing the dynamic range of the input signal to the A/D converter.

The output of block 110 is supplied to an envelope detector 114, which is operative to determine the received envelope amplitudes (magnitude and sign) $C^1, \ldots, C^N$ of the N magnetic signals received from the N RF transmitters. The tracking and control subsystem 110 of FIG. 4 preferably comprises a Linear Predictive Coding (LPC) module. Block 114 is described schematically in FIG. 5 and comprises of N identical envelope detectors (ED's) working in parallel. One of the ED's is described schematically in two variations. The first configuration is shown in FIG. 6a, where each of the ED modules comprises two sub-modules: a Phase Lock Loop (hereafter PLL) 132, described in detail below with reference to FIG. 6b and a System Synchronization Unit 420, which is called during the operation of the ED module to define the absolute sign of the signal amplitude. An alternative configuration of an ED module is described in FIG. 6c. In this configuration, each ED module comprises three sub-modules operating in parallel and another sub-module that is called when a system synchronization is needed (see below). The three modules are: a Phase Lock Loop 132 (hereafter PLL), a Non-coherent absolute value envelope-detector 133, and a Sign Detection Unit 415. The fourth sub-module, a System synchronization unit 420, is then called to define the absolute sign of the signal amplitude.

The output of the envelope detector 114 is supplied to the position determination unit 116. Unit 116 is operative, based on the signed amplitude values supplied by unit 114, to provide an output indication of the position of the magnetic field detector 50 in sensor 40.

The position determination of module 116 is based on solving N analytic equations with N unknowns.

A genetic algorithm is implied for solving the position equation to obtain the position and orientation of the detector 50, described in detail below with reference to FIG. 7 and FIG. 8.

Figure 1A:
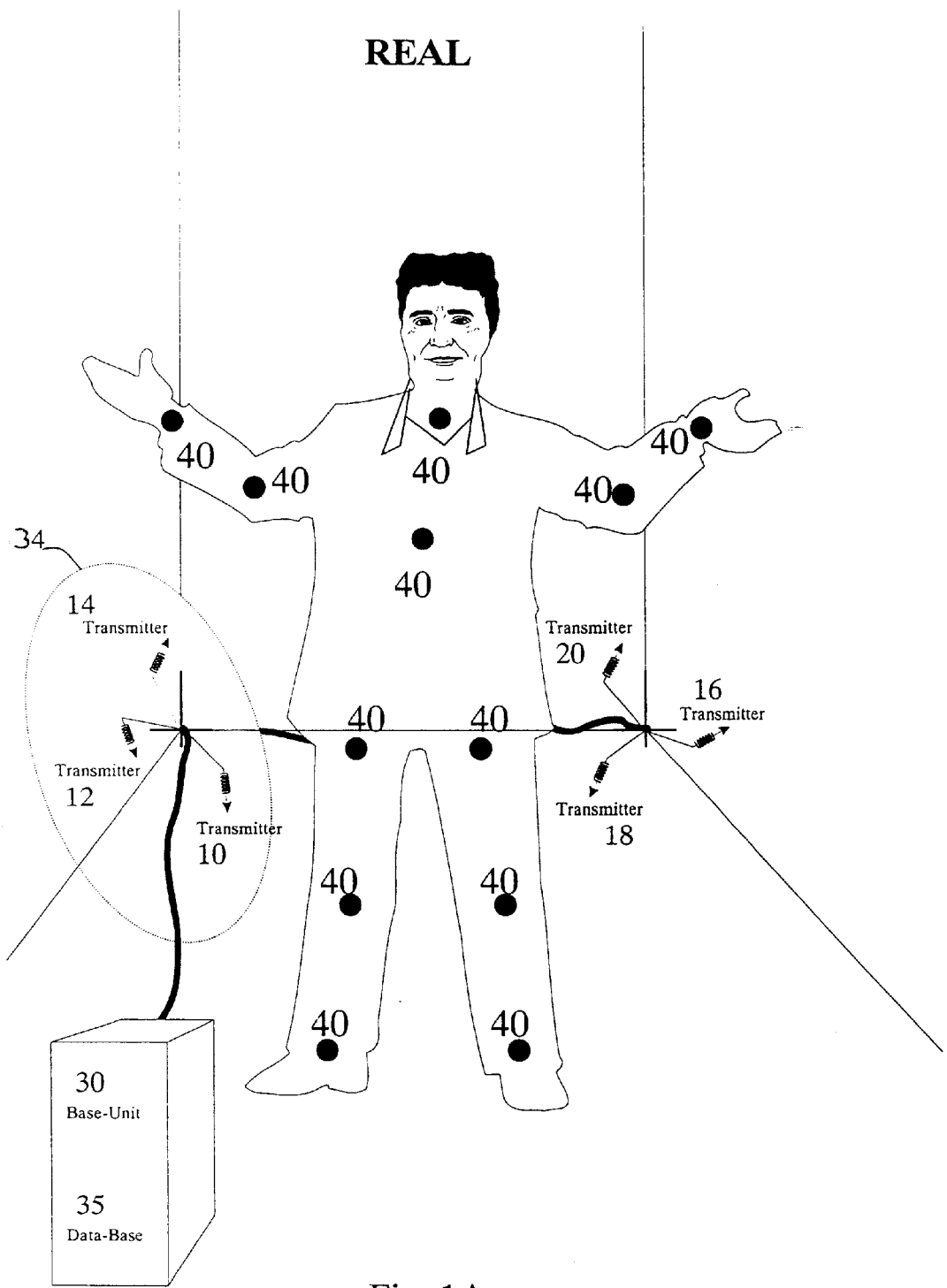

Reference is now made to FIG. 1a, which is a simplified pictorial illustration of a positioning system constructed and operative in accordance with a preferred embodiment of the present invention. The system of FIG. 1a preferably outputs the spatial and/or angular position of an object, such as a human user, as a whole or of parts thereof, such as, in the illustrated embodiment, body parts of the human user.

The positioning system of FIG. 1a comprises N>=6 (at least 6) RF transmitters 10, 12, 14, 16, 18 and 20, each of which preferably comprises a mutually non-parallel antenna coil. Each transmitter defines an active axial direction, e.g. the axis of the coil if the transmitter comprises a coil.

The six (in the illustrated embodiment) antenna coils each transmit at a different frequency f1, . . . , f6 respectively and each produce a magnetic field. The coils are preferably arranged such that, for each of the three orthogonal axes, there exists at least two antenna coils whose magnetic fields each have a component substantially along that orthogonal axis. For example, the coils may be mutually arranged such that there are two triplets of antenna coils and each triplet of antenna coils includes, for each of the three orthogonal axes, at least one antenna coil whose magnetic field has a component along that orthogonal axis.

In the specification, for simplicity, the number of antenna coils is assumed to be 6, however, it is appreciated that any suitable number N of antenna coils in excess of 6 may be employed, particularly for redundancy purposes.

It is a particular feature of a preferred embodiment of the present invention that the antenna coils need not be exactly mutually orthogonal and certainly need not be arranged such that the centers of the antenna coils coincide. This is advantageous because it allows greater flexibility in positioning the antenna coils in the range in which the object is known to move, such that the antenna coils are well distributed such that the object can be accurately and rapidly positioned in all portions of the range. Also, this tends to cut down production costs because it is not necessary to precision-position the coils in a mutually orthogonal configuration.

In accordance with a preferred embodiment of the present invention, each of the at least six RF transmitters 10, 12, 14, 16, 18 and 20 comprises an oscillator which provides a sinusoidal signal output. Preferably, the signal outputs from the signal sources are in the range of 1–100 KHz, and preferably in the range of 9–14 KHz.

In accordance with a preferred embodiment of the present invention, a positioning sensor 40 is provided for sensing the spatial and/or angular position of a magnetic field detector (50 in FIG. 2) included therein. The positioning sensor also, of course, senses the spatial and/or angular position of any objects which are fixed with respect to the magnetic field detector 50 of FIG. 2. The spatial and/or angular position is typically computed relative to a predetermined reference coordinate system. A preferred implementation of sensor 40 is described in detail below with reference to FIG. 2.

It is a particular feature of a preferred embodiment of the present invention that positioning sensor 40 employs a single magnetic detector (50 in FIG. 2) which outputs to an on-board digital signal processor circuit (62 in FIG. 2), which, in turn, provides an output indication of the spatial and angular positions of detector 50, each in three dimensions.

The detector 50 may comprise a multi-axis magnetic detector. Alternatively, the detector 50 may comprise a one-axis antenna coil, as illustrated in FIG. 2, or may alternatively comprise any other suitable type of one-axis magnetic field detector, such as a Hall-effect detector or a solid state component e.g. a magneto-resistive detector or a magneto-diode or a magneto-transistor.

The sensor 40 is attached to a moving object or individual 30, such as a person, whereas the RF transmitters are stationary. If the moving object or person 30 is not rigid, there may be a plurality of sensors 40 and each of these is attached to a corresponding one of a plurality of portions of the moving object or individual as shown in FIG. 1a. This allows monitoring of the spatial and angular positions of these individual portions.

The term "moving object" is intended to refer to an object of interest which is moving at least a part of the time or which has at least one part which is moving at least a part of the time. Alternatively, the "moving object" may not itself be in motion but its position relative to another object which is sometimes in motion, is of interest. In summary, the term "moving object" is intended to refer to any object whose absolute or relative location is of interest to a user.

The RF transmitters may be fairly close together, e.g. even less than one meter apart however, most advantageously, they are as far apart as is feasible, depending on the application.

A particular feature of a preferred embodiment of the present invention is that localization is performed despite the fact that the dynamic range of the amplitudes $C^1, \ldots, C^6$ of the at least six magnetic signals generated respectively by the six transmitter coils 10, 12, 14, 16, 18 and 20 is typically very large. More generally, there are N amplitudes $C^1, \ldots, C^N$, however, for simplicity, the specification sometimes follows the example wherein N=6.

Figure 1B:
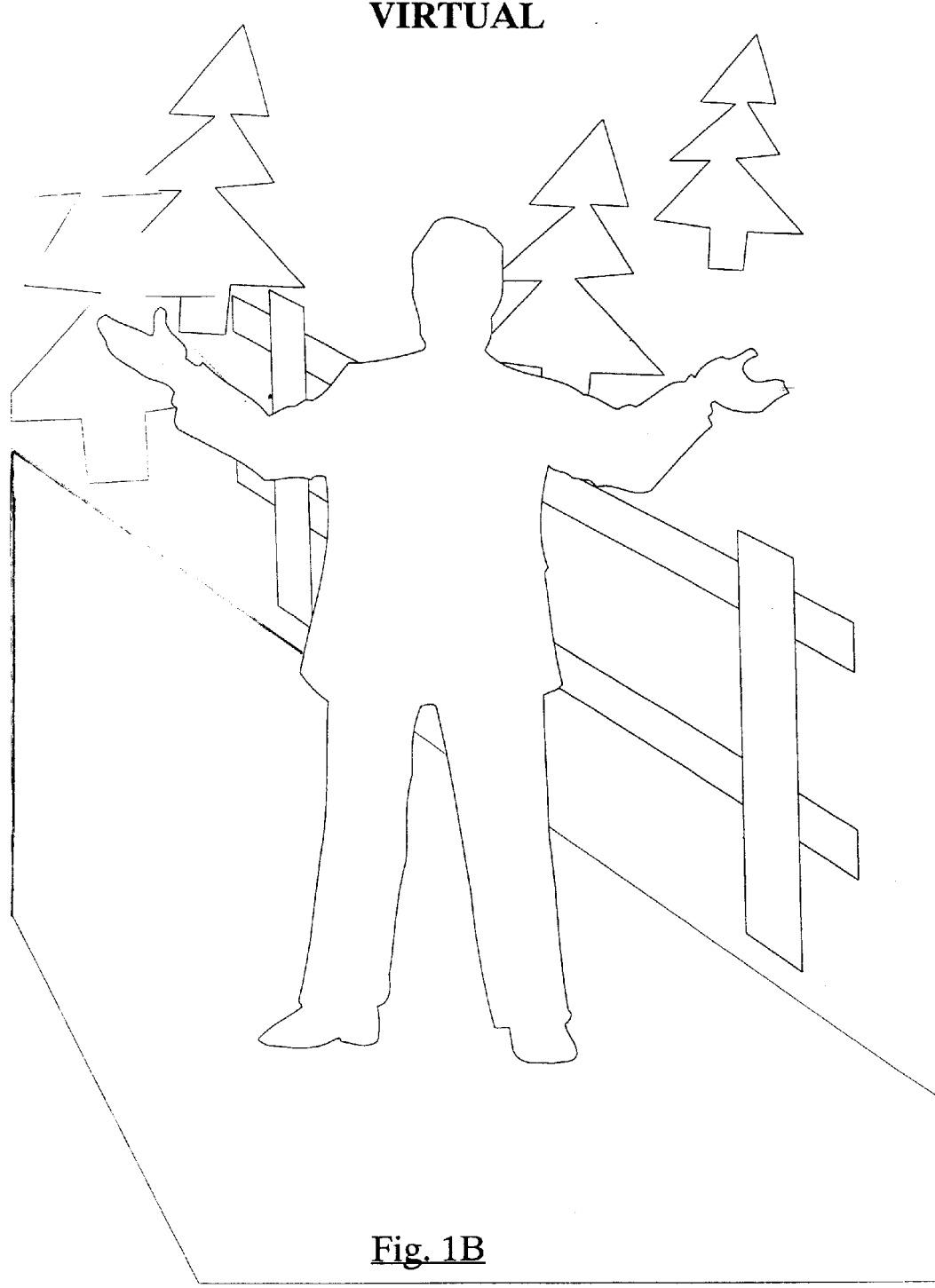

FIG. 1b is a display image generated by a virtual reality application of the system of FIG. 1a. A virtual reality system receives the position outputs generated by the system of FIG. 1a and generates the display image of FIG. 1b which includes a computer-generated scene (fence, path and trees in the illustrated embodiment) and a figure having body part motion which mimics the body part motion of the human user of FIG. 1a as detected by the positioning system of FIG. 1a.

Figure 1C:
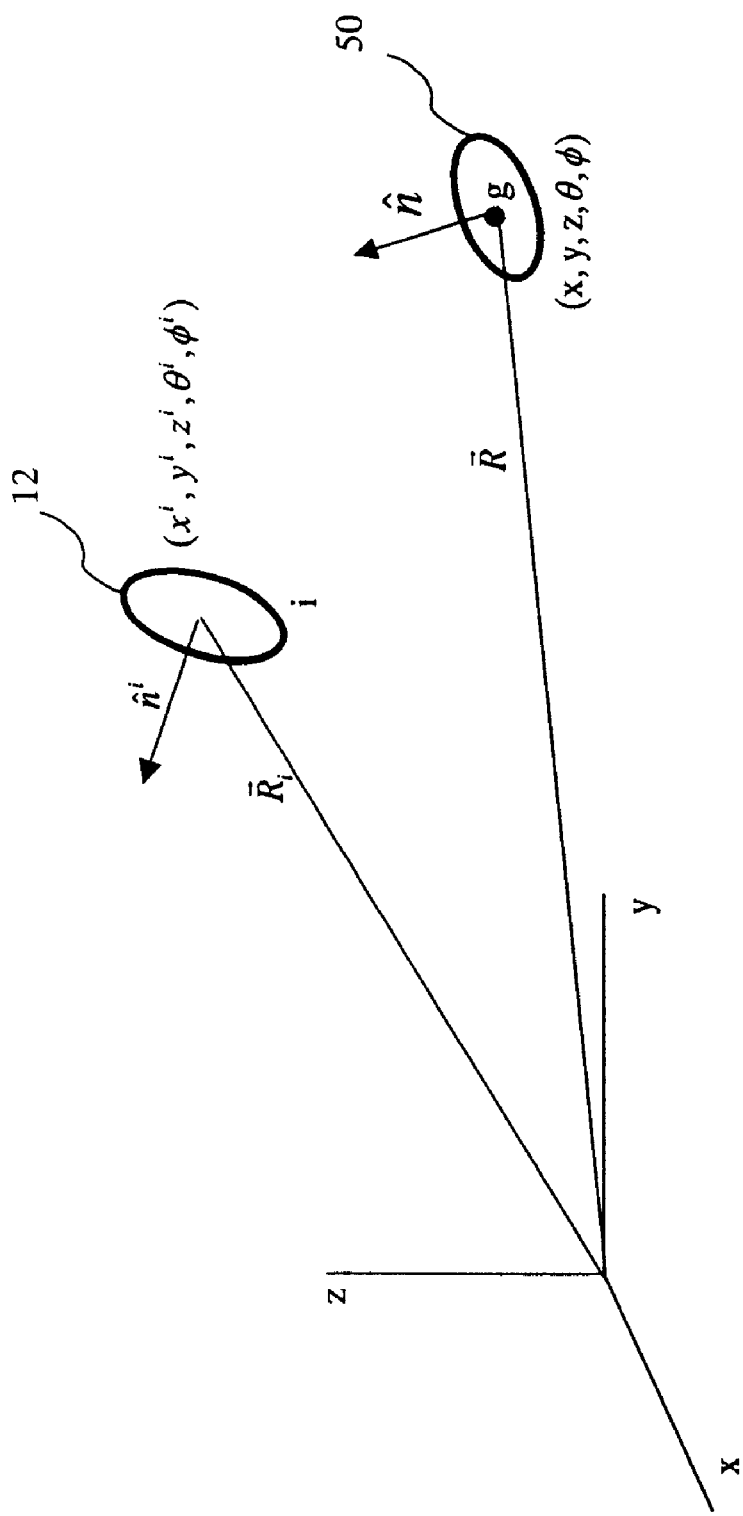
FIG. 1c is a detailed diagrammatic illustration of an RF transmitter and a positioning sensor provided in accordance with a preferred embodiment of the present invention.

FIG. 1c is a detailed diagrammatic illustration of one of the N RF transmitters of FIG. 1a, such as RF transmitter 12, and one of the detection coil 50 of the positioning sensors 40 provided in accordance with a preferred embodiment of the present invention. As shown, the spatial and angular position of the i'th RF transmitter (i=1, ..., N) is denoted as ($x^i$, $y^i$, $z^i$, $\theta^i$, $\phi^i$ including its quadrant) and the spatial and angular position of an individual positioning sensor 40 is denoted as (x, y, z, $\theta$, $\phi$ including the sensor's quadrant).

Referring to FIG. 1c the magnetic field at the point g at the center of the magnetic detector 50 due to a current flowing in a thin conducting circular loop representing the source i is well known in the literature and may be expressed in terms of Elliptic integrals of the first and second kind as described in J. D. Jackson, *Classical Electrodynamics,* Wiley, Second Ed., 1975, Chapter 5, p. 178. Since working with such integrals is cumbersome, it is alternatively possible to use approximate expressions as described herein.

When the distance between origin and the i'th source loop center ($\vec{r}^i$) to the point of observation ($\vec{r}$) is large in comparison with the loop radius $a^i$, (where $a^i << |\vec{r}-\vec{r}^i|$), the exact integral can be expanded into a power series $$\frac{a^i}{|\vec{r}-\vec{r}^i|}$$

which is known to be small. The magnetic field may thus be written as:

$$B^i = B_I^i + B_{II}^i + \ldots \qquad (1)$$

The first and the sum of the first and the second terms of the power series is given by Equations 2 and 3 respectively:

$$\vec{B}_I^i = \frac{\beta^i}{|\vec{r}-\vec{r}^i|^3}\left[\frac{3\cdot(\vec{r}-\vec{r}^i)\cdot[(\vec{r}-\vec{r}^i)\cdot\hat{n}^i]}{|\vec{r}-\vec{r}^i|^2} - \hat{n}^i\right], \quad i=1,2,\ldots,N \qquad (2)$$

where $\hat{n}^i$ is the unit vector representing the normal to the RF transmitter coil plan, if a one-axis antenna coil is used as the transmitter, and:

$$\vec{B}_I^i + \vec{B}_{II}^i = \frac{\beta^i}{|\vec{r}-\vec{r}^i|^3}\left[\frac{3\cdot(\vec{r}-\vec{r}^i)\cdot[(\vec{r}-\vec{r}^i)\cdot\hat{n}^i]}{|\vec{r}-\vec{r}^i|^2}(1-\delta) - \hat{n}^i(1-\gamma)\right], \qquad (3)$$

$$i=1,2,\ldots,N$$

where:

$$\left|\begin{matrix}r & r\\ r & -r^i\end{matrix}\right| = \sqrt{(x-x^i)^2 + (y-y^i)^2 + (z-z^i)^2} \qquad (4)$$

and:

$$\beta^i = \frac{\mu_0 A^i \cdot T^i \cdot I^i(t)}{4\pi} \qquad (5)$$

$$\delta = \frac{5}{3}\left(\frac{a^i}{|\vec{r}-\vec{r}^i|}\right)^2\left[-3 + 7[\vec{r}-\vec{r}^i]\cdot\hat{n}^i]^2\right] \qquad (6)$$

$$\gamma = \frac{9}{8}\left(\frac{a^i}{|\vec{r}-\vec{r}^i|}\right)^2\left[-1 + 5[\vec{r}-\vec{r}^i]\cdot\hat{n}^i]^2\right] \qquad (7)$$

where:

$I^i(t)$=the current in the loop i, all the currents in the system are assumed harmonically time dependent;

$A^i$=the $i^{th}$ source coil area.

$T^i$=the number of turns in the ith source coil;

$I^i$=the current in the ith source coil; and the magnetic permeability ($\mu$) in the air is given by $\mu=\mu_0\mu_r$, where $\mu_r$ is the magnetic permeability of the transmitter core.

The accuracy of the first term of the series $B_I^i$ is improved as the quotient of $$\frac{a^i}{|\vec{r}-\vec{r}^i|}$$

gets smaller because the inaccuracy is of the order of the square of the quotient of $$\frac{a^i}{|\vec{r}-\vec{r}^i|}.$$

For example, when the quotient is greater than 0.05, the expected error of the above approximation is of the order $10^{-4}$. However, the condition of $a^i << |\vec{r}-\vec{r}^i|$ is not always fulfilled, especially in cases where the transmitters are distributed throughout the entire volume of the object's range, in order to improve system performance. In these cases, the second term in Equation 1 becomes significant. When detector 50 comprises a coil, then assuming that the detector coil's radius is very small relative to the transmitter coil, the electromagnetic force $\epsilon^i$ induced on the coil 50 by the transmitter coil i located at coordinates $\vec{r}^i$ is given by:

$$\varepsilon^i = \frac{d}{dt}\left[\vec{B}^i \cdot \hat{n}\right] \cdot A^d = \frac{x^i}{\left|\vec{r} - \vec{r}^i\right|^3}\left[\frac{3}{\left|\vec{r} - \vec{r}^i\right|^2}(D_1 \cdot D_2) - D_3\right], \quad (8)$$

$$i = 1, 2, \ldots, N$$

where:

$$x^i = \frac{dI^i}{dt} \cdot A^d \cdot T^d \quad (9)$$

Preferably the transmitter coil is driven by a time harmonic dependent current, and thus:

$$\chi^i = \omega^i \cdot A^d \cdot T^d \quad (10)$$

where $$\omega^i = 2\pi f \quad (11)$$

ω is the angular frequency of the current in source i and $A^d$=Is the detector's coil area.

$T^d$=Is the number of turns in the detector coil and $$D_1 = \sin\theta^i \cos\phi^i(x-x^i) + \sin\theta^i \sin\phi^i(y-y^i) + \cos\theta^i(z-z^i) \quad (12)$$

$$D_2 = \sin\theta \cos\phi(x-x^i) + \sin\theta \sin\phi(y-y^i) + \cos\theta(z-z^i) \quad (13)$$

$$D_3 = \sin\theta^i \cos\phi^i \sin\theta \cos\phi + \sin\theta^i \sin\phi^i \sin\theta \sin\phi + \cos\theta \cos\theta^i \quad (14)$$

Figure 8:
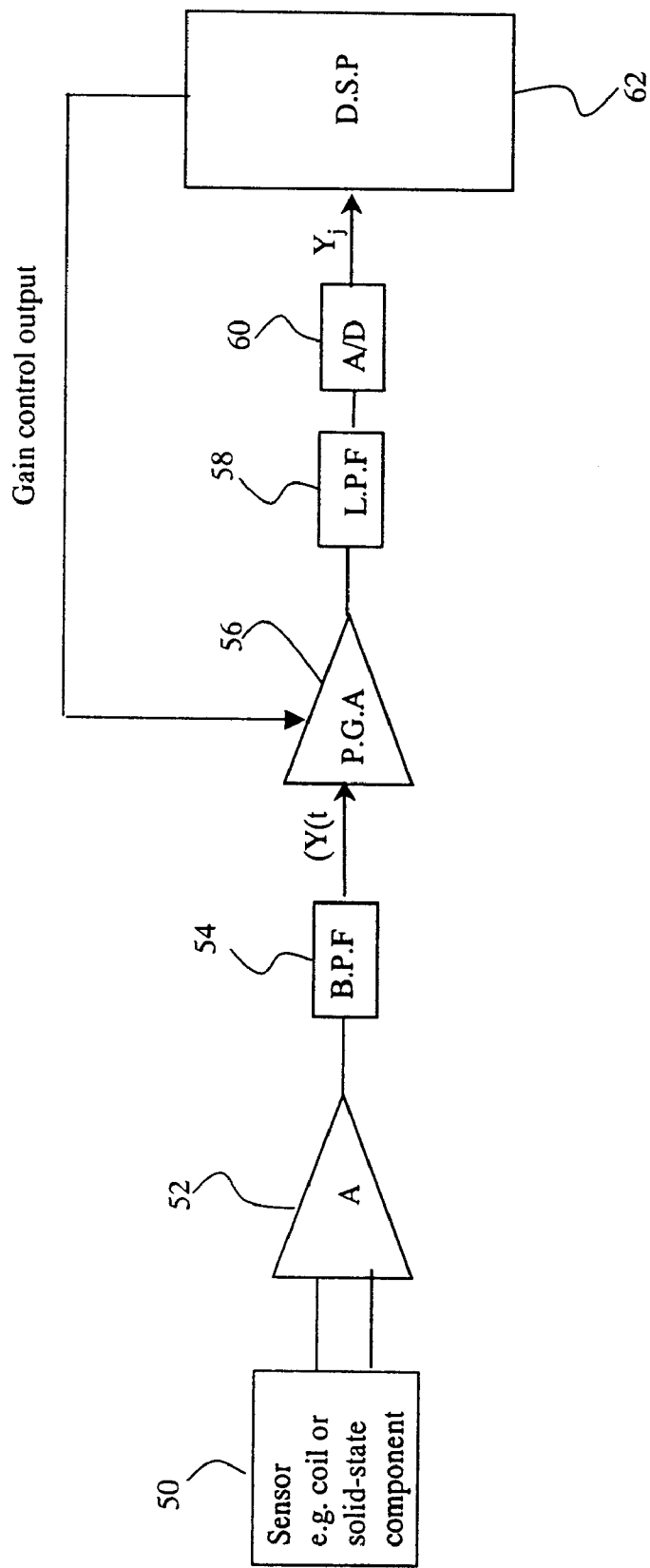
FIG. 8 is a simplified block diagram illustrations of a second preferred embodiment of an individual one of the positioning sensors of FIGS. 1a–c.

The voltage induced by the i'th source, at point Y(t) in the sensor circuit shown in FIG. 2, is given as follows:

$$V^i = C^i \lambda^i \quad (15)$$

where:

$$C^i = \frac{1}{\left|\vec{r} - \vec{r}^i\right|^3}\left[\frac{3}{\left|\vec{r} - \vec{r}^i\right|^2}(D_1 \cdot D_2) - D_3\right], i = 1, 2, \ldots, N \quad (16)$$

and:

$$\lambda^i = \frac{\mu_0 A^i \cdot T^i \cdot I^i \cdot \chi^i \cdot \Psi(\omega^i)}{4\pi} \quad (17)$$

where Ψ is the transfer function of the coil and its front-end electric circuit up to the point Y(t) in FIG. 2 or FIG. 8.

The transformation between the Cartesian notation to the polar notation is given by the following system of three equations;

$$\begin{cases} \cos\alpha = \sin\theta\cos\phi \\ \cos\beta = \sin\theta\sin\phi \\ \cos\gamma = \cos\theta \end{cases} \quad (18)$$

In order to specify the position and orientation of the sensor there are preferably at least 6 sources positioned at 6 respective different locations in space such that the projection on the axes of the Cartesian coordinate system of 3 out of the N>=6 sources form an orthogonal set. The 6 sources allow the 5 coordinates (x, y, z, θ, ψ) of spatial and angular position to be derived, plus a sign which removes the ambiguity of the direction of the normal vector from the sensor coil.

Figure 1D:
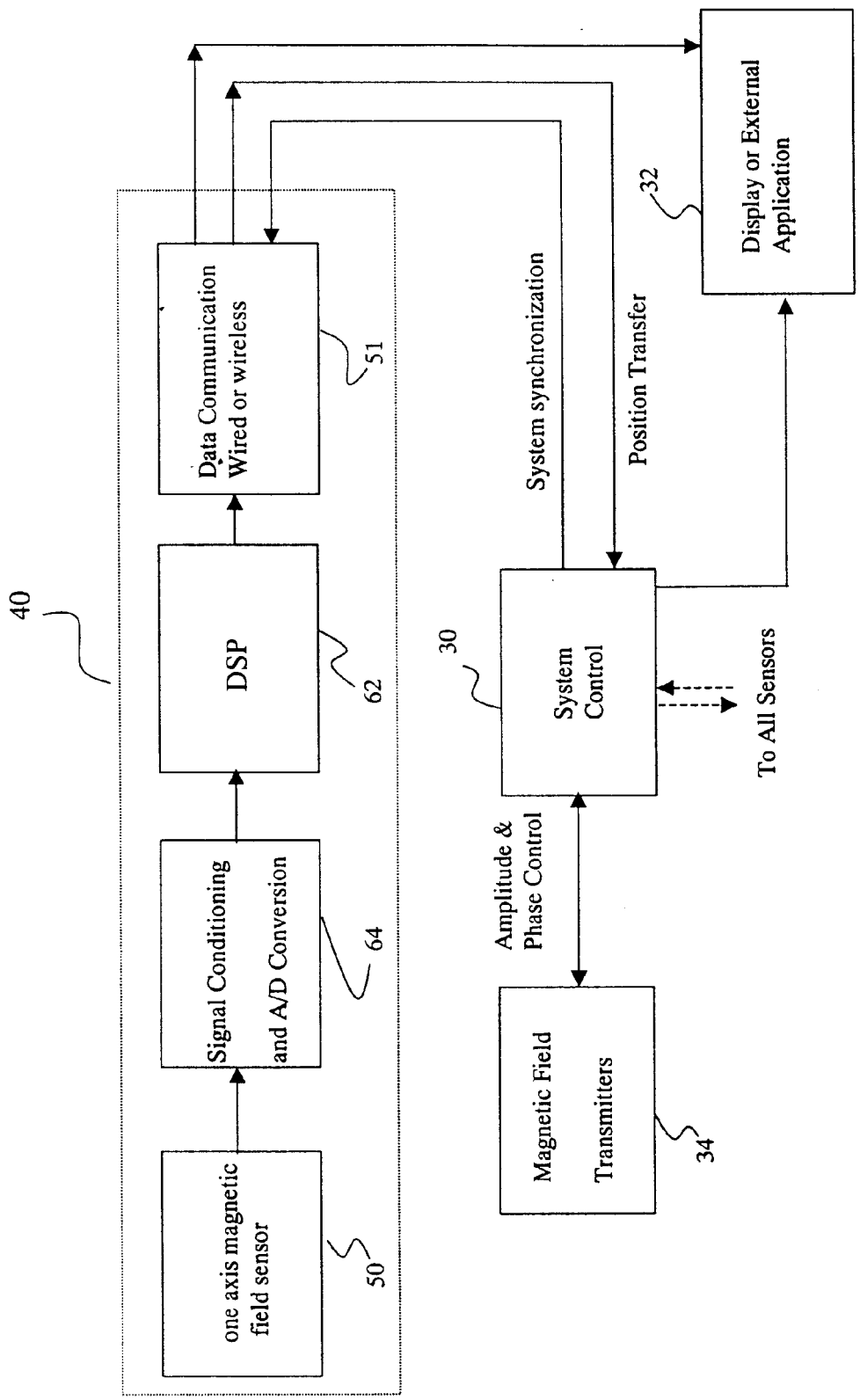

A block diagram of the disclosed system is shown in FIG. 1d. The magnetic field transmitters block 34 comprises of N transmitters, where N≧6. These transmitters radiate simultaneously at N different frequencies. The amplitude and phase of each of the N transmitters is controlled by the system control block 30. The magnetic field is detected by a magnetic field detector block 50. The output of the magnetic signal detector 50 is a voltage signal proportional to the superposition of the N magnetic field transmitters at the coordinates $x^i$, $y^i$, $z^i$, $\theta^i$, $\phi^i$. This signal is introduced to the signal conditioner block and A/D converter block 64, which amplifies and filters the input signal to a proper bandwidth around the system working frequencies. The signal is then digitized by the Analog to Digital (A/D) converter and is transferred to the Digital Signal Processor (referred to as DSP hereafter) block 62 as an input data. Another input data introduced to the DSP is the synchronization signal through the communication module 51 which receives the synchronization data from the system control 30 by the use of a wire line or wireless. The synchronization signal determines the signals polarity at the detector 50 relative to the magnetic transmitters as described below. The synchronization input to the DSP block is updated at a very slow rate compared to the magnetic detector input, as described below. The digitized input data from the of the magnetic detector 50 is then used by the digital signal processor unit 62 to calculate the position and orientation coordinates of the magnetic detector 50. The output from the digital signal processor unit 62 is then transferred to the Data Communication unit 51 and then to the System Control Unit 30. The refresh rate of the output data is of the order of few times per second to a few hundred times per second.

The position data may then be transferred to the system control unit via wireline or wireless data communication procedure that may optionally display or further process the positioning information of sensor 40. The system control unit also controls the amplitudes and phases of the N magnetic transmitters in the system.

In accordance with a preferred embodiment of the present invention, the system control unit 30 in FIG. 1d, may be composed of a separate unit block 32 to collect spatial position data from all sensors 40 to be displayed or to be used by an external application unit. Alternatively, the positioning information from one or all sensors may directly be received by an external application unit.

Reference is now made to FIG. 2, which is a simplified block diagram illustration of a preferred implementation of an individual one of the positioning sensors 40 of FIG. 1a. As shown, a magnetic field detector 50 (such as, in the illustrated embodiment, a coil), outputs via an amplifier 52 and a bandpass filter (BPF) 54 to a programmable differential amplifier (also termed herein PGA or "programmable gain amplifier") 56 having programmable gain control. The two inputs to the differential amplifier 56 are Y(t) and $HX^p(t)$ which is the best prediction to the signal Y at the time t. The differential amplifier 56 outputs an analog signal which is proportional to $Y^d(t)=Y(t)-HX^p(t)$. The analog signal is passed through a low pass filter 58 which removes disturbances and noise above the working frequencies. This signal is digitized by an A/ID converter 60 and introduced to digital signal processing circuitry 62. Digital signal processing circuitry 62, whose operational modes will be described below in detail, provides a gain-control output to differential amplifier 56 and also provides a feedback output via a digital-to-analog converter 66, and preferably via an amplifier 68 and a low pass filter 70, to a feedback input of differential amplifier 56.

The feedback output of the DSP unit 62, which is the best discrete prediction of Y(t), is termed herein $HX^p_j$.

Reference is now made to FIG. 3, which is a simplified block diagram illustration of a preferred implementation of the digital signal processing unit 62 in the sensor illustrated in FIG. 2.

Figure 9:
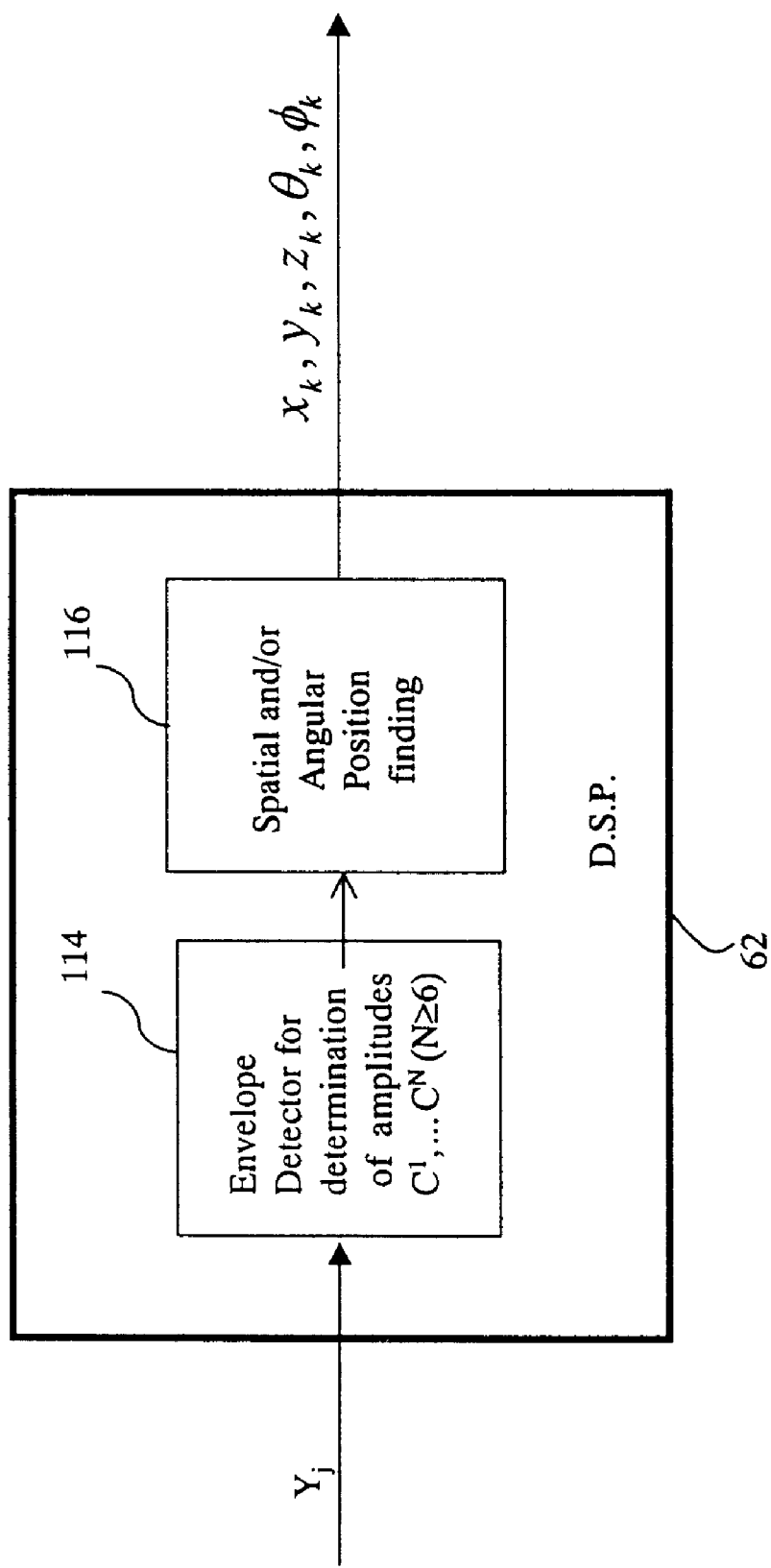
FIG. 9 is a simplified block diagram illustration of a preferred digital signal processing unit useful in the sensor of FIG. 9.

The apparatus of FIG. 3 includes a tracking and control subsystem 110 which is omitted in another implementation of DSP unit 62 (FIG. 9). The tracking and control subsystem 110 is a participant in a feedback loop shown in FIG. 2 and comprises unit 110 as well as units 66, 68 and 70. These units are operative to limit the dynamic range of the input signal Y(t) to A/D unit 60, which is advantageous because A/D unit 60 may then comprise a common and relatively low cost unit such as a 16 bit A/D converter.

Alternatively, the tracking and control subsystem of FIG. 3 and the feedback loop of FIG. 2 may be omitted, as shown in FIGS. 8 and 9 respectively. In which case the A/D unit 60 typically comprises a relatively high cost, high resolution unit such as a 20–24 bit A/D converter to get the same performances as with the tracking and control subsystem and the feedback loop.

It is a particular feature of a preferred embodiment of the present invention that the above units improve the dynamic range of the input signal without the need for further electronic components commonly used in the art.

The apparatus of FIG. 3 includes a tracking and control subsystem 110 which, for the reasons described above, is operative to increase the precision of the spatial and angular position determinations by sampling the output of sensor 40. Specifically, tracking and control subsystem 110 receives a digital input from A/D converter 60 (FIG. 2). Tracking and control subsystem 110 provides a digital output to the D/A converter 66 (FIG. 2). The functionality of tracking and control subsystem 110 is to manage a feedback loop which also includes amplifier 68, low pass filter 70, differential amplifier 56, and A/D converter 60, such that the A/D converter 60 operates on a relatively small dynamic range signal which is provided thereto by differential amplifier 56. The tracking and control subsystem 110 may for example comprise a Kalman filter such as the filter illustrated in FIG. 4.

Alternatively, any suitable curve-fitting method, such as cubic or higher order interpolation based on a suitable metric such as least squares, may be used to fit a curve to the output samples generated by A/D 60. Thereby the input signal Y(t) to the differential amplifier 56 is approximated to an acceptable degree.

The output of block 110 is a full dynamic range signal, which may have a dynamic range which is three orders of magnitude greater than that of the signal which passes through A/D converter 60.

The output of block 110 is supplied to an envelope detector 114, which is operative to determine the received envelope amplitudes (magnitude and sign) $C^1, \ldots, C^6$ of at least six magnetic carrier signals received from the six transmitter coils 10, 12, 14, 16, 18 and 20 respectively.

Figures 1, 10:
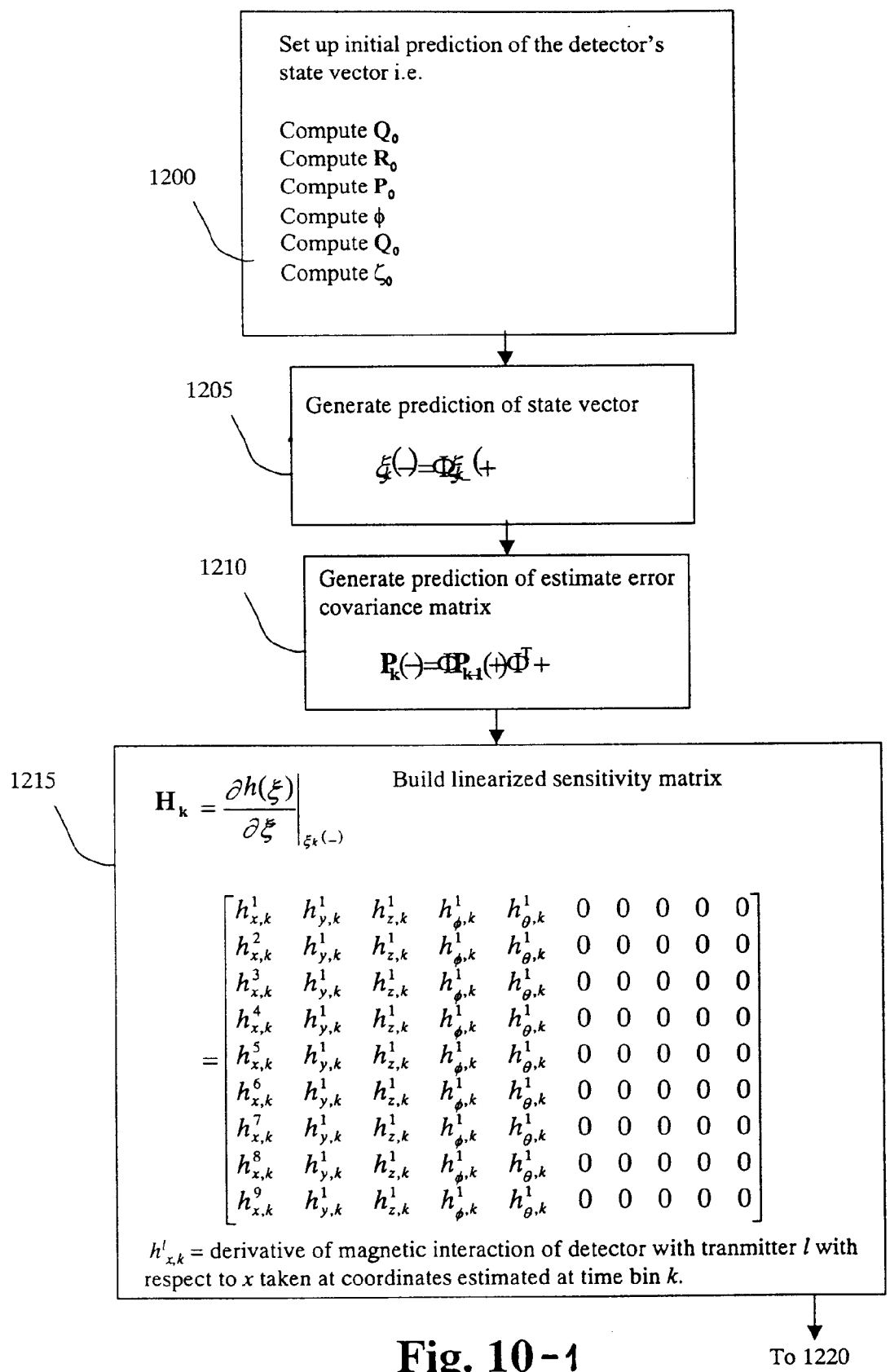
FIG. 10 is a simplified flow chart illustration of a preferred method of operation of a field equation based EKF-type tracking filter.
Figures 2, 10:
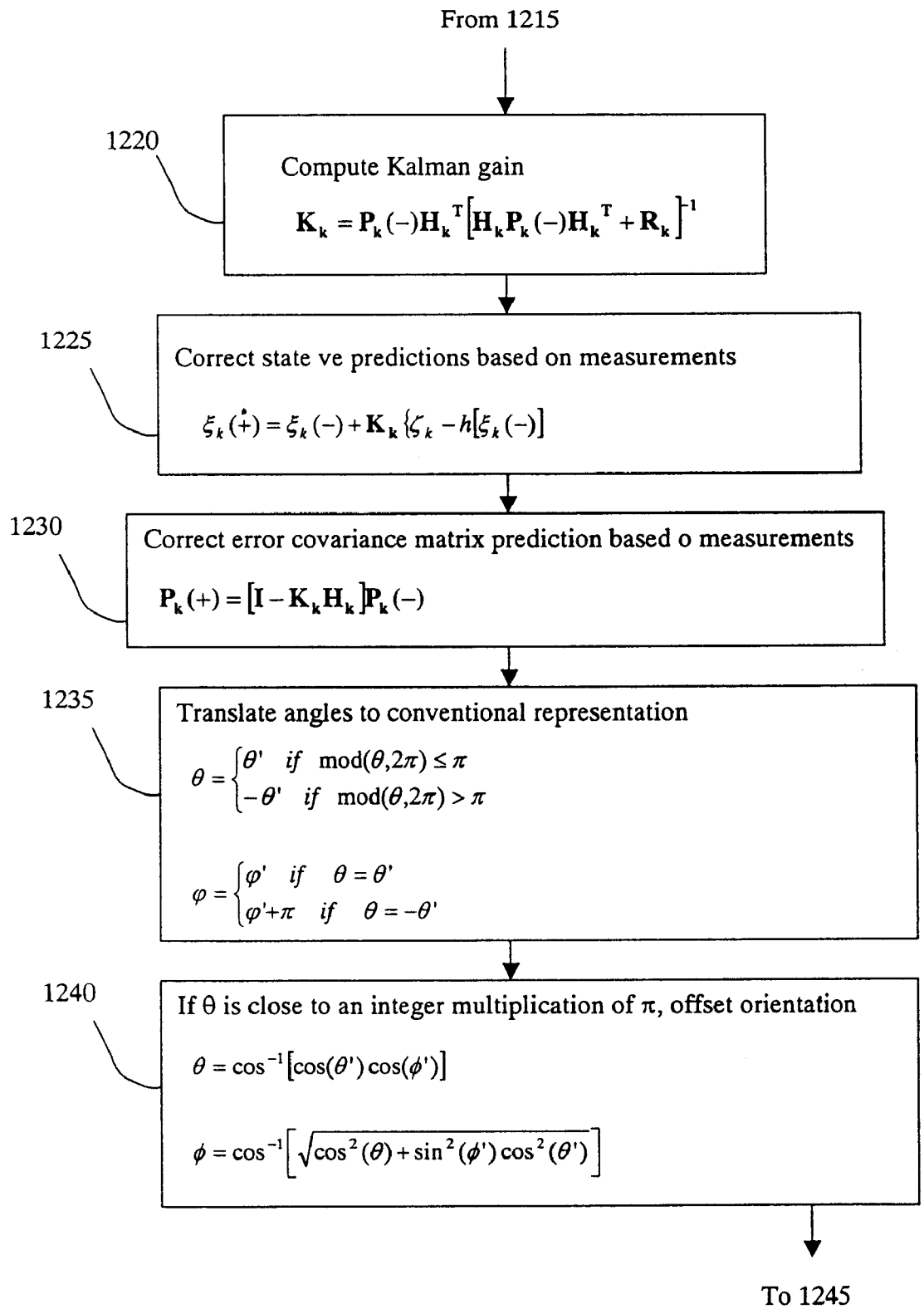
Figures 3, 10:
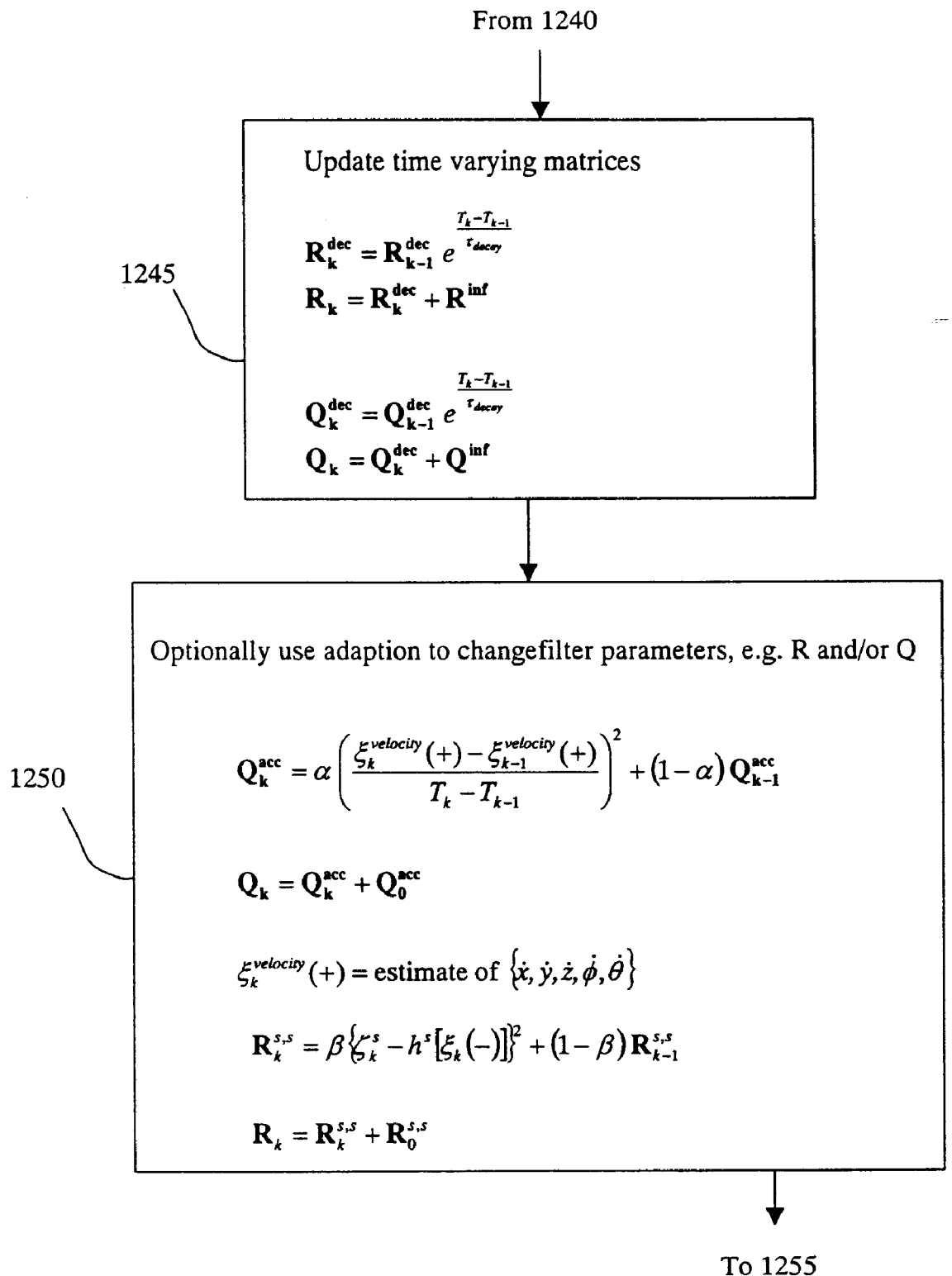

The output of the envelope detector 114 is supplied to the position determination unit 116. Unit 116 is operative, based on the signal amplitude values supplied by unit 114, to provide an output indication of the spatial and/or angular position of the magnetic field detector 50 in sensor 40 (FIG. 1). A preferred method of operation for the position determination unit 116, based on a genetic process for obtaining the final position and orientation of the object of interest, is described below with reference to FIGS. 7a–7c.

Figure 4:
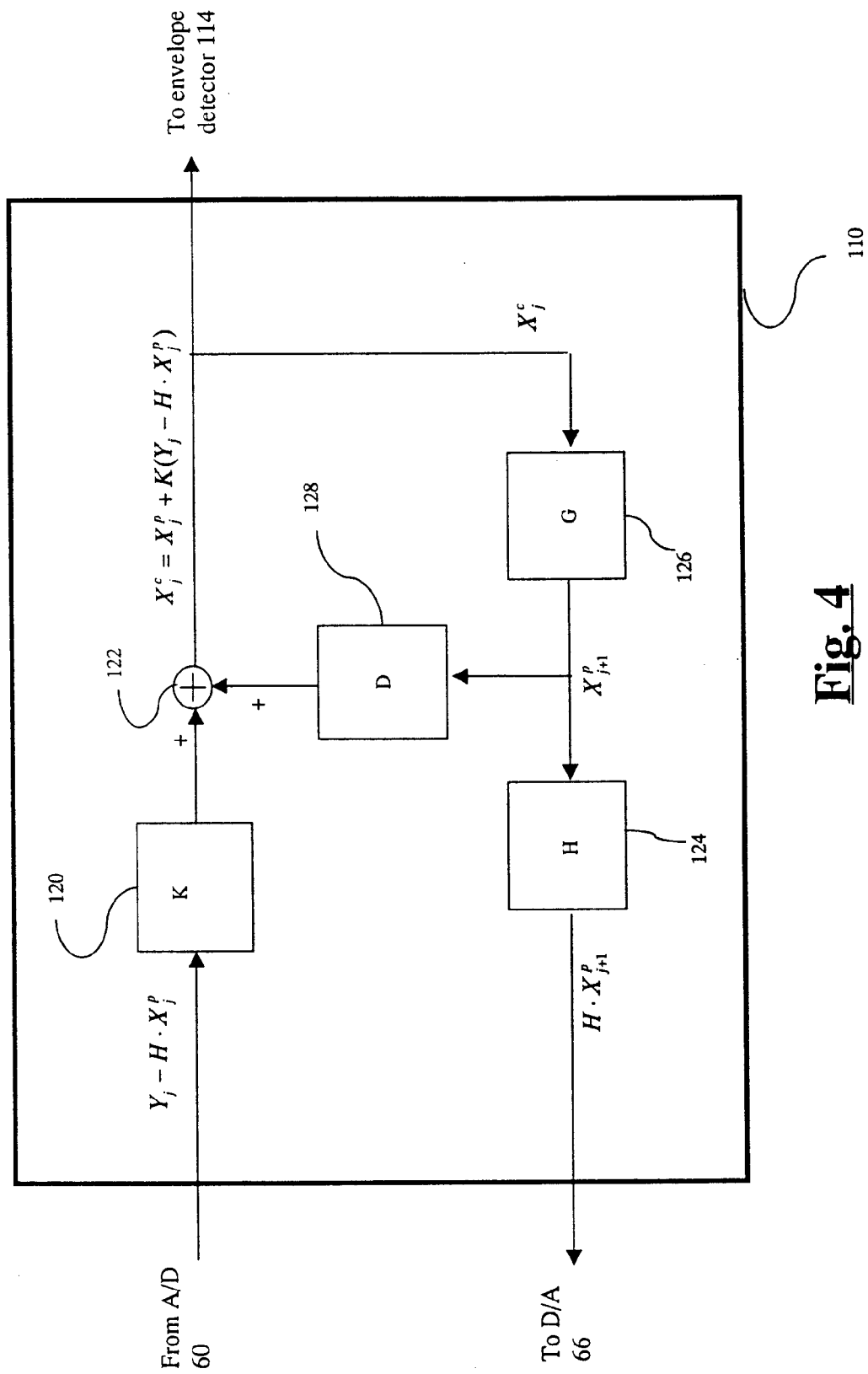
FIG. 4 is a simplified block diagram illustration of the tracking and control subsystem of FIG. 3, constructed and operative in accordance with a preferred embodiment of the present invention.

FIG. 4 is a simplified block diagram illustration of the tracking and control subsystem of FIG. 3, constructed and operative in accordance with a preferred embodiment of the present invention.

The tracking and control subsystem 110 of FIG. 4 preferably comprises an linear predictive Coding module (LPC) as described for example in *Digital Coding of Waveforms* by Jayant N. S., Englewood Cliffs, N.J.; Prentice Hall, 1984. The LPC module of FIG. 4 typically comprises several units interconnected as shown to generate an output signal comprising a best prediction to the input signal $Y_j$ where the index j is a sample index. The K block 120 may comprises a conventional Kalman gain unit or more generally any filter gain unit. The G unit 126 comprises a one step transition matrix. The D unit 128 provides a delay for synchronization between the input and the prediction vector. The H unit 124 comprises a coefficients matrix for selection of the prediction signal from the prediction vector.

The quantity $X^p$ is a vector of prediction for Y. The parameter $X^c$ is a vector of correction for $X^p$ and is obtained by computing a correction of the vector $X^c_j$ given $X^p_j$.

$$X_j^c = X_j^p + K(Y_j - H \cdot X_j^p) \tag{19}$$

The input $Y_j^d$ to the LPC module of FIG. 4, as shown, is the difference between the predicted signal $X_j^p$ (the prediction of $X_j$ given $X_{j-1}$) and the input signal $Y_j$, i.e.:

$$Y_j^d = Y_j - H X_j^p \tag{20}$$

The tracking and control system of FIG. 4 has two outputs, as shown, to the D/A unit 66 and to the envelope detector 114. The output to the envelope detector 114 is the best estimation to $Y_j$.

Figure 5:
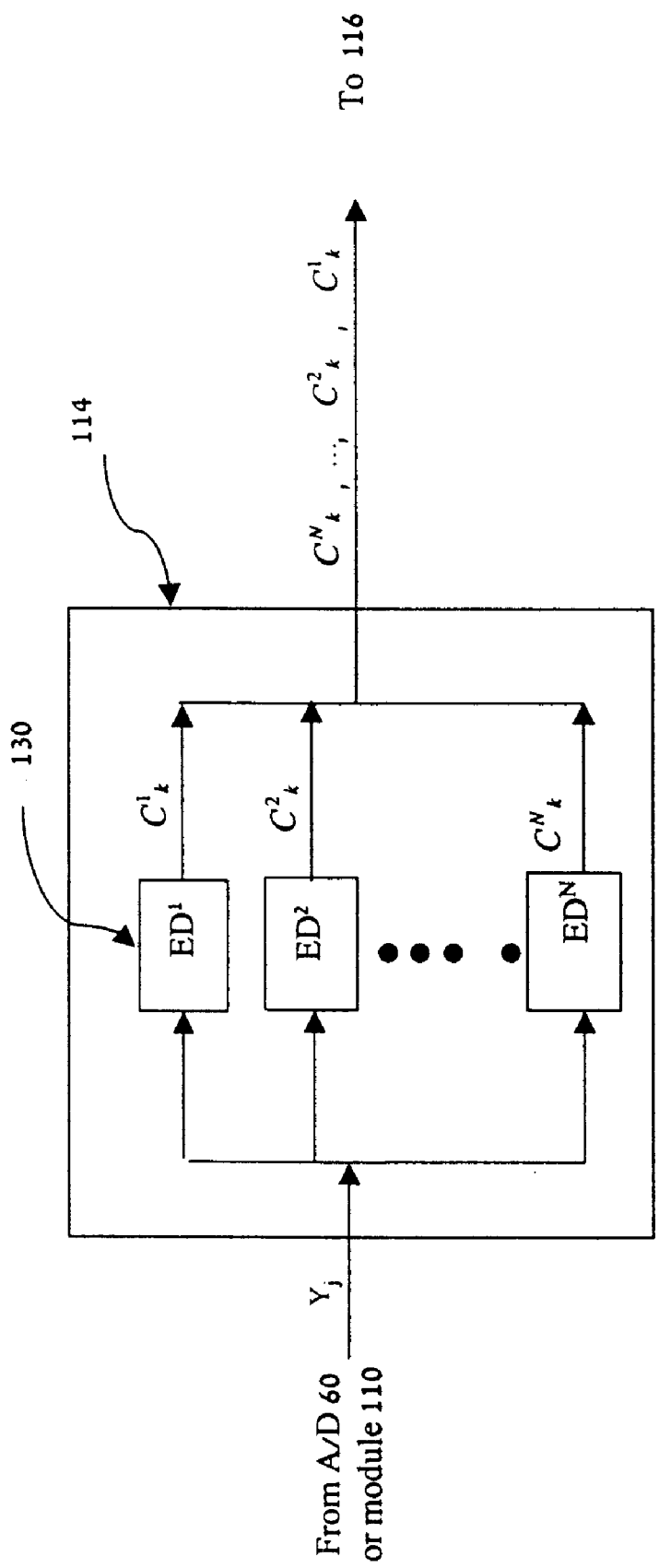
FIG. 5 is a simplified block diagram illustration of the envelope detector of FIG. 3, constructed and operative in accordance with a preferred embodiment of the present invention.
Figure 6A:
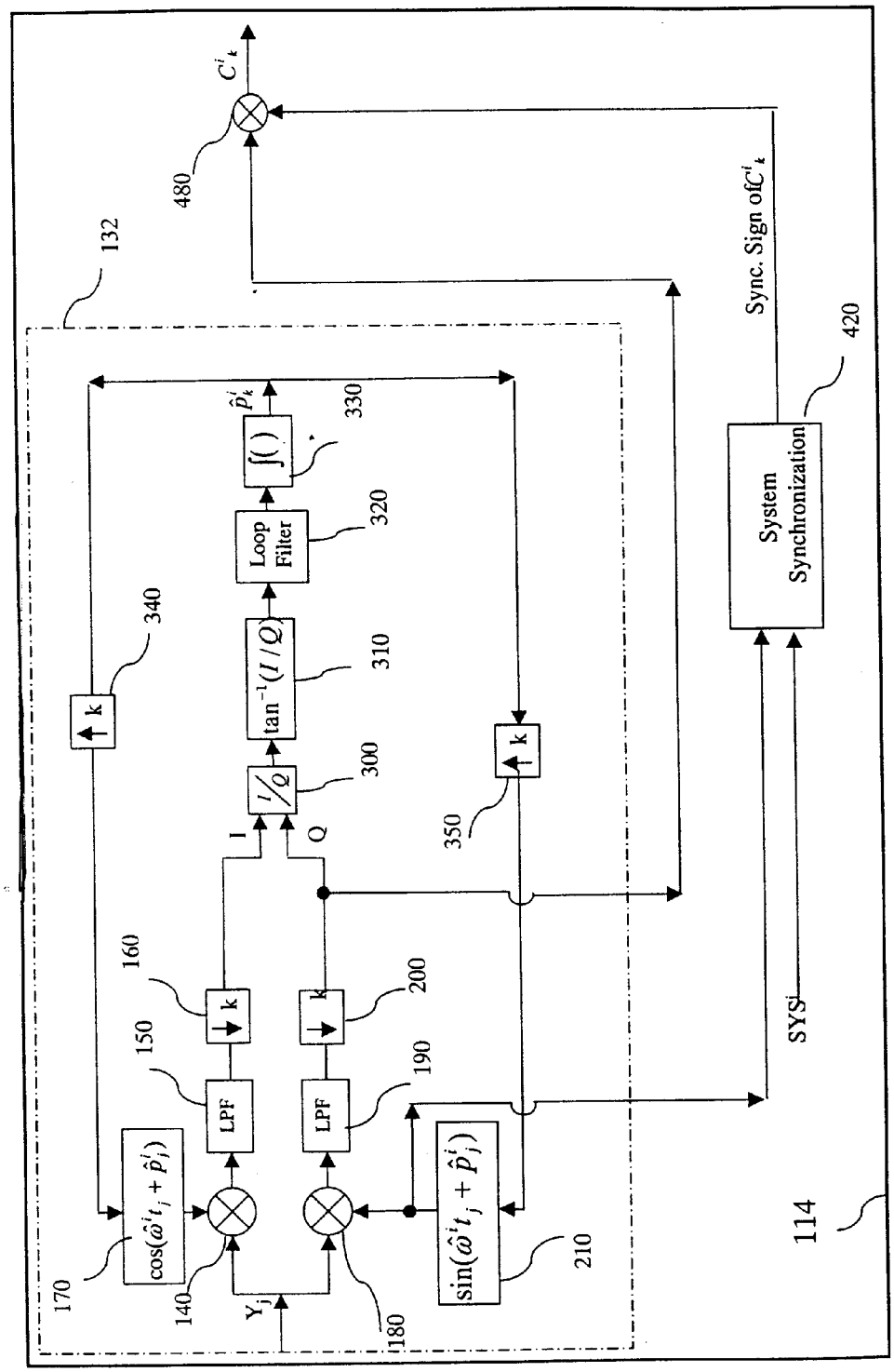
FIG. 6a is a simplified block diagram illustration of one of the envelope detecting (ED) modules of FIG. 5, constructed and operative in accordance with a preferred embodiment of the present invention.

FIG. 5 is a simplified block diagram illustration of the envelope detector 114 of FIG. 3, constructed and operative in accordance with a preferred embodiment of the present invention. As shown, the envelope detector 114 of FIG. 3 preferably comprises N envelope detecting (ED) modules 130 (where N=6 in the illustrated embodiment). Each module determines the received envelope amplitude (magnitude and sign) $C^i(t_k)$ of one of the N magnetic carrier signals received, in the illustrated embodiment, from one of the N=6 transmitter coils 10, 12, 14, 16, 18 and 20.

FIG. 6a is a simplified block diagram illustration of the i'th envelope detecting (ED) module 130 of FIG. 5, constructed and operative accordance with a preferred embodiment of the present invention.

Figure 6B:
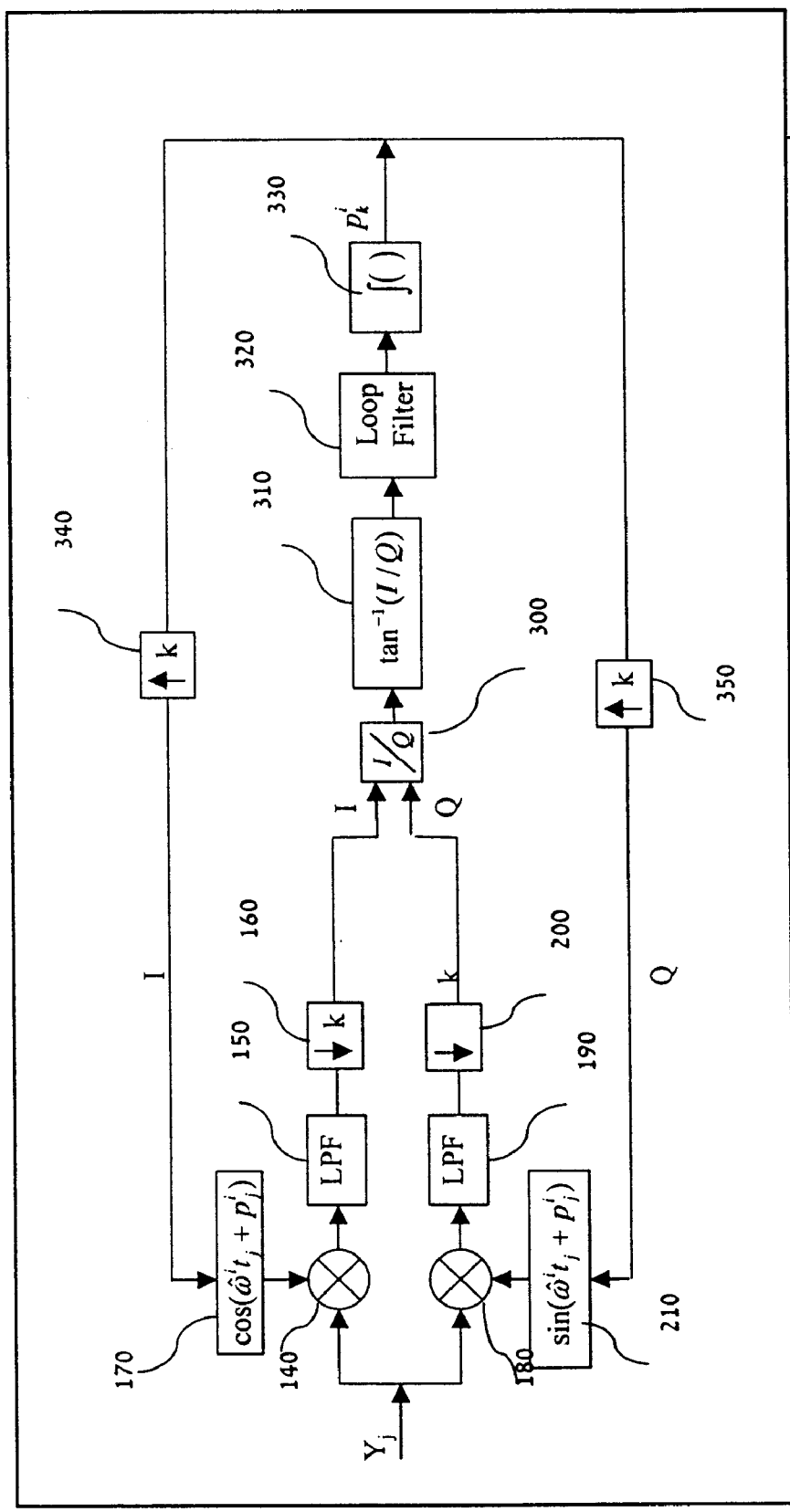
FIG. 6b is a simplified block diagram illustration of a PLL sub-module forming part of the apparatus of FIG. 6a and FIG. 6c.
Figure 6C:
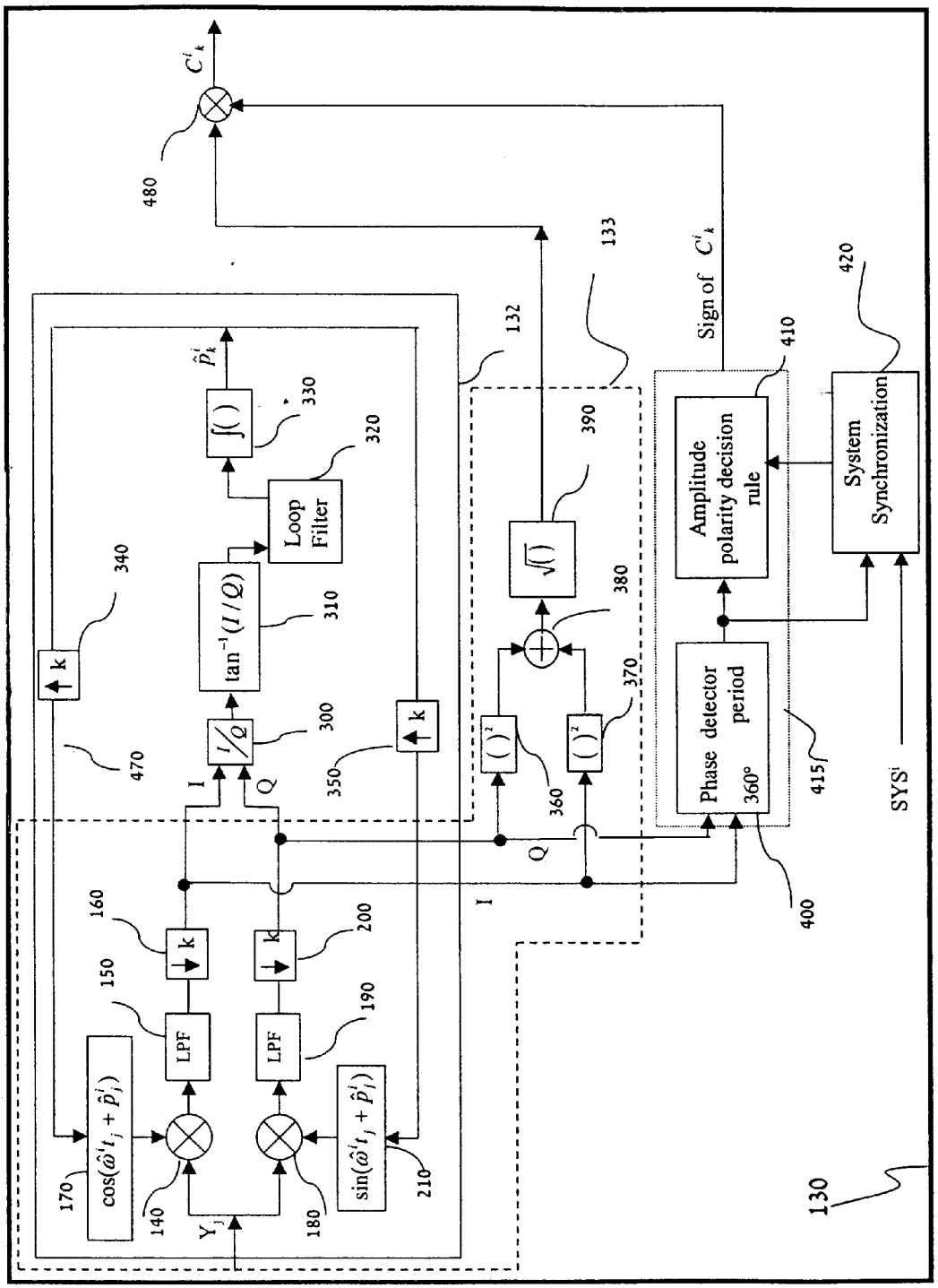
FIG. 6c is simplified block diagram of an alternative configuration of one of the ED's.

In FIGS. 6a–c, the phase is denoted by the letter "p", rather than the more conventional ϕ, in order to prevent confusion between the letter +which, in the present specification, is used to denote one of the two angular position coordinates.

The i'th envelope detector module (ED) 130 is operative to extract the strength of the electromagnetic interaction between the detector 50 and the ith transmitter, from the electromagnetic signal received by the detector 50.

The input to the i'th ED module 130 is a time series $Y(t_j)$. This series is a superposition of the N sinusoidal waves, each amplitude modulate according to the relative position between the detector 50 and the i'th transmitter. The input sine series is defined by:

$$Y(t_j) = \sum_{i=1}^{N} C^i \cdot \sin(\omega^i t_j + p^i) \tag{21}$$

The output of the i'th ED module 130 is time-series of the i'th signed envelope $C^i(t_k)$. The envelope detection is similar for all N transmitters. Therefore, only the detection of a single envelope is described below. The process is performed N times, i.e. once per transmitter, preferably in parallel, by N ED modules 130 respectively.

Each ED module typically comprises two sub-modules. These modules are: a Phase Lock Loop (hereafter PLL) 132, described in detail below with reference to FIG. 6b and a System synchronization unit 420, is then called to define the absolute sign of the signal amplitude.

Reference is now made to FIG. 6b which is a simplified block diagram illustration of the PLL sub-module 132 forming part of the apparatus of FIG. 6a.

The Phase-locked loop (PLL) unit of FIG. 6b is a control system that follows the phase and frequency of its input. Given the angular velocity a of a sinusoidal waveform contained in its input signal, the PLL follows its phase and compensates for small frequency fluctuations. There are several well known PLL configurations. One such configuration useful for implementing the PLL unit of FIG. 6b is the Tanlock PLL, described in *Phase locked and Frequency Feedback Systems: Principles and Techniques*, J. Klapper and J. T. Frankle, Chapter 8, p. 256, Academic Press, New York, 1972. The Tanlock configuration, as shown in FIG. 6b, uses both I and Q branches to close the phase loop.

As the input signal $Y(t_j)$ enters the PLL it is multiplied by:

$$Si(t_j)=\sin(\hat{\omega}_j^i t_j + \hat{p}_j^i) \tag{22}$$

For the Q branch. and $$Co(t_j)=\cos(\hat{\omega}_j^i t_j \hat{p}_j^i) \tag{23}$$

For the I branch.
Here $\hat{\omega}_j^i$ and $\hat{p}_j^i$ are the estimated values in the PLL procedure, of frequency $\omega^i$ and the phase $p^i$ at the time $t_j$. Initially $\hat{p}_j^i$ is zero and $\hat{\omega}_j^i$ is set to the nominal frequency of the i'th carrier. Low pass filters 150 and 190 filter the results of the multiplication by 170 and 210 respectively. For $\hat{\omega}^i=\omega^i$ and after the proper filtering process, only the envelope remains, i.e. the slowly changing component of the i'th input.

The envelope of the Q channel after multiplying by 2 is given by:

$$LPC^i(t_j)=C^i(t_j)\cdot\cos[\Delta p(t_j)] \tag{24}$$

where $$\Delta p^i(t_j)=[p^i(t_j)-\hat{p}^i(t_j)] \tag{25}$$

Similarly the envelope of the I channel after multiplying by is given by:

$$LPS^i(t_j)=C^i(t_j)\cdot\sin[\Delta p^i(t_j)] \tag{26}$$

As shown in FIG. 6b, the unit 310 the phase-error of the PLL is computed according to:

$$\Delta p^i(t_j) = \tan^{-1}\left[\frac{LPS^i(t_j)}{LPC^i(t_j)}\right] \tag{27}$$

This phase error $\Delta p^i(t_j)$ is used by the PLL to update its own frequency. A Proportional-Integral (PI) controller 320, also termed herein a "loop filter", is used to compute a correction to the frequency. The transfer function F(s) characterizing the PI controller is defined by:

$$F(s)=K(1+K_1/s) \tag{28}$$

where s is Laplace operator and K and $K_1$ are constants of the control loop filter 320, and are set such that the closed loop bandwidth is approximately 1 Hz and the damping factor is approximately in the range of 0.7–1.0.

It is a particular feature of a preferred embodiment of the present invention to bring the PLL to oscillate in phase with the corresponding component in the input signal. When this happens the PLL is said to be 'locked'. In this situation the I branch (i.e. the filtered cosine multiplication) and $\Delta p^i(t_j)$ would both approach zero. When the PLL is locked the output of the down decimation block 200 in the Q branch determines the sine envelope $C^i(t_k)$.

The PLL configuration of FIG. 6b has several advantages over other implementation possibilities in the art:

a. It has good tracking characteristics due to combined I and Q tracking.

b. Its dynamic properties, specifically bandwidth, and its damping factor do not depend on the input amplitude.

Referring back to FIG. 6a, the System synchronization Sub-module 420 is now described. The extraction of signed amplitude is possible if the initial phase of the carrier is known. Otherwise, the system never knows if it is locked to the carrier or it is out of phase to it. Therefore, an auxiliary synchronization mechanism 420 is provided. At fixed intervals the ED 130 of FIG. 6a receives an auxiliary signal $SYS^i$ composing a time series of ones and zeros. This synchronization signal ($SYS^i$) is one when the carrier is positive, and zero otherwise. When $SYS^i$ arrives, the output of 210 of FIG. 6a, i.e. the PLL's estimated sine wave, is cross-correlates it with $Y(t_j)$ over a time period of approximately 100 msecs. If $Y(t_j)$ appears to be in anti-correlation with $SYS^i$ then $Y(t_j)$ is multiplied by −1.

Another ED configuration shown in FIG. 6c. This configuration has an advantage over the previous configuration due to its ability to determine sine envelope $C^i(t_k)$ to the next stage without dependency on the loop 'locking'. This configuration comprises three sub-modules operating in parallel and another sub-module operative rarely. The three sub-modules are: a Phase Lock Loop (hereafter PLL) 132, a Non-coherent absolute envelope-detector 133, described in detail below with reference to FIG. 6d and a Sign Detection Unit 415. The fourth sub-module, a System synchronization unit 420.

The PLL sub-module 132 and the System synchronization 420 are identical in both configurations and were described above. The Non-coherent absolute envelope-detector sub-module 133 and the Sign Detection Unit 415 are described hereinbelow.

We now refer to the Sign Detection Sub-module 415 shown in FIG. 6c. In the alternative configuration the Sign detection Sub-module is needed because this sub-module has to be operative even when the PLL unlocked. When the i'th transmitter changes sign the effect is of changing the sign of the carrier signal. When the PLL is unlocked, a sign change of the carrier does not change the sign of phase estimated by the PLL $\hat{p}_j^i$. In this configuration the two branches of the PLL has a symmetry of 180° and not 360°. To follow and correct the phase change of the carrier signal module 415 uses a 360° phase detector which has a symmetry of 360°.

Referring now back to the System synchronization Sub-module 420. As shown in FIG. 6c the auxiliary signal is cross correlated with the output of sub-module 400 which contains the proper phase of the ED module 130.

Figure 6D:
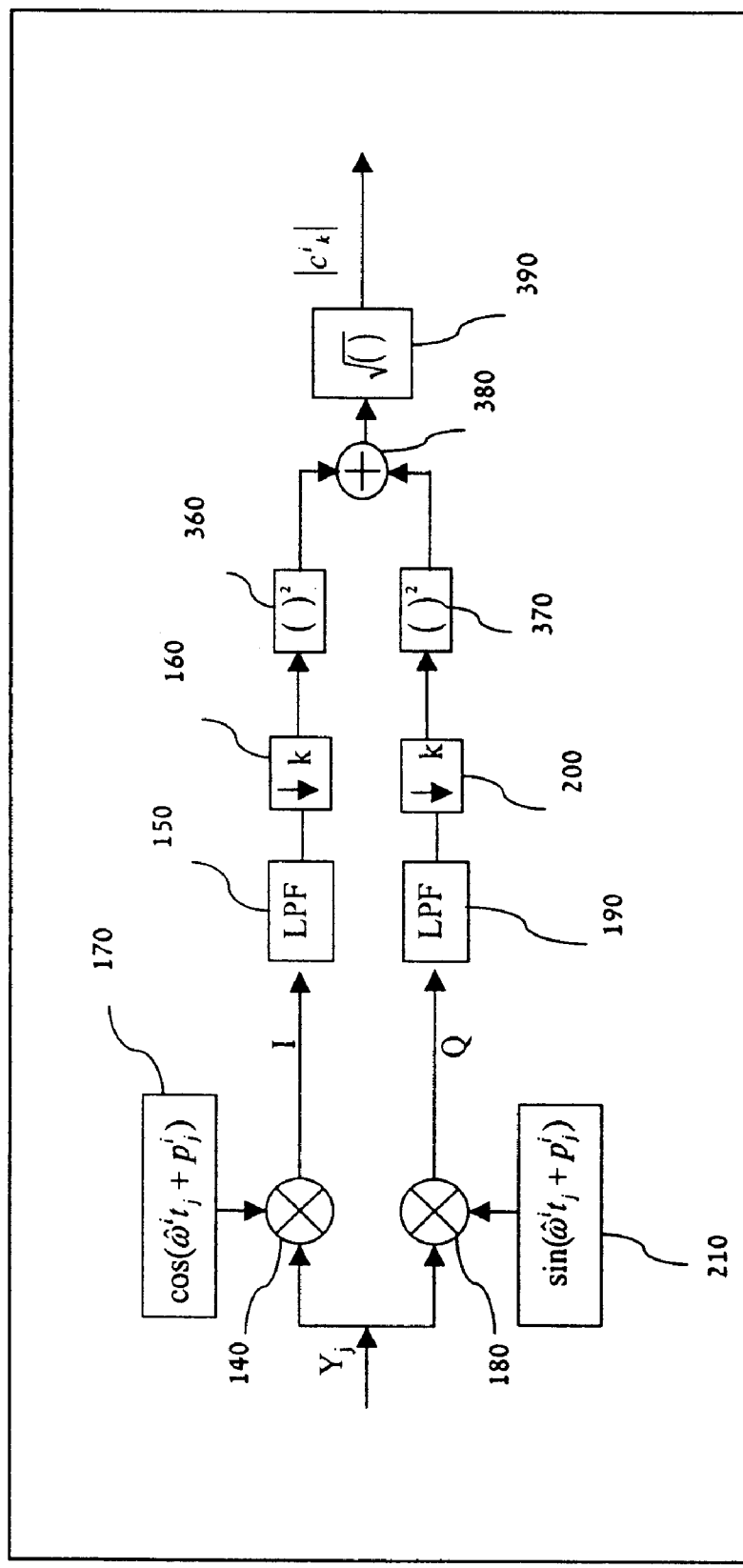
FIG. 6d is a simplified block diagram illustration of an envelope detector sub-module forming part of the apparatus of FIG. 6c.

Reference is now made to FIG. 6d which is a simplified block diagram illustration of a non-coherent absolute value envelope detector sub-module 133 forming part of the apparatus of FIG. 6a. The amplitude of the corrected voltage signal, at the relevant frequency, as synthesized by the raw detected signal as defined above, is given by:

$$|C^i(t_j)|=\sqrt{LPC^2+LPS^2} \tag{29}$$

where LPC as defined by equation 24 is the output of block 150 in FIG. 6d, similarly LPS as defined by equation 26 and is the output of block 150 in FIG. 6d.

It is appreciated that the two variations of PLL based implementations of FIGS. 6a–6d are only two possible implementations of envelope detector 114 of FIG. 3. Alternatively, the envelope detector 114 may, for example, be based on Fourier transforms.

Figure 7A:
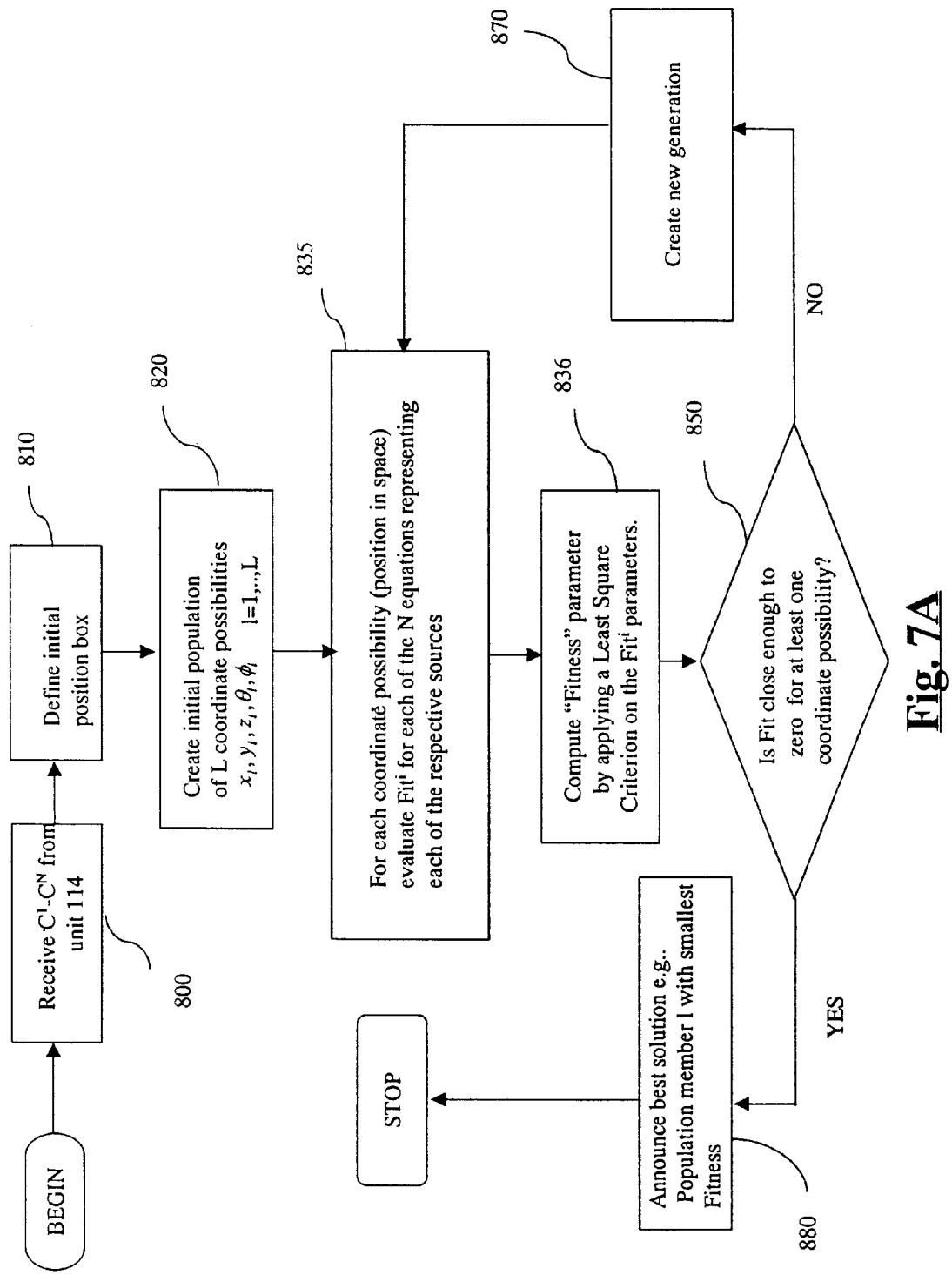
FIG. 7a is a simplified flowchart illustration of a preferred method of operation for the position finding subsystem of FIG. 3, based on a genetic process for obtaining the final position and orientation of an object of interest.

Reference is now made to FIG. 7a which illustrates one suitable method of operation for position determination unit 116, based on an iterative Genetic process for obtaining the final position and orientation of an object of interest.

Genetic algorithms are described in *Genetic algorithms in search: optimization and machine learning,* D. Goldberg, 1989; and in

*An introduction to genetic algorithms,* Melanie Mitchell, 1996.

As described above, unit 116 is operative, based on envelope amplitude values $C^i$, (i=1, ..., N; including sign), of the magnetic signal Y(t), to provide an output indication of the spatial and/or angular position of the magnetic field detector 50 in sensor 40 (FIG. 1c). The output indication typically includes spatial and angular position information, e.g. three position coordinates, typically Cartesian coordinates x, y, z; plus angular position information such as (θ and φ including its quadrant).

The method of FIG. 7a is based on solving N analytic equations with 6 unknowns (step 835, is described in detail with reference to FIG. 7b).

If N>6, there are more than 6 equations in 6 unknowns. This redundancy may be used to increase accuracy of the system, preferably by applying an averaging process to the measured amplitudes, of the signals at their different frequencies, representing the magnetic field parameters.

In step 800, N amplitude values are received from unit 114.

In step 810, an initial position box is defined for the magnetic detector 50. The definition of the initial position box typically depends on the mode of operation of the positioning system which is typically selected from two possible modes: an initial positioning/reset mode and a tracking mode.

The initial positioning/reset mode is intended for situations in which there is no knowledge available, or insufficient reliable knowledge available, regarding the prior position of the detector 50. If the system is operating in this mode, the initial position box is simply the entire area in which the system is operative.

The tracking mode is intended for situations in which there is knowledge available regarding the prior position of the detector. If the system is operating in tracking mode, step 810 uses available knowledge regarding the maximum velocity of the moving object or individual 30 to which sensor 40 is attached, in order to define an initial position box within which the detector 50 must be after a predetermined period of time.

In step 820, an initial population of coordinate possibilities is defined, i.e. a suitable number of sets of possible values for each of the components of the output (3 spatial coordinates and 3 angular coordinates, typically θ and φ including its quadrant). A suitable number L of members in the initial population is, for example, L=100. It is appreciated that the larger the initial population, the less iterations are required to obtain a solution. Typically, the initial population is generated by randomly selecting sets of possible values within the initial position box. Alternatively, the initial population may be generated by selecting a predetermined number of possible values which are suitably dispersed, e.g. uniformly dispersed, within the initial position box.

In step 835, the fit of each individual coordinate possibility is computed, as described in detail below with reference to FIG. 7b. In step 850, the Fitness is compared to a predetermined threshold value hereafter called "Tolerance". The threshold value is selected in accordance with the positioning resolution which is required for a particular application. For example, if it is desired to position the object with a resolution of 3 mm and 0.5 degrees, the threshold value for Tolerance is typically $10^{-5}$. Typically, in the first iteration, none of the coordinate possibilities in the initial population pass the threshold value. If none of the members of the current population pass the threshold, then step 870 is performed and the method then returns to step 880. If at least one member of the current population pass the threshold, then that member is announced (step 880) as the best solution, i.e. as the position of the sensor 40. If more than one member passes the threshold, the member having the smallest Fitness value is announced as the best solution.

In step 870, a new generation is formed. As described in detail in FIG. 7c, the new generation is typically formed by generating a subset of the current population and applying mutations, crossovers and reproductions (duplications) to that subset or new population.

The subset of the current population typically includes a predetermined number of population members (coordinate possibilities) having the lowest Fitness values. The larger the subset, the less iterations are required to obtain a solution.

For example, if the current population is simply the initial population (i.e. if the first iteration is being performed) and if it is desired to filter out 90% of the current population, and if the initial population included 100 members, then the new population is simply the 10 members of the initial population having the lowest Fitness values.

Figure 7B:
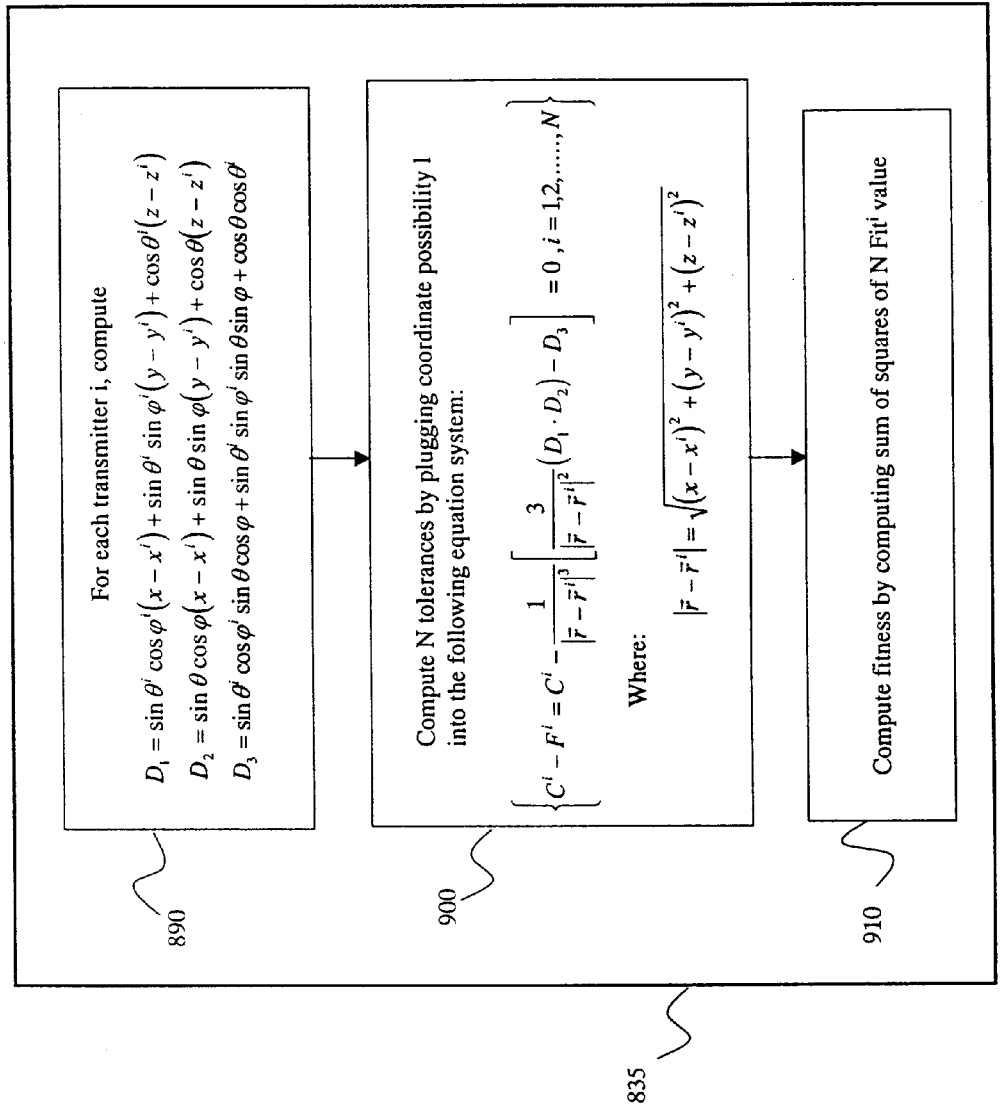

Reference is now made to FIG. 7b which is a simplified flowchart illustration of a preferred method for implementing step 835 for an individual coordinate possibility 1.

In steps 890 and 900, each member of the population (each sextuplet (x,y,z,θ,ψ) including quadrant) is plugged into each of the N≧6 equations in the equation system of step 900, generating L systems of N equations. Typically, the N expressions on the left side of the N equations, respectively, are not equal to zero (unless the sextuplet is in fact a solution of the equation). The absolute value of the result of plugging in the sextuplet into each of the six expressions is termed the "partial fitness" (hereafter $Fit^i$) of that equation for that sextuplet.

In step 910, the N≧6 values of each of the $Fit^i$ calculated for each coordinate possibility 1 in the initial L-sized population are combined into a single value. Typically, $Fit^i$ are combined by computing the sum of squares of the N values of each of the $Fit^i$ parameters calculated for each coordinate possibility 1 in the initial population. This sum of squares is termed herein the "Fitness" of an individual coordinate possibility 1.

Figure 7C:
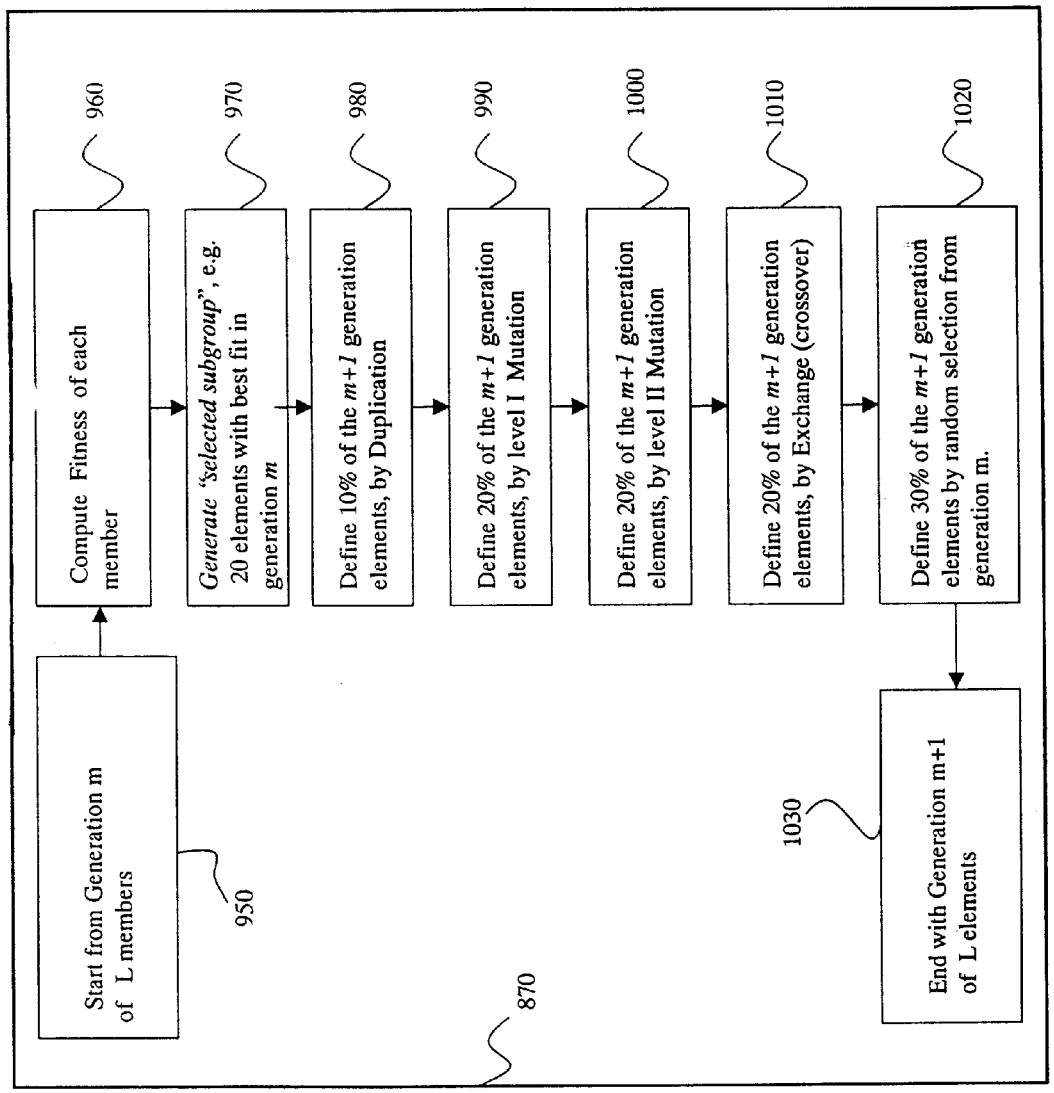

Reference is now made to FIG. 7c which is a simplified flowchart illustration of a preferred method for performing step 870 of FIG. 7a. The method of FIG. 7c uses genetic processes such as mutation, crossover and duplication on a pre-selected group of members in the present generation in order to generate a "new generation" which better fits the required optimal solution to the problem.

The starting point (step 950) is a generation number m that includes L members, for instance, 100 members (i.e.

points, where each point includes a spatial triplet of x, y and z and orientation angles θ and φ). The size L of the total population in each generation can be set by the user (or automatically by the system) according to some pre-defined criterions as described herein below. In this case the Fit$^i$ is defined according to:

$$Fit^i = C^i - F^i \quad (30)$$

$$Fitness = \frac{2}{N} \sum_{i=1}^{N} \frac{|F^i - C^i|}{|F^i| + |C^i| + T} \quad i = 1 \ldots N \quad (31)$$

where F$^i$ is defined as the right side of equation (16):

$$F^i \equiv \frac{1}{|\vec{r} - \vec{r}^i|^3} \left[ \frac{3}{|\vec{r} - \vec{r}^i|^2} (D_1 \cdot D_2) - D_3 \right], \quad i = 1, 2, \ldots, N \quad (32)$$

and $$T = \sqrt{N^2_{sys} - \text{Tolerance}^2} \quad (33)$$

where Ci and Fi are as referred also in FIG. 7b, step 900.

$N_{sys}$ is the system noise, defined as the lowest level of signal that is detected by the detector 50 as a valid, i.e. non-noise signal in Volts [V].

Tolerance is a value, expressed in volts, which is selected to provide a required accuracy of computation. Empirically, the value of Tolerance is approximately $10^{-5}$ V if the accuracy of positioning required is approximately $10^{-3}$ meters.

The formula for Fitness scales the error and averages the fraction of the error relative to the desired results. To this end, a simple division by Ci would do. However, one has to treat the case where Ci is very close to zero, hence the term |Fi|+|Ci|. This term is zero, only when both Fi and Ci are close to zero. For this specific case the term T is added, and is assumed small. When Ci is fairly large, Ts contribution is negligible. When Ci becomes small T takes over. In this case we would like to scale the error with the typical measurement error. Thus, For example, for a system with 0.01 mV typical system noise, and 1 mV desired tolerance, T becomes, ~1 mV. When C$^i$ is closer to 1 V the contribution of T is small, and the normalized error is given by 2|Fi-Ci|/(|Fi|+|Ci|). When C$^i$ is much less than 1 mV, and F$^i$ approaches C$^i$ then Fit$^i$ is as follows:

$$Fit^i = 2(Fi-Ci)/|Fi|+|Ci|+T) \sim 2(Fi-Ci)/T = 2(Fi-Ci)/(1\text{ mV}) \quad (34)$$

and F$^i$−C$^i$ must reach 0.025 mV to get a Fit$^i$ of 0.05.

In summary, the fitness is found for all members of generation m. Here Fitness is defined as the criterion for how "good" is a specific point, as a potential solution to the problem, when compared to all other points (the lower Fitness, the better).

In step 970, the method finds the v members with the lowest fitness measure (the selected subgroup).

Based on the selected subgroup, and the actual numbers given above for illustration purposes, generate the L members of generation m+1 as follows:

Duplication: In step 980, the method duplicates the "best" member of the m'th generation (typically the member with the lowest Fitness) to obtain s percent, for instance 10%, of the (m+1)'th generation.

Mutation level I: In step 990, the method defines a radius r1 and randomly choose new members to constitute t percent of the new (m+1)'th generation, where t % may, for example, comprise 20%, i.e. 20 members if L=100. The new members selected in this step are randomly selected in the vicinity of the "best" (lowest Fitness value) u members. For example, if u=10, i.e. there are 10 members in the selected subgroup, then 20/10=2 new members are selected randomly within the vicinity of each of the u members in the selected subgroup. A preferred definition for r1 is as follows:

$$r1 = \max(\text{delta\_range\_x, delta\_range\_y, delta\_range\_z})/B1 \quad (35)$$

B1 may, for example be 10. B is an expression of the degree of confidence which it is desired to ascribe to the members of the current population. The smaller the value of B, the closer the members of the next generation tend to be to the members of the present generation.

delta_range_x, delta_range_y, delta_range_z are the dimensions of the range in which the object whose position is being measured is assumed to reside. For example, if the object is known to reside within an area whose x-dimension ranges from 4 length units to 9 length units then delta_range_x is 5.

Mutation level II: In step 1000, a radius r2 is defined and the method randomly chooses new v percents, for instance 20%, of the m+1 generation, in the vicinity of each of the "best" w members, for instance 10 members of the selected subgroup.

Here r2 is defined as follows:

$$r2 = \max(\text{delta\_range\_x, delta\_range\_y, delta\_range\_z})/B2 \quad (36)$$

where B2<B1 and may, for example, be 20.

Alternatively, only one level of mutation may be employed. In this case, in the above example, 40% of the members of the m+1 generation may be selected in an r1 vicinity of the members of the selected subgroup of generation m. Alternatively, more than two levels of mutation may be employed.

Cross Over: In step 1010, the method randomly selects a set of, say, 5 members (termed herein A, B, C, D and E for clarity) from the selected subgroup and randomly exchange (cross over) their x, y and z properties and their θ and φ properties to obtain e percents, for instance 20%, of the m+1 generation. For example, the first member within the 20% of the new generation may receive the x value of A, the y value of C, the z value of A, the θ value of E and the φ value of A. The second member within the 20% of the new generation may receive the x value of B, the y value of C, the z value of D, the θ value of D and the φ value of A, and so on until 20 new members are formed, assuming that L=100.

In step 1020, the method generates randomly p members, for instance 30 members, that typically represent q percents, for instance 30%, of the (m+1)'th generation.

This completes the creation of the m+1 generation.

It is appreciated that the percentages of new generation members selected using each of the generation creation options (random selection, duplication, high level mutation, low level mutation, crossover), need not have the above values (30%, 10%, 20%, 20% and 20%) although of course they must sum to 100%. The values of some of the percentages may even be 0% which means that one or more of the generation creation options are not used at all.

The value of the Tolerance parameter may be chosen empirically to give a desired accuracy in meters for measurement of the position of an object. For example, the system may be calibrated for a measurement session by placing the object in a known location and varying the Tolerance value until a position reading of the desired accuracy is obtained. Typically, a Tolerance value of approximately $10^{-5}$ V yields position readings having an accuracy in the range of 1 mm.

The Tolerance value may alternatively or in addition be adjusted in real time during a session. For example, if information regarding maximum velocity and/or acceleration is available then, if adjacent readings are too far apart, considering their time separation and the expected velocity and acceleration then the Tolerance value may be decreased to increase accuracy.

The size L of each generation is preferably determined automatically by the system as a function of the ratio between the desired accuracy and the length of the largest dimension of the range within which the object of interest is known to reside. For example, L may be determined by the following LUT (look up table):

| Ratio | L |
| --- | --- |
| 1–9.999 | 100 |
| 10–99.999 | 500 |
| 100 and above | 2200 |

Alternatively any other suitable criterion may be employed such as the ratio between volume of the range and desired accuracy.

It is appreciated that the present invention is useful for monitoring the position of substantially any type of moving object or figure including but not limited to the following applications: virtual reality, provision of on-line feedback during invasive medical procedures, remote control of moving objects such as vehicles, robotics, and any application that may need a Man-Machine-Interface accessories such as simulators. Therefore, the virtual reality application illustrated in FIG. 1b is not intended to be limiting.

Definition of terms:

Pose: five dimensional coordinates of a circular-symmetrical object, including three coordinates describing its location in a three-dimensional space, and two coordinates describing its orientation.

Orientation: two-dimensional angular position of an object, describing its orientation relative to a fixed orientation in three-dimensional space.

Transmitter: a device operative to emit a magnetic field from which a magnetic flux may be created.

Detector: a device operative to transform the magnetic flux that crosses its area into electric voltage.

FIG. 10 is a flow chart diagram of a preferred method of operation of a field equation based EKF-type tracking filter.

Figure 11:
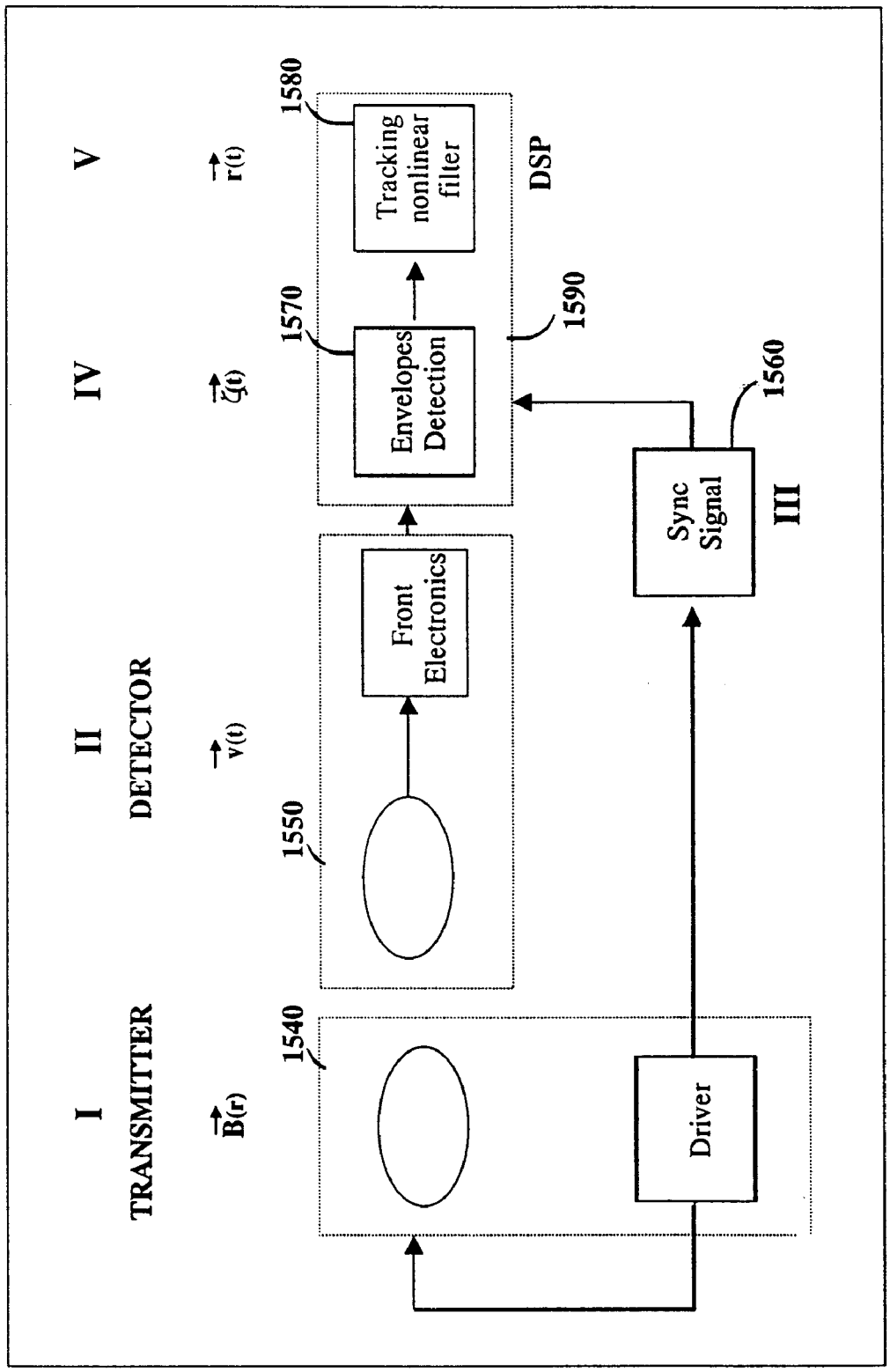
FIG. 11 is a simplified block diagram of an example of a tracking system, including a field equation based EKF-type tracking filter operating in accordance with the method of FIG. 1.

FIG. 11—is a simplified block diagram of an example of a tracking system, including a field equation based EKF-type tracking filter, operating in accordance with the method of FIG. 10. As shown, the system of FIG. 11 preferably comprises the following functional units:

1. a transmission system (transmitter) 1540, including a number of electric coils and the electronic circuits that drive them (i.e. driver);
2. a detection system (detector) 1550, including a coil and the electronic circuit that provides preprocessing, e.g., pre-amplification, gain control, and filtering;
3. a synchronization system 1560;
4. an envelopes-detector 1570; and
5. a tracking non-linear filter (tracker) 1580.

Detector 1550 may be similar to units termed "One axis magnetic field detector 50" and "Signal Conditioning and Conversion 64" of FIG. 1d, as described hereinabove.

Synchronization system 1560 may be similar to a unit termed "System Synchronization 420" of FIG. 6A, as described hereinabove.

Envelopes-detector 1570 may be similar to a unit termed "Envelope Detector for determination of amplitudes $C^1, \ldots C^N$ (N≧6) 114" of FIG. 3, as described hereinabove.

Tracking non-linear filter 1580 may be similar to a unit termed "Position finding 116" of FIG. 3, as described hereinabove.

Each of transmitters 1540 may comprise a conventional solenoid, driven by an A/C current.

Detector 1550 may be similar to units termed "One axis magnetic field detector 1550" and "Signal Conditioning and AID Conversion 64" of FIG. 1d.

Synchronization system 260 may be similar to a unit termed "System Synchronization 420" of FIG. 6A.

Envelopes-detector 570 may be similar to a unit termed "Envelope Detector for determination of amplitudes $C^1, \ldots C^N$ (N≧6) 114" of FIG. 3.

Tracking non-linear filter 580 may be similar to a unit termed "Position finding 116" of FIG. 3.

A preferred method of operation for a field equation based EKF-type tracking nonlinear filter 1580 is described herein in detail with reference to FIG. 10. By way of example, a transmitter-array inducing magnetic fields is described. The superposition of these magnetic fluxes is described as being detected by a magnetic flux detector, and resolved to individual fluxes by an envelope detector. However, it is appreciated that this invention may employ other forms of flux induction and flux measurements.

State Space Model of a Dynamic System

A conventional Kalman filter (KF) is a sequential tracker that generates an optimal estimate of the state of a linear system based on measures of the noise in the system, a model of the system's equations of motion and an estimate of its previous state. If the system of interest is not linear then an "EKF" (Extended Kalman Filter), one out of many variations of a KF, is typically used.

A conventional KF uses several matrices to compute an optimal estimate to a state vector. These matrices are derived from the system equations of motion, e.g. as follows: An approximation to the system dynamics is made:

$$\xi(t)=F\xi(t)+w(t)$$

$$\zeta(t)=h[\xi(t)]+v(t) \quad (37)$$

In equation (37) $\xi(t)$ is a state vector, F is the differential equation coefficient matrix, w(t) is a system noise, $\zeta(t)$ is the measurements, h(·) is the measurement sensitivity function, and v(t) is the measurement noise. h(·) is a vector function whose dimension is the number of measurements. The measurements $\zeta$ may be the same as the "C's" i.e. the output from the Envelope Detector 114 and the input of the Position Detector 116, of FIG. 5. Both measurement-noise and system-noise are assumed invariant white Gaussian distributed processes, and are independent of each other.

The discrete time form of equation (37) reads:

$$\xi_k=\Phi\xi_{k-1}+w_{k-1}$$

$$\zeta_k=h[\xi_k]+v_{k-1} \quad (38)$$

$\xi_k$ the state vector at time-step k, $\Phi$ is the state transition matrix, $w_k$ is the system noise, h(·) is the measurement sensitivity function, $\zeta_k$ is the measurements vector, and $v_k$ is the measurement noise, all at time bin k. The noises $w_k$ and $v_k$ are independent invariant Gaussian processes.

Figure 12:
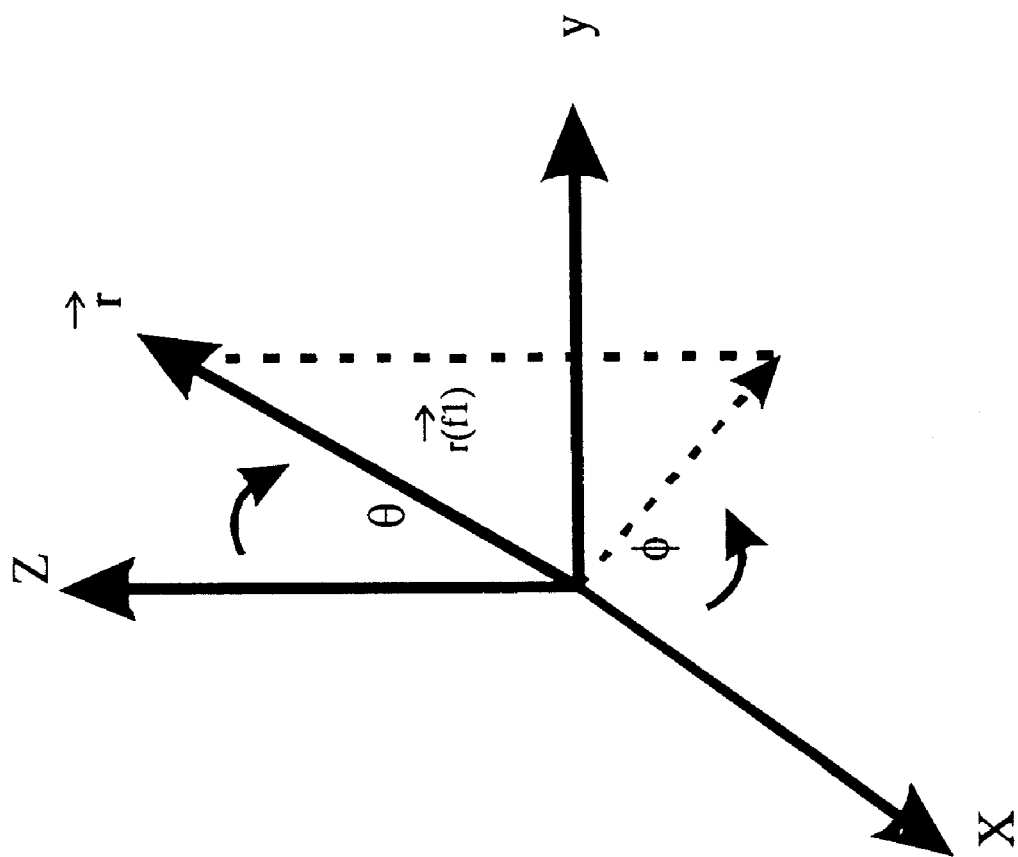
FIG. 12 is a vector diagram illustrating state vector orientations.

Any choice of state vector is typically accepted providing it includes enough information to compute the desired pose. One possible choice is:

$$\xi = [x, y, z, \phi, \theta, \dot{x}, \dot{y}, \dot{z}, \dot{\phi}, \dot{\theta}] \quad (39)$$

where $\{x, y, z, \phi, \theta\}$ are the five coordinates of the detectors pose as illustrated in FIG. 12, and a dot over a variable denotes the variable's time-derivative. The effect of higher-order derivatives is implicitly included within the system noise.

The KF is based on some knowledge of the statistics of Gaussian noises $w_k$ and $v_k$:

$$E<v_k v_i^T> = \delta_{k,i} R_k$$

$$E<w_k w_i^T> = \delta_{k,i} Q_k$$

$$E<w_k> = E<v_k> = 0 \quad (40)$$

where $\delta_{k,i}$ denotes the Kronecker delta function.

The transition from continuous to discrete time is made sing the relation:

$$\Phi = e^{FT_s} = e^{F(t_k - t_{k-1})} \quad (41)$$

$$E\langle v_k v_i^T \rangle = \delta_{k,i} R \qquad E\langle v(t) v(s) \rangle = \delta(t-s)\tilde{R}$$

$$E\langle w_k w_i^T \rangle = \delta_{k,i} Q \qquad E\langle w(t) w(s) \rangle = \delta(t-s)\tilde{Q}$$

$$R = \frac{\tilde{R}}{(t_k - t_{k-1})} \qquad Q = \tilde{Q}(t_k - t_{k-1})$$

The last two expressions of equation (41) are only approximations. The former neglects non-linear terms of $(t_k - t_{k-1})$, and the latter is correct if the sensor integrates the noise over the period between $t_{k-1}$ and $t_k$.

Using an Extended Kalman Filter for Magnetic Tracking

The measurement sensitivity function $h(\cdot)$ relates the induced voltage to the magnetic field is known as the field equation law, and is difficult to express in a closed form. Thus, an approximation is preferably made, the simplest of which is:

$$h(\xi) = \frac{C_0}{|\vec{r}|^3} \left[ \frac{3}{|\vec{r}|^2} (\vec{n}_s \cdot \vec{r})(\vec{n}_d \cdot \vec{r}) - (\vec{n}_s \cdot \vec{n}_d) \right] \quad (42)$$

$$\vec{r} = \vec{r}_s - \vec{r}_d$$

Figure 13:
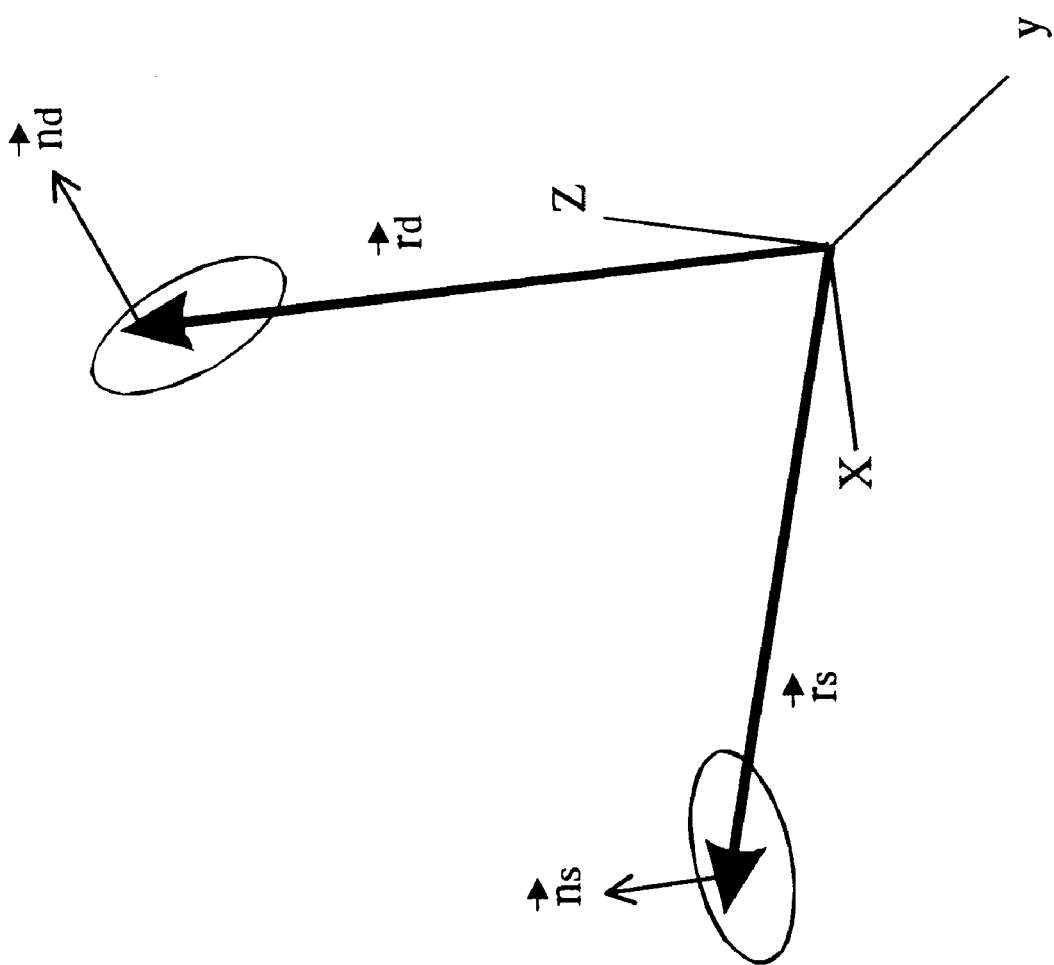
FIG. 13 is a vector diagram illustrating the field equation law.

$r_s$ and $r_d$ are the position vector of the transmitter and the detector, and $n_s$ and $n_d$ are their corresponding plane unit vectors (the plane vector is a vector whose orientation is perpendicular to the plane). These notations are depicted in FIG. 13. The function $h(\xi)$ is a vector function, each of its members is the interaction with a single transmitter. For each member of the vector function the values of $r_s$, $n_s$, and $C_0$ take their corresponding values.

Operation of the tracker 1580 can be defined using any of several extensions to the Kalman filter. A preferred embodiment of the present invention utilizing an EKF is described hereinbelow, and is illustrated in FIG. 10.

The procedure is an iterative one, providing successive estimates each based on the previous one. An initial computation 1200 typically provides five initial arrays: $Q_0$, $R_0$, $P_0$, $\Phi$, and $\xi_0$. The role of each is described below.

Given an estimate to the state vector at time step k−1, a prediction 1205 is made to the state vector at time k:

$$\xi_k(-) = \Phi \xi_{k-1}(+) \quad (43)$$

The notation (−) and (+) denote an estimation made prior to measurement taking prediction and after it (correction) respectively. For the state vector suggested in equation (39), the matrix $\Phi$ takes the form:

$$\Phi = \begin{bmatrix} 1 & 0 & 0 & 0 & 0 & T_s & 0 & 0 & 0 & 0 \\ 0 & 1 & 0 & 0 & 0 & 0 & T_s & 0 & 0 & 0 \\ 0 & 0 & 1 & 0 & 0 & 0 & 0 & T_s & 0 & 0 \\ 0 & 0 & 0 & 1 & 0 & 0 & 0 & 0 & T_s & 0 \\ 0 & 0 & 0 & 0 & 1 & 0 & 0 & 0 & 0 & T_s \\ 0 & 0 & 0 & 0 & 0 & 1 & 0 & 0 & 0 & 0 \\ 0 & 0 & 0 & 0 & 0 & 0 & 1 & 0 & 0 & 0 \\ 0 & 0 & 0 & 0 & 0 & 0 & 0 & 1 & 0 & 0 \\ 0 & 0 & 0 & 0 & 0 & 0 & 0 & 0 & 1 & 0 \\ 0 & 0 & 0 & 0 & 0 & 0 & 0 & 0 & 0 & 1 \end{bmatrix} \quad (44)$$

$$T_s = t_k - t_{k-1}$$

A prediction 1210 is made to the estimate error covariance-matrix:

$$P_k(-) = \Phi P_{k-1}(+) \Phi^T + Q \quad (45)$$

The matrix Q in this example takes the form:

$$Q = \begin{bmatrix} 0 & 0 & 0 & 0 & 0 & 0 & 0 & 0 & 0 & 0 \\ 0 & 0 & 0 & 0 & 0 & 0 & 0 & 0 & 0 & 0 \\ 0 & 0 & 0 & 0 & 0 & 0 & 0 & 0 & 0 & 0 \\ 0 & 0 & 0 & 0 & 0 & 0 & 0 & 0 & 0 & 0 \\ 0 & 0 & 0 & 0 & 0 & 0 & 0 & 0 & 0 & 0 \\ 0 & 0 & 0 & 0 & 0 & Q_x & 0 & 0 & 0 & 0 \\ 0 & 0 & 0 & 0 & 0 & 0 & Q_y & 0 & 0 & 0 \\ 0 & 0 & 0 & 0 & 0 & 0 & 0 & Q_z & 0 & 0 \\ 0 & 0 & 0 & 0 & 0 & 0 & 0 & 0 & Q_\phi & 0 \\ 0 & 0 & 0 & 0 & 0 & 0 & 0 & 0 & 0 & Q_\theta \end{bmatrix} \quad (46)$$

$$Q_x = (T_s \times \text{maximal allowed } \ddot{x})^2$$

$$Q_y = (T_s \times \text{maximal allowed } \ddot{y})^2$$

$$Q_z = (T_s \times \text{maximal allowed } \ddot{z})^2$$

$$Q_\phi = (T_s \times \text{maximal allowed } \ddot{\phi})^2$$

$$Q_\theta = (T_s \times \text{maximal allowed } \ddot{\theta})^2$$

A linear approximation 1215 is made to the measurement sensitivity function. For the state vector suggested in equation (40), and in an example of a 9-transmitter system, this approximation becomes:

$$H_k = \left. \frac{\partial h(\xi)}{\partial \xi} \right|_{\xi_k(-)} = \begin{bmatrix} h^1_{x,k} & h^1_{y,k} & h^1_{z,k} & h^1_{\phi,k} & h^1_{\theta,k} & 0 & 0 & 0 & 0 & 0 \\ h^2_{x,k} & h^1_{y,k} & h^1_{z,k} & h^1_{\phi,k} & h^1_{\theta,k} & 0 & 0 & 0 & 0 & 0 \\ h^3_{x,k} & h^1_{y,k} & h^1_{z,k} & h^1_{\phi,k} & h^1_{\theta,k} & 0 & 0 & 0 & 0 & 0 \\ h^4_{x,k} & h^1_{y,k} & h^1_{z,k} & h^1_{\phi,k} & h^1_{\theta,k} & 0 & 0 & 0 & 0 & 0 \\ h^5_{x,k} & h^1_{y,k} & h^1_{z,k} & h^1_{\phi,k} & h^1_{\theta,k} & 0 & 0 & 0 & 0 & 0 \\ h^6_{x,k} & h^1_{y,k} & h^1_{z,k} & h^1_{\phi,k} & h^1_{\theta,k} & 0 & 0 & 0 & 0 & 0 \\ h^7_{x,k} & h^1_{y,k} & h^1_{z,k} & h^1_{\phi,k} & h^1_{\theta,k} & 0 & 0 & 0 & 0 & 0 \\ h^8_{x,k} & h^1_{y,k} & h^1_{z,k} & h^1_{\phi,k} & h^1_{\theta,k} & 0 & 0 & 0 & 0 & 0 \\ h^9_{x,k} & h^1_{y,k} & h^1_{z,k} & h^1_{\phi,k} & h^1_{\theta,k} & 0 & 0 & 0 & 0 & 0 \end{bmatrix} \quad (47)$$

where the term $h^1_{x,k}$ denotes the derivative of magnetic interaction of the detector with transmitter number 1 with respect to x taken at the coordinates estimated at time bin k. Similarly, other terms denote derivatives of other interactions with respect to other coordinates. The right half is zero because the contribution of the speed to the magnetic interaction is neglected, and therefore, the derivative with respect to speed vanishes. It is appreciated that to incorporate the contribution of the speed to the magnetic interaction, if desired, is straightforward.

The following approximation may be used to compute the Kalman gain matrix 1220:

$$K_k = P_k(-)H_k^T [H_k P_k(-)H_k^T + R_k]^{-1} \quad (48)$$

For the example of a 9-transmitter system, R may take the form:

$$R = \begin{bmatrix} R^1 & 0 & 0 & 0 & 0 & 0 & 0 & 0 & 0 \\ 0 & R^2 & 0 & 0 & 0 & 0 & 0 & 0 & 0 \\ 0 & 0 & R^3 & 0 & 0 & 0 & 0 & 0 & 0 \\ 0 & 0 & 0 & R^4 & 0 & 0 & 0 & 0 & 0 \\ 0 & 0 & 0 & 0 & R^5 & 0 & 0 & 0 & 0 \\ 0 & 0 & 0 & 0 & 0 & R^6 & 0 & 0 & 0 \\ 0 & 0 & 0 & 0 & 0 & 0 & R^7 & 0 & 0 \\ 0 & 0 & 0 & 0 & 0 & 0 & 0 & R^8 & 0 \\ 0 & 0 & 0 & 0 & 0 & 0 & 0 & 0 & R^9 \end{bmatrix} \quad (49)$$

where $R^s$ denotes the covariance of the measurement error for transmitter s, and the measurement errors of different transmitters are assumed to be uncorrelated.

The gain 1220, in turn, may be used to make a correction 1225 to the predicted state vector 1205 and a correction 1230 to the predicted error covariance matrix 1210. The correction to the state vector 1225 may be a multiplication of the gain by the difference between the measurements and the predicted measurements based on the state vector (the innovations):

$$\xi_k(+) = \xi_k(-) + K_k \{\zeta_k - h[\xi_k(-)]\} \quad (50)$$

The correction to the error covariance matrix 1230 contains the gain 1220 and the derivative of the measurement sensitivity function 1215:

$$P_k(+) = [I - K_k H_k] P_k(-) \quad (51)$$

Thus, by providing initial approximations 1200 to the state vector, the error covariance matrix, $P_0$, and a model in terms of Q, R and h(·) a sequence of optimal estimates based on measurements $\zeta_k$ can be produced.

The exact values of initial arrays 1200 are not critical. The values of the matrices Q and R may be estimated from prior knowledge of the system, i.e., the elements of R are computed from the measurement noise and the value of Q from the expected accelerations in the system. $P_0$ may take any representative value, e.g., if a speed of five meters per second is expected, then the elements of $P_0$ relating to speed would take the value of twenty-five meters per second. Similarly, $\xi_0$ may take the values of a typical state, e.g., if tracking is limited to a one-meter cube, and speed is limited to one meter per second, then $\xi_0$ may become a vector of ones.

The approximation to the field equation law given in equation (43) may not be convenient for computation. In order to facilitate computation, it may be presented in terms of the pose of the detector 550 $\{x_d, y_d, z_d, \phi_d, \theta_d\}$ and the pose of the transmitter 540 $\{x_s, y_s, z_s, \phi_s, \theta_s\}$. The translations and distance are computed:

$$\delta x = x_s - x_d$$
$$\delta y = y_s - y_d$$
$$\delta z = z_s - z_d$$
$$R = \sqrt{\delta x^2 + \delta y^2 + \delta z^2} \quad (52)$$

These values are used to compute three temporary values:

$$A_1 = \delta x \sin(\theta_s)\cos(\phi_s) + \delta y \sin(\theta_s)\sin(\phi_s) + \delta z \cos(\theta_s)$$
$$A_2 = \delta x \sin(\theta_d)\cos(\phi_d) + \delta y \sin(\theta_d)\sin(\phi_d) + \delta z \cos(\theta_d)$$
$$A_3 = \sin(\theta_s)\cos(\phi_s)\sin(\theta_d)\cos(\phi_d) + \sin(\theta_s)\sin(\phi_s)\sin(\theta_d)\sin(\phi_d) + \cos(\phi_s)\cos(\phi_d) \quad (53)$$

The magnetic interaction is computed:

$$h(\xi) = \frac{C_0}{R^3}\left(\frac{3A_1 A_2}{R^2} - A_3\right) \quad (54)$$

where $C_0$ is a coefficient that is preferably experimentally determined. Knowing the pose of the detector 550 and the pose of the transmitter 540, once $C_0$ is known, the magnetic interaction can be computed.

Improved Field Equation Approximation

Equations (52), (53) and (54) are more convenient to use when the state vector (40) is known, though, it is sometimes still a poor approximation. Better tracking is achieved when the model of magnetic interaction is improved, considering more physical effects. For example, a simple approximation assumes that the radius of the transmitter's coil is much smaller than the distance between the transmitter and the detector. In this preferred embodiment of the present invention, a large transmitter is preferred because it allows easier induction of intense magnetic fields. Thus, when the detector nears the transmitter a correction is made to $A_1$ and $A_3$:

$$A_1 \Rightarrow A_1(1 - \delta)$$
$$A_3 \Rightarrow A_3(1 - \eta)$$
$$\delta = \frac{5}{8}\left(\frac{\rho}{R}\right)^2\left(7\frac{A_1^2}{R^2} - 3\right)$$
$$\eta = \frac{9}{8}\left(\frac{\rho}{R}\right)^2\left(5\frac{A_1^2}{R^2} - 1\right) \quad (55)$$

where $\rho$ is the radius of the transmitter's coil, and R is defined by equation (53). Equations (54) and (55) are both approximations to field equation law. The former approaches the exact solution when both the transmitter and the detector have an infinitely small radius. When the transmitter's radius increases, an exact solution to the field equation law may be expressed in terms of elliptic integrals. Equation (55) approximates the exact solution when only the first and second terms of a Taylor series in $\rho/R$ are taken.

Using Redundant Measurements to Improve Tracking

The number of measurements necessary to provide precise tracking is an important practical issue. It is desirable to produce a system with a minimal number of transmitters to reduce the hardware production cost and to decrease the computational load. The reduction in computational load is because the heaviest computation in the whole process is the computation of the inverse operation in equation (39) of step 1220, and the order of the inverted matrix equals the number of transmitters.

The tracking system does not require five measurements to work although there are five unknown variable coordinates. The tracking system makes optimal use not only of the current measurements but also of all past measurements. The smaller the number of the measurements the poorer the tracking. However, since only minimal error estimation is produced, it is possible to get reasonable tracking when the perfect solution is not available.

To provide a tracking as precise as possible, increasing the number of measurements is desirable. In practice, a situation may arise when the knowledge about the parameters of one or more transmitters deteriorates, e.g. the pose of a transmitter may change as a result of a mechanical shock, or its intensity may change as a result of electronics imperfection or temperature change. With a multiple-measurements system, the Kalman filter would seek to provide an output that minimizes the errors, and a defective transmitter contributes some error. The larger the number of transmitters the smaller the weight of each in the error minimization, and the more precise the estimate. Thus, increasing the number of transmitters improves the tracking performance.

It is a clear advantage of a preferred embodiment of the present invention that any number of transmitters may be easily incorporated into the system. Typically, this increase only requires a software change, preferably implemented at the detector's DSP 590.

Selecting Vector-state Optimized for Tracking Problem

The state vector of equation (40) contains two orientation coordinates—$\phi$ and $\theta$, the meaning of each is depicted in FIG. 12. A common choice for these coordinates is polar representation wherein the angle $\theta$ denotes the angle between the z-axis and the orientation vector, and the angle $\phi$ is the angle between the x-axis and the projection of the orientation vector on the x-y plane. $\theta$ ranges from zero to $\pi$ radians, and $\phi$ ranges from zero to $2\pi$ radians.

Figure 14:
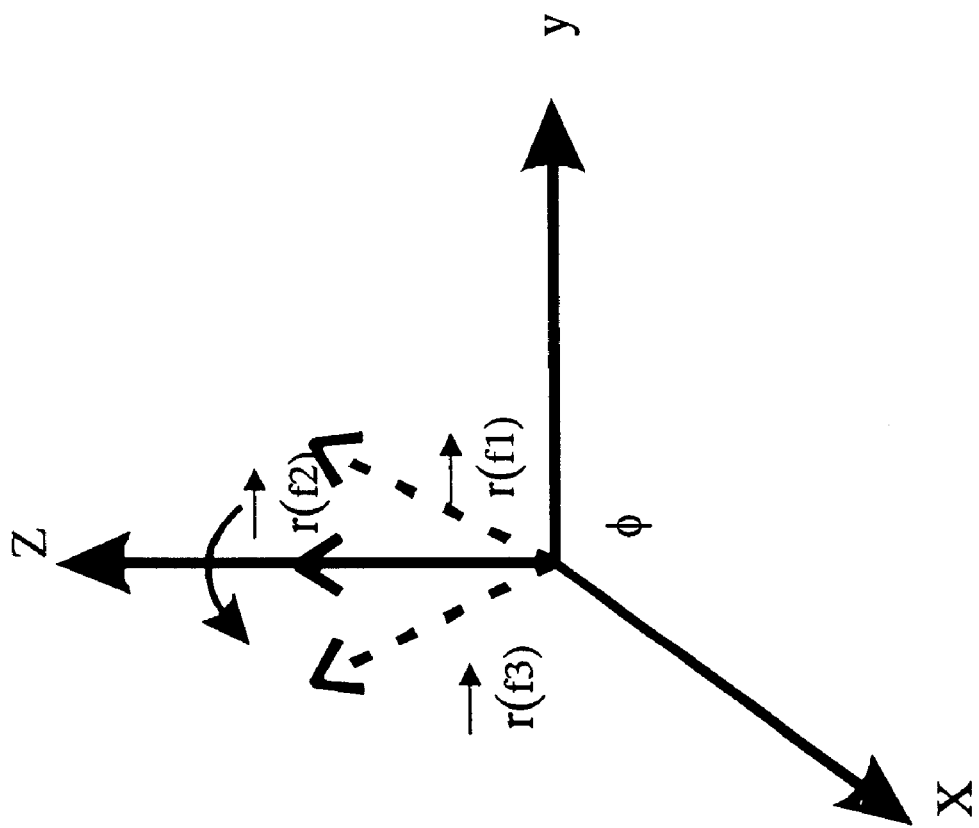
FIG. 14 is a simplified diagram of a detector crossing a singularity point.
Figure 15:
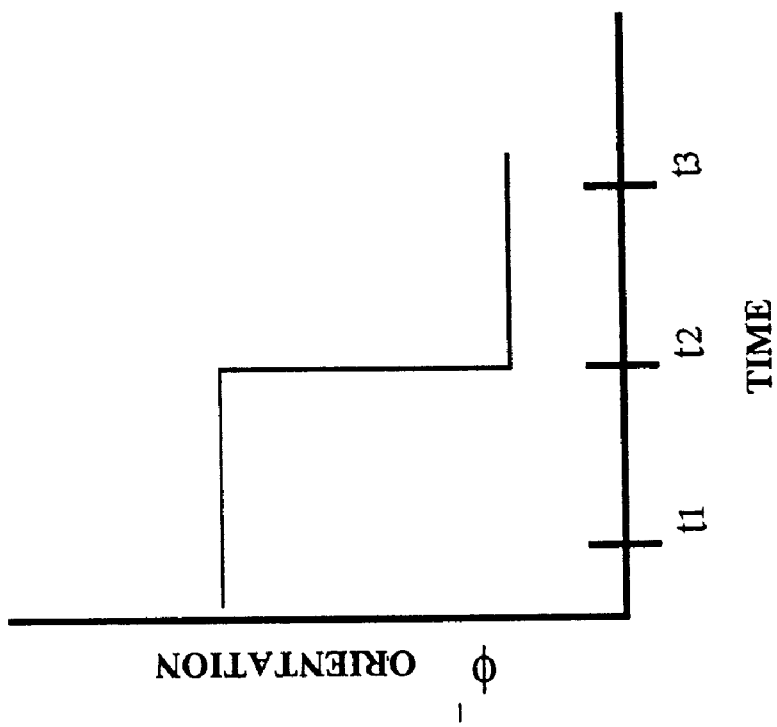
FIG. 15 is a simplified diagram of the dynamics of the coordinates for the conventional polar orientation of FIG. 14.
Figure 15:
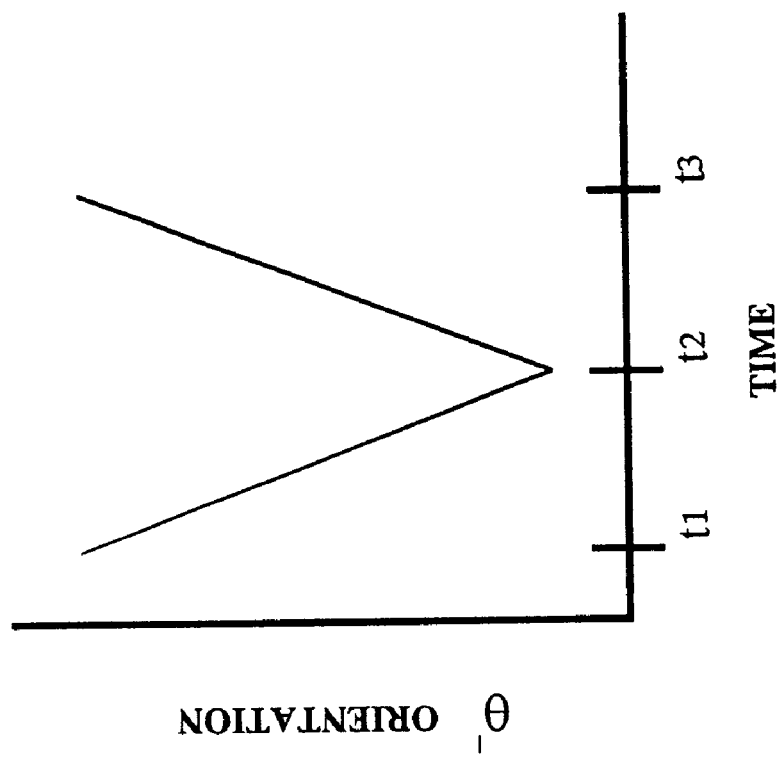

This representation, common in the prior art, is a problematic one. FIG. 14 shows an orientation vector gradually approaching the orientation of the z-axis, whose $\theta$ coordinate is decreasing with constant (negative) velocity while the $\phi$ coordinate is constant. As the orientation vector crosses the $\theta$ equals zero point, this coordinate starts increasing again. The speed thus instantly changes its sign resulting in a velocity discontinuity. Furthermore, regarding the $\phi$ coordinate, as the orientation vector crosses the $\theta$ equals zero point its projection on x-y plane suddenly moves to the opposite quadrant resulting in an instant sign change. Thus, not only the velocity, but the coordinate itself is discontinuous. The conventional (prior art) dynamics of these coordinates are illustrated in FIG. 15.

In the preferred embodiment of the present invention, a different orientation coordinate system is used. This system $\{\phi', \theta'\}$ is best described by its mapping 1235 into the conventional polar coordinate system $\{\phi, \theta\}$:

$$\theta = \begin{cases} \theta' & \text{if } mod(\theta, 2\pi) \le \pi \\ -\theta' & \text{if } mod(\theta, 2\pi) > \pi \end{cases} \quad (56)$$

$$\varphi = \begin{cases} \varphi' & \text{if } \theta = \theta' \\ \varphi' + \pi & \text{if } \theta = -\theta' \end{cases}$$

Using this coordinate system, the removal of the discontinuities associated with the movement described in FIG. 14, may be verified. The orientation vector approaches the $\theta'=0$ point with negative velocity, its $\theta'$ coordinate becomes negative, and the $\theta'$ coordinate, having zero velocity keeps its value. However, when translated into the conventional representation then $\theta=-\theta'$, and $\phi=\phi'+\pi$.

Figure 16:
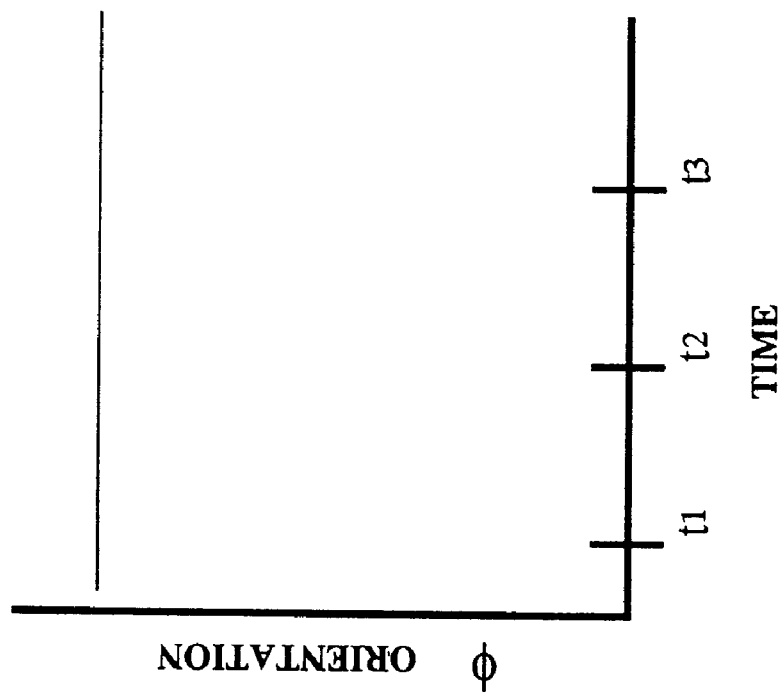
FIG. 16 is a simplified diagram of the dynamics of the coordinates for the polar orientation of FIG. 14 in accordance with a preferred embodiment of the present invention.
Figure 16:
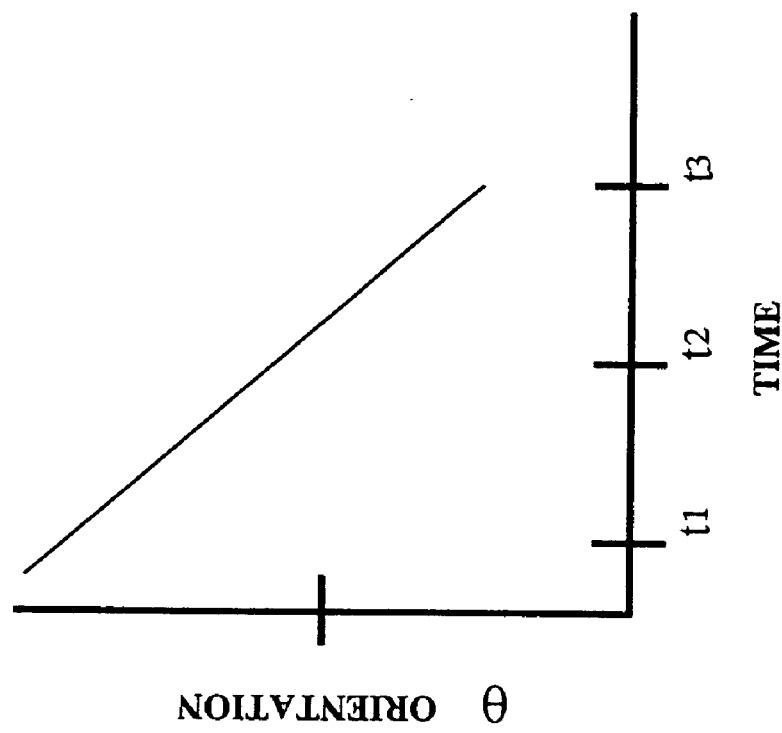

The dynamics of this representation are illustrated in FIG. 16. In this preferred embodiment of the invention, both components of the orientation vector may take any value, negative or positive and both the coordinates and their velocities are always continuous.

Neither the conventional representation, nor the representation of the preferred embodiment of the present invention shown and described hereinabove, removes the ambiguity of the $\phi$ coordinate when $\theta$ equals zero. This singularity may express itself as a tracking discontinuity if the detector pauses at $\theta$ equals zero, develops a $\phi$ value that has no physical consequences, and starts moving again.

A dynamic offset 1240 of the coordinate system solves this problem by rotating the axes of the polar orientation representation when the detector's orientation approaches the singularity. This transformation is equivalent to a rotation of the coordinate system such that the z-axis points at a different direction, e.g. the x and z coordinates may typically be switched. The transformation to the new system in this particular example is:

$$\theta = \cos^{-1}[\cos(\theta')\cos(\phi')]$$
$$\phi = \cos^{-1}[\sqrt{\cos^2(\theta) + \sin^2(\phi')\cos^2(\theta')}] \quad (57)$$

This transformation may be applied every time the detector's $\theta$ becomes smaller than, e.g., 10 degrees. Of course, keeping track of the size of $\theta$ and applying the transformation (55) costs a computational burden that may be avoided when transformation (56) is employed, and therefore, is only used when the mathematical ambiguity manifests itself in the implementation.

Pose Acquisition Using Time Varying Filter

The filter described in equations (44) through (52) assumes a good initial estimate of the state vector is available, and further tracking proceeds through the prediction-correction iteration. If an initial estimate is not available, the filter may diverge. The divergence problem becomes more serious for non-linear applications since the initial state estimate may fall at a local minimum of the error function in phase space. Thus the detector-positioning problem is made of two probably separate problems: acquisition and tracking.

The exact pose of the detector 1550 is never perfectly known. Thus, one would think that any initial estimate, albeit a poor one would serve to initiate the process. However, the consistency of the equations preferably should be preserved lest the filter diverge.

The filter performs two interwoven operations, tracking the state vector and solving the Ricatti difference equation, i.e., numerically solving the difference equation for P. The Ricatti equation may be updated using equations (46) and (52), and the solution has only a weak feedback through its dependency on the estimate of the state-vector. Thus, it proceeds at its own pace with little regard to the accuracy of the results, The state vector estimate, on the other had makes use of the P matrix, assuming it is correct, If the initial guess is very poor, the Ricatti equation may converge and a small P emerges while the error is still very large. The filter would assume the error is small, and the process very stable, and a large gain may result. The large gain combined with large innovations may cause filter divergence.

To allow the Kalman filter to start with a poor initial guess, the Ricatti equation convergence is preferably slowed downs either by artificially keeping a large R, or a large Q. Large R results in a long integration time due to its location inside the inverse operation at the gain formula Large Q keeps the steady-state solution large because Q is always added to the prediction.

As the filter proceeds, acquires more measurements, and produces better estimates, the large covariance matrices become an obstacle. Once a precise estimate is available, a small R is preferred, allowing an even tighter estimate and thus fully exploiting the measurements. The filter preferably requires a mechanism allowing switching from an acquisition mode, in which convergence is dominant to a tracking mode, in which convergence is ensured, and precision becomes more important. The switch is preferably smooth, as sudden changes in filter parameters may also be catastrophic.

These considerations lead to a solution of time-varying parameters 1245. At startup, when the state vector is only poorly known, large R and Q along with large initial F are supplied. R and Q, however, comprise a component that is allowed to decay exponentially, leaving only the component that better reflects the real noises of the system. For example, the time dependence of R and Q may take the form:

$$R_k^{dec} = R_{k-1}^{dec} e^{\frac{T_k - T_{k-1}}{T_{decay}}} \tag{58}$$

$$R_k = R_k^{dec} + R^{inf}$$

$$Q_k^{dec} = Q_{k-1}^{dec} e^{\frac{T_k - T_{k-1}}{T_{decay}}}$$

$$Q_k = Q_k^{dec} + Q^{inf}$$

P, of course, gradually decays as a result of the Ricatti solution. R and Q may be allowed to decay with a time constant of several hundred milliseconds in order to allow successful and smooth transition from acquisition into tracking when no information about the state vector is initially available. As described in more detail below, due to initialization limitations of the Kalman Filter, a complementary positioning unit is typically provided which is robust even at initialization.

Use of Self-calibration

The precision of the tracking based on equations (42)–(52) depends upon precise knowledge of the pose of all the transmitters. The five-coordinate pose of each transmitter is preferably known along with its intensity and radius. The pose is used to compute the dipole magnetic field, the intensity contributes to the proportionality factor $C_0$, and the radius is used in order to compute the correction to the dipole term in equation (56). Each of these parameters may be directly measured producing successful calibration. In practice, a precise calibration is tedious and sometimes limited, e.g. measuring the physical dimensions of an electric coil encased within a plastic protection shield is difficult. Moreover, almost every parameter is subject to some variance due to temperature changes. Thus, it is desirable to provide the system with a gross calibration, and allow it to fine-tune the parameters automatically.

In the calibration of the proportionality coefficient $C_0$, a direct measure of $C_0$ is possible. The higher the desired accuracy, the more time consuming is the experiment. Alternatively, a state member $C_i$ for each transmitter may be added, and a new Kalman filter built that optimizes these parameters. The new state vector preferably takes the form:

$$\xi = \lfloor x, y, z, \phi, \theta, \dot{x}, \dot{y}, \dot{z}, \phi, \theta, C_1, \ldots, C_N \rfloor$$

$N$=number of transmitters  (59)

When the state vector is augmented, the matrices $P_0$, Q and $\Phi$ are also preferably augmented:

$$Q = \begin{bmatrix} Q_{coor} & 0 \\ 0 & Q_{sc} \end{bmatrix} \tag{60}$$

where $Q_{coor}$ is the matrix defined as Q above, and $Q_{sc}$ is the self-calibration process-noise covariance-matrix. This matrix may be computed from the maximal allowed rate of change of the coefficients $C_0$ or be set to zero if a constant calibration is sought. The state transition matrix would take the form:

$$\Phi = \begin{bmatrix} \Phi_{coor} & 0 \\ 0 & \Phi_{sc} \end{bmatrix} \tag{61}$$

where $\Phi_{coor}$ is the matrix defined as $\Phi$ above, and $\Phi_{sc}$ is the coefficients transition matrix. This latter part typically equals the unity matrix unless a time derivative of the coefficients $C_0$ is included in the state.

The matrices K and H are also preferably augmented. To this end the derivative of $h(\xi)$ with respect to the new state members is typically required. The derivative may be analytically or numerically computed from equations (53), (54) and (55), depending upon which is more convenient or computationally faster. The sub-matrix of $P_0$ depends on the size of calibration uncertainty. For the example of self-calibrating the coefficients $C_0$, the H matrix takes the form:

$$H_k = [H_{coor} \; H_{sc}] \tag{62}$$

$$H_{sc} = \begin{bmatrix} h_{C,k}^1 & 0 & 0 & 0 & 0 & 0 & 0 & 0 & 0 \\ 0 & h_{C,k}^2 & 0 & 0 & 0 & 0 & 0 & 0 & 0 \\ 0 & 0 & h_{C,k}^3 & 0 & 0 & 0 & 0 & 0 & 0 \\ 0 & 0 & 0 & h_{C,k}^4 & 0 & 0 & 0 & 0 & 0 \\ 0 & 0 & 0 & 0 & h_{C,k}^5 & 0 & 0 & 0 & 0 \\ 0 & 0 & 0 & 0 & 0 & h_{C,k}^6 & 0 & 0 & 0 \\ 0 & 0 & 0 & 0 & 0 & 0 & h_{C,k}^7 & 0 & 0 \\ 0 & 0 & 0 & 0 & 0 & 0 & 0 & h_{C,k}^8 & 0 \\ 0 & 0 & 0 & 0 & 0 & 0 & 0 & 0 & h_{C,k}^9 \end{bmatrix}$$

$$h_{C,k}^s = \left( \frac{\partial h^s(\xi)}{\partial C_0^s} \right)\bigg|_{\xi_k(-)} = \frac{h^s[\xi_k(-)]}{C_0^s};$$

$C_0^s$ = coefficient of transmitter $s$

Similarly, one may add state members for calibration of other parameters. For example, considering the $\phi$ orientation of the sources:

$$\xi = \lfloor x, y, z, \phi, \theta, \dot{x}, \dot{y}, \dot{z}, \phi, \theta, \phi_1^s \rfloor$$

$\phi_N^s = \phi$ coordinate of transmitter $i$ $N$=number of transmitters  (63)

or any combination of calibration parameters. For each combination, the matrices $P_0$, Q and $\Phi$, are preferably accordingly built, When self-calibration is used, the system's knowledge of the transmitters, calibration data is preferably updated using the state vector 1255. Preferably, this update takes place after every iteration. However, a slower update rate may be used if only small updates are expected.

Using an Adaptive Kalman Filter

A deterministic time-decay of filter parameters may be generalized into an adaptive approach. For example, one may estimate the matrices Q and R from the results of the tracking, leading to an adaptive Q and R. In this example, the matrix Q describes every kinetic component that is not modeled by the equations of motion, modeling it as a white noise.

For example, when the state vector of equation (41) is used, the second time derivative, i.e., acceleration, is presumably included within Q as a process noise. Usually, this matrix is assigned a value based on a worst-case scenario. The highest acceleration expected would be based to estimate Q. This choice is not always optimal as a large Q leads to a large steady state P and a noise-sensitive filter. On the other hand, a small Q may result in overlooking quick pose changes.

In the state-vector example of equation (3) an adaptive estimation 1250 may take the following form:

$$Q_k^{acc} = \alpha \left( \frac{\xi_k^{velocity}(+) - \xi_{k-1}^{velocity}(+)}{T_k - T_{k-1}} \right)^2 + (1-\alpha)Q_{k-1}^{acc} \qquad (64)$$

$$Q_k = Q_k^{acc} + Q_0^{acc}$$

$$\xi_k^{velocity}(+) = \text{estimate of } \{\dot{x}, \dot{y}, \dot{z}, \dot{\phi}, \dot{\theta}\}$$

where $Q^{acc}$ denotes the components of Q that correspond to the highest time derivative appearing in the state vector, i.e., the velocity. The squared term is an estimate of the detector's acceleration. The constant $\alpha$ is a gain factor—the higher the gain, the shorter the period over which the acceleration-estimate is averaged. The term $Q_0^{acc}$ is a constant, time-independent term.

Similarly, the matrix R preferably benefits from an adaptive approach 1250. When R is too large the system only slowly responds to a detector's change of course. When R is too small the filter may diverge. Since this matrix models the effects that are not included in the physical model of the system as a white noise, its adaptation depends on the innovations $\{\zeta_k - h[\xi_k(-)]\}$:

$$R_k^{s,s} = \beta\{\zeta_k - h^s[\xi_k(-)]\}^2 + (1-\beta)R_{k-1}^{s,s}$$

$$R_k = R_k^{s,s} + R_0^{s,s} \qquad (65)$$

where the notations are similar to those of equation (66), and the superscript s denotes the transmitter whose measurement noise covariance is computed. The term $R_0^{acc}$ is a constant, time-independent term.

In the present specification, the superscript "t" or "T" associated with a matrix denotes the matrix's transpose.

The preferred embodiment of the present invention described hereinabove considers only an, EKF, i.e., first order approximation to an optimal non-linear filter. Improved filters (e.g. as described in Kushner, 1967), including second order EKF and Gaussian filters (both described in Jazwinski, 1970) and Gaussian sum filters (described in Anderson and Moore, 1979), and other versions of the known approximations can easily be applied in alternative embodiments of the present invention, and their derivation is straightforward.

The present specification describes two alternative methods for positioning sensors which are attached to the moving object. A Kalman filter-based tracking method, described hereinabove, computes a relative position of a moving object, in relation to a previous position thereof, based on incoming measurements of parameters of magnetic fields. The fields are generated by transmitters, typically stationary, whose positions are known, and the measurements being provided by sensors attached to the moving object. Computation of the relative position is self-correcting because the Kalman filter plugs each relative position into the field equations, relating measured field parameters to position parameters, and computes an error factor which is taken into account in the next iteration. The above method is also termed herein the "Kalman filter tracking method" or the "extended Kalman filter tracking method".

The genetic algorithm, described hereinabove, directly solves the field equations.

Figure 18:
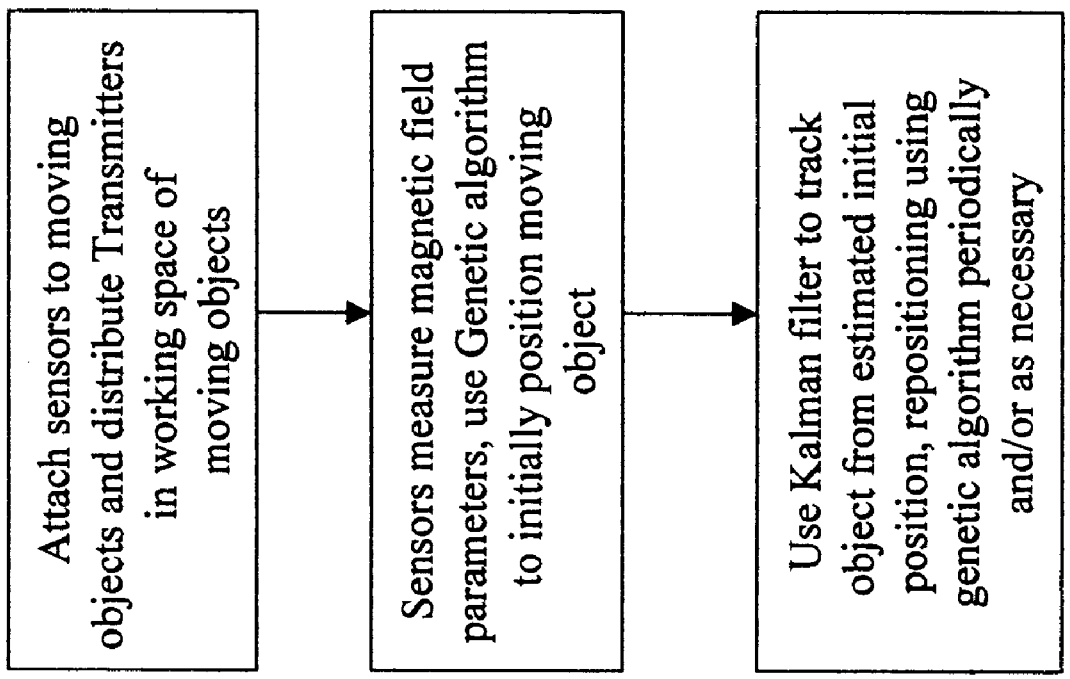
FIG. 18 shows a simplified flowchart of a method for facilitating the tracking of the sensors if no good initial estimate exists for the current position of a sensor, in accordance with a preferred embodiment of the present invention.

According to a preferred embodiment of the present invention, the two methods are used in suitable combination to facilitate tracking of the sensors. For example, as shown in FIG. 18, if no good initial estimate exists for the current position of a sensor, then preferably, the genetic based method is used until the current position of the sensor is seen, typically by plugging the estimated current position into the field equations, to have converged to within acceptable limits. At that point tracking continues based on the more efficient Kalman filter-based method. of the moving object.

Figure 17:
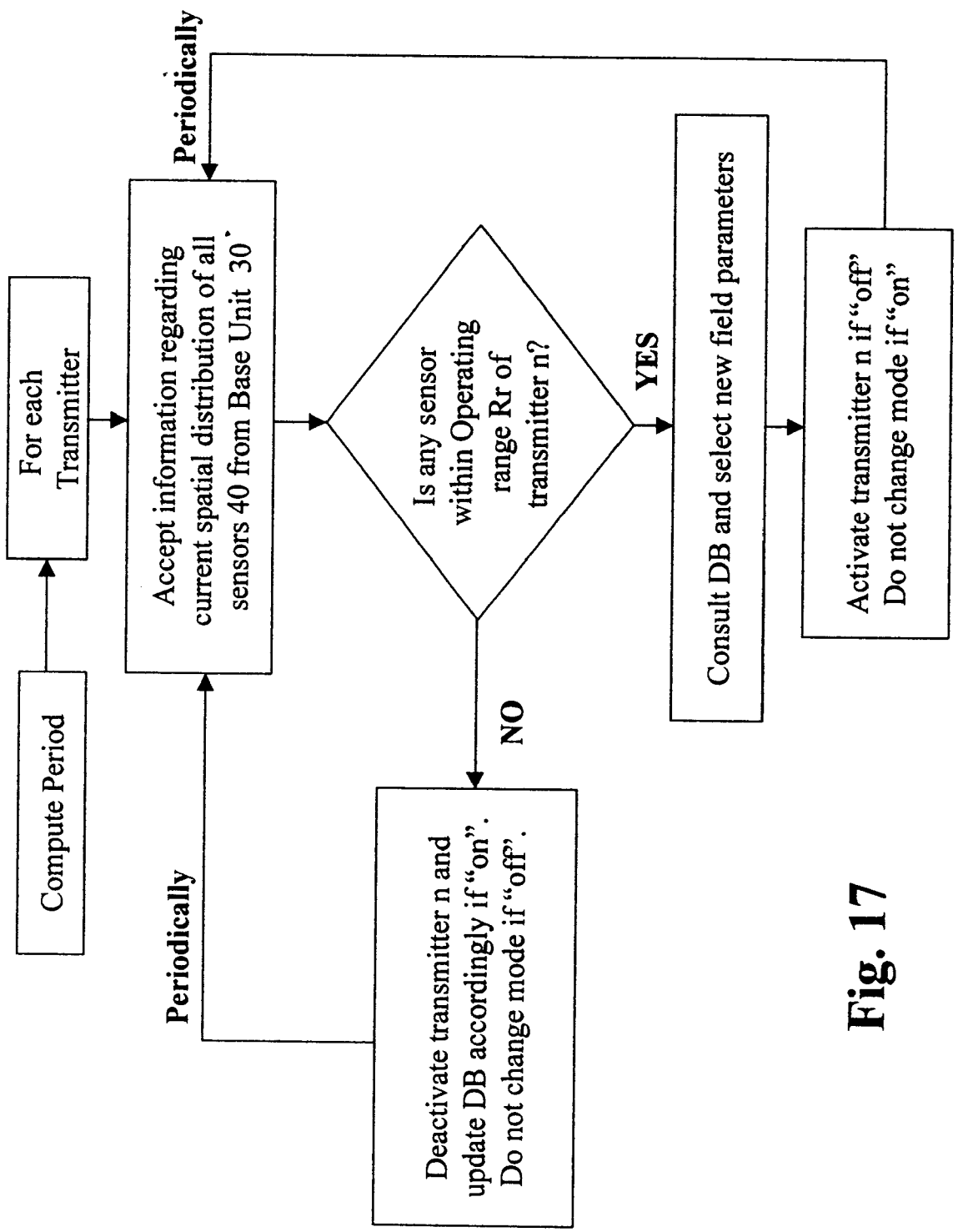
FIG. 17 shows a simplified flowchart of decision method to decide dynamically which of the transmitters or transmitter stations should change its mode of operation in accordance with a preferred embodiment of the present invention.

The term "Transmitter station" 34 in FIG. 1a refers to a plurality of electromagnetic field generators (or "transmitters") within the same vicinity. It is a particular feature of a preferred embodiment of the present invention that each of the field transmitters can be activated automatically responsive to the location of a particular sensor 40 in space, e.g. may turn "on" if the sensor is closer to the transmitter decision step (2076 in FIG. 17) and "off" if the sensor is distant. It is also a particular feature of a preferred embodiment of the invention that a group, e.g. one or more stations of the above transmitters can be activated simultaneously responsive to any of the sensors distance/s from any of the stations. The simplified flowchart of FIG. 17 illustrates the automatic activation for dynamic operational mode as described above. Here the term "on"/"off" refers to either an abrupt activation/deactivation of the electromagnetic field radiation of the transmitter or a gradual increase/decrease of the electromagnetic field radiation of the transmitter.

The analog output of the magnetic signal detector 50 in FIG. 1d is a voltage signal proportional to the superposition of the N magnetic field transmitters at the coordinates $x^i$, $y^i$, $z^i$, $\theta^i$, $\phi^i$, where the index i denotes the position of the magnetic coil i. The transmitters may, but need not, be configured as a plurality of stations (34 in FIG. 1a) each of which combine at least one transmitter. It is a particular feature of a preferred embodiment of the present invention that at least one of the transmitters stations can be activated to generate a distinguishable electromagnetic field responsive to the distance between the transmitter station and at least one of the sensors present in the working space.

Referring back to FIG. 1a, base unit 30 instantaneously collects information in regard to spatial distribution of the sensors 40 and current status of operation mode of all individual transmitters (e.g. 14, 18 etc.) and each transmitter station (e.g. 34 in FIG. 1a) and stores this information as well as information in respect to the transmitted electromagnetic field (i,e. frequency, intensity of radiation and signal amplitude) in data-base (DB) 35 of the base unit 30. Base unit 30 is capable of periodically employing a decision method to decide dynamically which of the transmitters or transmitter stations should change its mode of operation responsive to spatial distribution of sensors, as described in detail in FIG. 17.

The decision making procedure also controls the signal parameters that a new activated transmitter is to apply, such as frequency, intensity or radiation and signal amplitude and phase. Referring to FIG. 17, the Base-Unit 30 accepts all relevant information from all sensors 40, such as their current spatial position and orientation, and stores the information in the Data-Base 35. In addition, the Base-Unit 30 also accepts all relevant information from all transmitters (e.g. 12, 18, 16 etc.), such as their current operation status, frequency intensity or radiation and signal amplitude and phase, and stores the information in the data base 35.

Selective activation of the transmitters is preferably performed periodically. The period is preferably selected automatically by the system to match the expected pace of change in the position of the moving body and the estimated distance between transmitters. A preferred method for determining the period is based on the average change of position of all sensors over a predefined period of time t (e.g., 1 sec.) As an example, assume that N sensors 40 are present and [up]date the Base Unit 30 with their spatial location K times per second. Define the period P as:

$$P = \sqrt{\frac{1}{N}\sum_{s=1}^{N} P_s^2} \quad (66)$$

$$\text{where } P_S = \frac{A}{\sqrt{\frac{1}{m}\sum_{i=1}^{m}[\frac{\Delta u_i}{\Delta t}]^2}}$$

Here A is a predefined parameter proportional to the typical spacing between transmitters and the operating range $R_r$ (see FIG. 17, e.g. 1 meter), $\Delta t$ is defined as 1/K stations and u is the coordinate vector of the specific sensor (subscript S). Also, $\Delta u$ is defined as the coordinate difference between two successive measurements and, upon division by the time difference $\Delta t$ between successive measurements, yield the average velocity of the specific sensor between two successive measurements. The subscript i represents the specific measurement and the averaging is taken over m measurement points that represent m$\Delta t$ seconds.

The operating range $R_r$ of a transmitter is defined as the range at which a sensor would benefit from incorporating the electromagnetic field, generated from the transmitter, by incorporating the field parameters into calculations to yield spatial coordinates and orientation of said sensor. The operating range is a predefined parameter (e.g. 5 meters).

The above definition of P is based on a non-weighting process of averaging of the dynamic parameters of each activated sensor in the system. In the particular example above, only the velocities are taken into account. However it is understood that any other parameter can also be used.

A particular advantage of a preferred embodiment of the present invention is conservation of bandwidth by cessation of operation of transmitters which are not providing useful information.

A particular feature of a preferred embodiment of the present invention is that base unit 30 can assign different electromagnetic field parameters to each transmitter such that each transmitter transmits a unique, different electromagnetic field. For example, Transmitter 1 may transmit at frequency f1, amplitude A1 and phase P1, whereas Transmitter 2 may transmit at frequency f2, amplitude A2 and phase P2. Preferably, e.g. in order to conserve bandwidth, each transmitter is not permanently assigned a frequency, but rather the base unit 30 which knows which transmitters are currently active, assigns unused frequencies to newly activated transmitters. For example, once Transmitter 1 is deactivated, its parameter set may be assigned by the base unit to newly activated Transmitter 2.

The term "operational range" used in FIG. 17 refers to a vicinity of a transmitter. Typically, the positioning system of the present invention guarantees positioning within a predetermined accuracy of any object to which a sensor is attached which is within the operational ranges of a edetermined number of transmitters such as 5 transmitters. Smaller operational ranges allow greater accuracy to be provided.

When a currently active transmitter is deactivated or a currently inactive transmitter is activated, the Kalman filter residing in each affected sensor may suffer from the sudden change in the stream of data and may experience, as a result, relatively large error in its predictor matrices. Therefore, preferably, the sensor's genetic algorithm is activated in parallel to the Kalman filter upon activation or deactivation of a relevant transmitter, or upon anticipation that a relevant transmitter is about to be activated or deactivated. The genetic algorithm typically operates until both units yield similar results, i.e. until the location determined by the Kalman filter and by the genetic algorithm are within a selected tolerance value. At this point the base unit 30 instructs the sensor's processor to terminate operation of the Genetic Algorithm.

Anticipation by a sensor of activation or deactivation, by the base unit 30, of a relevant transmitter is preferably based on the output of the Kalman filter of the sensor which typically comprises a determination of the current position of the sensor and a prediction of the fixture position of the sensor. The base unit 30 preferably determines, on the basis of the current position outputs of the various sensors, whether or not each active transmitter should be deactivated, and whether or not each inactive transmitter should be activated.

The sensor preferably determines, on the basis of the predicted future position output generated by its Kalman filter, whether or not to activate its genetic algorithm. If its own predicted, fixture position is outside of the range of a transmitter which the sensor is currently sensing, or if its own predicted future position is within the range of a transmitter which it is not currently sensing, then the sensor typically activates its genetic algorithm upon receipt of a suitable command from the base unit, until its Kalman filter generates output which is sufficiently similar to the output of the genetic algorithm.

Deactivation of the genetic algorithm is preferably carried out only after a minimum period of operation of the genetic algorithm This is because, if the genetic algorithm is activated anticipatory of a predicted malfunctioning period of the Kalman filter, i.e. typically before the Kalman filter begins to malfunction, then if the Kalman filter's concordance with the genetic algorithm is checked substantially immediately after activation of the genetic algorithm then concordance will typically be found since the malfunction period has not yet begun. Typically, a suitable minimum period of operation is at least equal to the periodicity P with which the activation status of the transmitters is checked.

Figure 19:
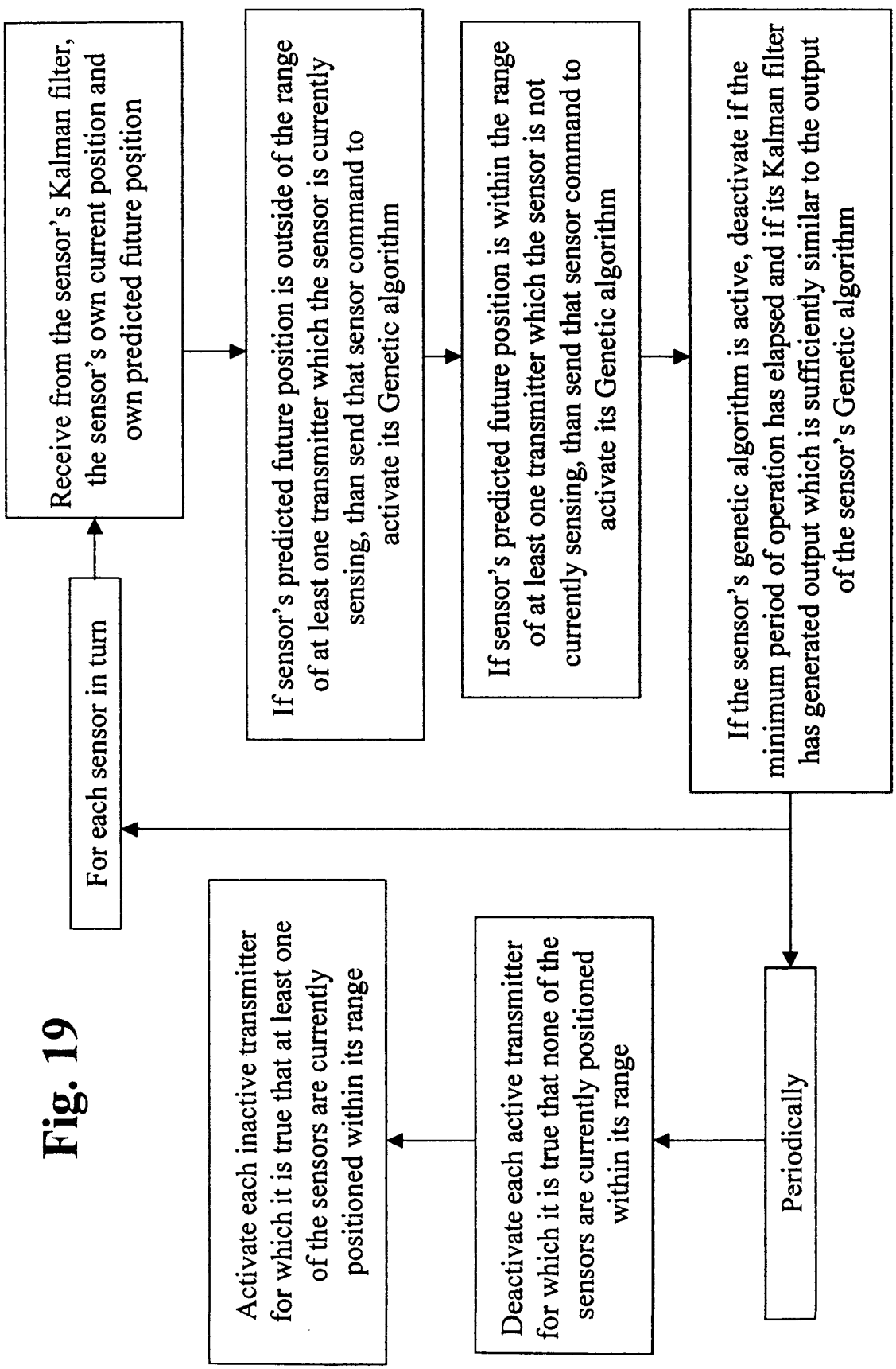
FIG. 19 is a simplified flowchart illustration of a preferred method of operation for the base unit 30 of the present invention.

FIG. 19 is a simplified flowchart illustration of a preferred method of operation for the base unit 30 of the present invention.

It is appreciated that the genetic algorithm in the present invention may alternatively be replaced by any suitable algorithm such as simulated annealing-based algorithms described in E. Aarts and J. Korst, "Simulated Annealing and Boltzman Machines: A Stochastic Approach to Combinatorial Optimization and Neural Computing", John Wiley and Sons Ltd. (ISBN: 0471921467); M. E. Johnson (Ed.) "Simulated Annealing (Sa and Optimization: Modern Algorithms with VLSI, Optimal Design and Missile Defense Applications)", Amer. Sciences Pr. (ISBN: 0935950184); and R. Azencott (Ed.), "Simulated Annealing: Parallelization Techniques", Wiley Interscience Series in Discrete Mathematics, John Wiley and Sons Ltd. (ISBN: 0471532312). Alternatively the genetic algorithm in the present invention may be replaced by neural networks, which unlike a conventional Kalman filter are robust despite abrupt changes in the electromagnetic environment which cause sudden fluctuation of the input signals to the algorithm, Typically, the results of the Kalman filter and the Genetic Algorithm, when working together, are combined, the Genetic Algorithm results initially being given more weight: The input to each iteration of the Kalman filter comprises the combined results of both units, rather than the Kalman filter result from a previous iteration which is typically less accurate than the combined result, A particular advantage of this preferred feature is more rapid convergence of the Kalman filter, such that the computation-heavy genetic algorithm can be more rapidly deactivated, leaving the Kalman filter to operate on its own until the next deactivation of the relevant transmitter occurs or is anticipated.

The system of the present invention preferably includes a first RF channel from the sensors to the base unit over which the sensors convey information to the base unit. This information typically comprises position information including spatial and angular position coordinates, plus a self-identifying header identifying the sensor which is sending this information. Preferably, a second RF channel is provided between the base unit 30 and the sensors. This channel is used to synchronize the sensors by communicating to at least the relevant sensors whether at least the relevant transmitters are currently in phase or in anti-phase, relative to a known initial phase. Preferably, the second RF channel is also employed to activate and deactivate the genetic algorithm within various sensors, as described in the preceding paragraph.

To run the software implementation of Appendix I the following steps may be performed:

(a). Generate an ASCII containing the contents of Appendix I.

(b). Install the Matlab software package, marketed by Mathworks, Inc., in a personal computer under a suitable operating system such as MS-Windows.

(c). Provide an input file. Appendix II is an example of a suitable file.

(d). Run the script of (a).

It is appreciated that the software components of the present invention may, if desired, be implemented in ROM (read-only memory) form. The software components may, generally, be implemented in hardware, if desired, using conventional techniques.

It is appreciated that the particular embodiment described in the Appendices is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. A tracking and positioning system comprising:
    a plurality of transmitters distributed within a working space;
    at least one sensors attached to at least one moving object and operative to sense transmissions arriving from said plurality of transmitters; and
    a dynamic transmission activator operative to track at least one position parameters of at least one of said sensors and to selectively activate and deactivate individual sets of at least one transmitters from among said plurality of transmitters, at least partly responsively to at least one position parameters of at least one of said sensors.

2. A system according to claim 1 wherein said dynamic transmission activator is operative to activate at least one individual transmitter from among said plurality of transmitters if and only if at least one sensors are within the operating range of said individual transmitter.

3. A system according to claim 1 wherein said dynamic transmission activator is operative to deactivate at least one individual transmitter from among said plurality of transmitters if and only if all sensors are outside of the operating range of said individual transmitter.

4. A tracking method for tracking a moving object whose initial position is substantially unknown, the method comprising:
    using a genetic algorithm to initially position the moving object; and
    tracking the moving object using a Kalman filter tracking method.

5. A method according to claim 4 and also comprising at least once repositioning the moving object, during tracking, using the genetic algorithm.

6. A method according to claim 4 wherein the Kalman filter operates, generating first position parameters, in parallel with the genetic algorithm which generates second position parameters and wherein at least one iteration of the Kalman filter receives input at least partly based on said second position parameters.

7. A method according to claim 6 wherein said input comprises a weighted combination of the first and second position parameters in which the second position parameters are given more weight.

8. A tracking and positioning system comprising:
    a Kalman filter receiving input representing electromagnetic signals characterizing the position of a moving object and operative to track and position a moving object with an accuracy which is affected by abrupt changes in the electromagnetic environment;
    an environmental monitor operative to monitor for abrupt changes in the electromagnetic environment which are detrimental to the accuracy of the Kalman filter and to generate an output signal representative of occurrence of an abrupt change; and
    a complementary tracking and positioning unit operative to receive said output signal and selectively activated for a limited period responsive to the output signal.

9. A system according to claim 8 wherein said complementary tracking and positioning unit comprises a genetic algorithm.

10. A system according to claim 8 wherein said complementary tracking and positioning unit comprises a simulated annealing algorithm.

11. A system according to claim 8 wherein said complementary tracking and positioning unit comprises a neural network.

12. A system according to claim 8 wherein said limited period is terminated when the Kalman filter's tracking and positioning output is found, by comparison to the tracking and positioning output of said complementary unit, to be accurate within a desired tolerance.

13. A system according to claim 8 and also comprising:

a plurality of transmitters distributed within a working space;

at least one sensors attached to at least one moving object and operative to sense transmissions arriving from said plurality of transmitters; and a dynamic transmission activator operative to track at least one position parameters of at least one of said sensors and to selectively activate and deactivate individual sets of at least one transmitters from among said plurality of transmitters, at least partly responsively to at least one position parameters of at least one of said sensors, and wherein the environmental monitor is operative to monitor for activation and deactivation of transmitters.

\* \* \* \* \*